(12) United States Patent
Fuwa et al.

(10) Patent No.: US 6,345,496 B1
(45) Date of Patent: Feb. 12, 2002

(54) METHOD AND DEVICE FOR PURIFYING EXHAUST GAS OF AN ENGINE

(75) Inventors: Naohide Fuwa; Hiroshi Tanaka; Yukio Kinugasa, all of Susono; Takaaki Itou, Mishima; Naoto Suzuki, Susono; Takehisa Yaegashi, Mishima; Kouhei Igarashi; Kouichi Takeuchi, both of Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/502,127

(22) Filed: Feb. 10, 2000

Related U.S. Application Data

(63) Continuation-in-part of application No. 09/068,422, filed as application No. PCT/JP96/03332 on Nov. 13, 1996, now Pat. No. 6,047,542, application No. 09/444,679, which is a continuation-in-part of application No. 09/068,360, filed as application No. PCT/JP96/03205 on Oct. 31, 1996.

(30) Foreign Application Priority Data

| Nov. 9, 1995 | (JP) | 7-291258 |
| Nov. 17, 1995 | (JP) | 7-299935 |
| Jan. 24, 1996 | (JP) | 8-10152 |
| Mar. 22, 1996 | (JP) | 8-66806 |
| Apr. 11, 1996 | (JP) | 8-89572 |
| Apr. 12, 1996 | (JP) | 8-91249 |

(51) Int. Cl.[7] .............................................. F01N 3/00
(52) U.S. Cl. ........................... 60/274; 60/276; 60/285; 60/297; 60/698; 60/301
(58) Field of Search .................... 60/274, 276, 286, 60/285, 301, 280, 698, 297, 289, 303; 123/443

(56) References Cited

U.S. PATENT DOCUMENTS 3,767,764 A  10/1973  Dolbear
3,810,361 A  5/1974  Weaving et al.
3,825,654 A  7/1974  Kobylinski et al.
3,953,576 A  4/1976  Meguerian et al.
4,321,792 A  3/1982  Achard
4,393,031 A  7/1983  Henke (List continued on next page.)

FOREIGN PATENT DOCUMENTS

| EP | 0 510 498 | 10/1992 | |
| EP | 701 858 | 3/1996 | |
| GB | 1 453 456 | 10/1976 | |
| JP | 3244195 | 10/1991 | |
| JP | 4365920 | * 12/1992 | .................. 60/285 |
| JP | 4-365920 | 12/1992 | |
| JP | 6-108827 | 4/1994 | |
| JP | 6-330741 | 11/1994 | |
| JP | 08 004 522 | 1/1996 | |
| JP | 9004441 | 1/1997 | |
| WO | WO 93/07363 | 4/1993 | |

*Primary Examiner*—Thomas Denion
(74) *Attorney, Agent, or Firm*—Kenyon & Kenyon

(57) ABSTRACT

An exhaust manifold (7) of an engine (1) is connected to a three way (TW) catalyst (8a), and the TW catalyst (8a) is connected to an $NH_3$ adsorbing and oxidizing ($NH_3$-AO) catalyst (10a). The engine (1) performs the lean and the rich engine operations alternately and repeatedly. When the engine (1) performs the rich operation and thereby the exhaust gas air-fuel ratio of the exhaust gas flowing into the TW catalyst (8a) is made rich, $NO_x$ in the inflowing exhaust gas is converted to $NH_3$ in the TW catalyst (8a). The $NH_3$ is then adsorbed in the $NH_3$-AO catalyst (10a). Next, when the engine (1) performs the lean operation and thereby the exhaust gas air-fuel ratio of the exhaust gas flowing into the TW catalyst (8a) is made lean, $NO_x$ in the exhausted gas passes through the TW catalyst (8a), and flows into the $NH_3$-AO catalyst (10a). At this time, $NH_3$ adsorbed in the catalyst (10a) is desorbed therefrom, and reduces the inflowing $NO_x$.

124 Claims, 43 Drawing Sheets

U.S. PATENT DOCUMENTS

| | | |
|---|---|---|
| 4,395,875 A | 8/1983 | Virk |
| 4,854,123 A | 8/1989 | Inoue |
| 5,021,227 A | 6/1991 | Kobayashi et al. |
| 5,120,695 A | 6/1992 | Blumrich et al. |
| 5,207,058 A | 5/1993 | Sasaki et al. |
| 5,292,991 A | 3/1994 | Lachman et al. |
| 5,313,792 A | 5/1994 | Katoh et al. |
| 5,367,875 A | 11/1994 | Aboujaoude et al. |
| 5,384,098 A | 1/1995 | Morikawa |
| 5,406,790 A | 4/1995 | Hirota et al. |
| 5,410,873 A | 5/1995 | Tashiro |
| 5,412,946 A | 5/1995 | Oshima et al. |
| 5,461,857 A | 10/1995 | Itou et al. |
| 5,473,887 A | 12/1995 | Takeshima et al. |
| 5,479,775 A | 1/1996 | Kraemer et al. |
| 5,540,047 A | 7/1996 | Dahlheim et al. |
| 5,551,231 A | 9/1996 | Tanaka et al. |
| 5,595,060 A | 1/1997 | Togai et al. |
| 5,605,042 A | 2/1997 | Stutzenberger |
| 5,609,026 A | 3/1997 | Berriman et al. |
| 5,628,186 A | 5/1997 | Schmelz |
| 5,657,625 A | 8/1997 | Koga et al. |
| 5,661,971 A | 9/1997 | Waschatz et al. |
| 5,740,669 A | 4/1998 | Kinugasa et al. |
| 5,746,052 A | 5/1998 | Kiugasa et al. |
| 5,758,493 A | 6/1998 | Asik et al. |
| 5,778,667 A | 7/1998 | Kinugasa et al. |
| 5,782,087 A | 7/1998 | Kinugasa et al. |
| 5,783,160 A | 7/1998 | Kinugasa et al. |
| 5,791,139 A | 8/1998 | Atago et al. |
| 5,825,425 A | 10/1998 | Sebastiano et al. |
| 5,964,088 A * | 10/1999 | Kinugasa et al. ............. 60/286 |
| 5,970,707 A * | 10/1999 | Sawada et al. ................ 60/277 |
| 5,974,793 A * | 11/1999 | Kinugasa et al. ............. 60/285 |
| 6,047,542 A * | 4/2000 | Kinugasa et al. ............. 60/274 |

* cited by examiner

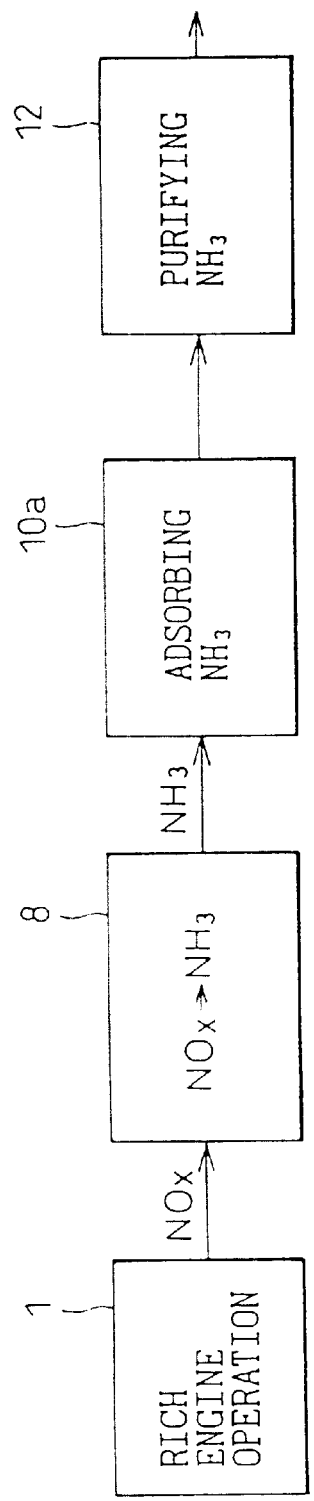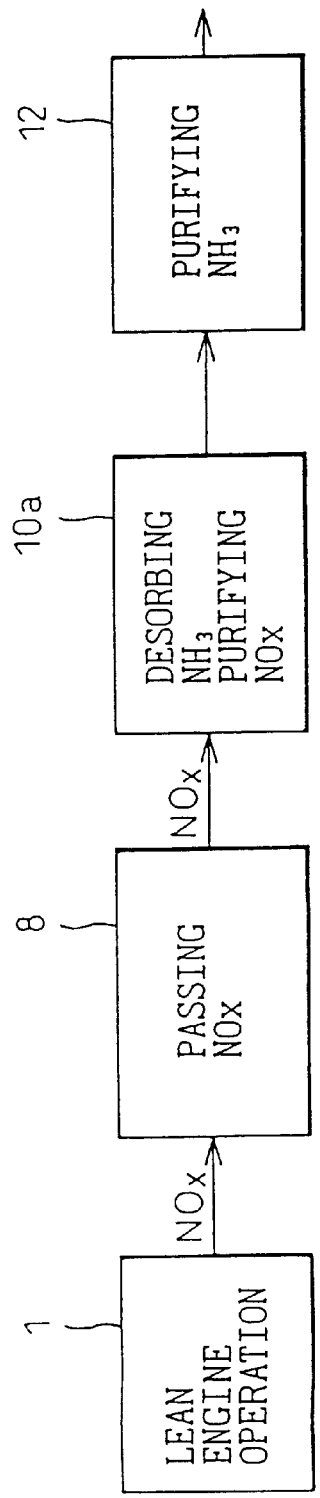

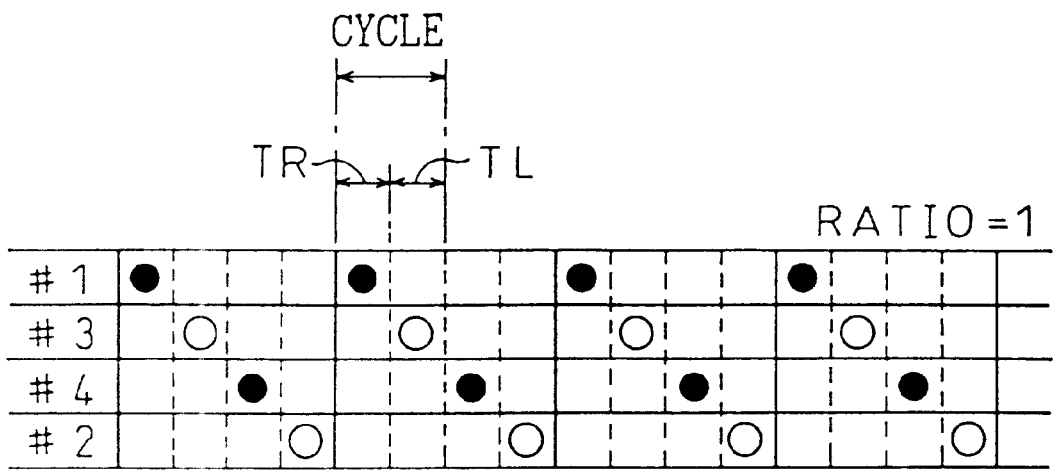

Fig.18

| RATIO | 1 | 2 | 3 | 4 |
|---|---|---|---|---|
| DRATIO | 00001 | 00011 | 00111 | 01111 |

Fig.19

RATIO=2

| CYLINDER | #2 | #1 | #3 | #4 | #2 | #1 |
|---|---|---|---|---|---|---|
| DHISTORY | 10010 | 00100 | 01001 | 10010 | 00100 | 01001 |
| DRATIO | 00011 | 00011 | 00011 | 00011 | 00011 | 00011 |
| DRICH | 00010 | 00000 | 00001 | 00010 | 00000 | 00001 |

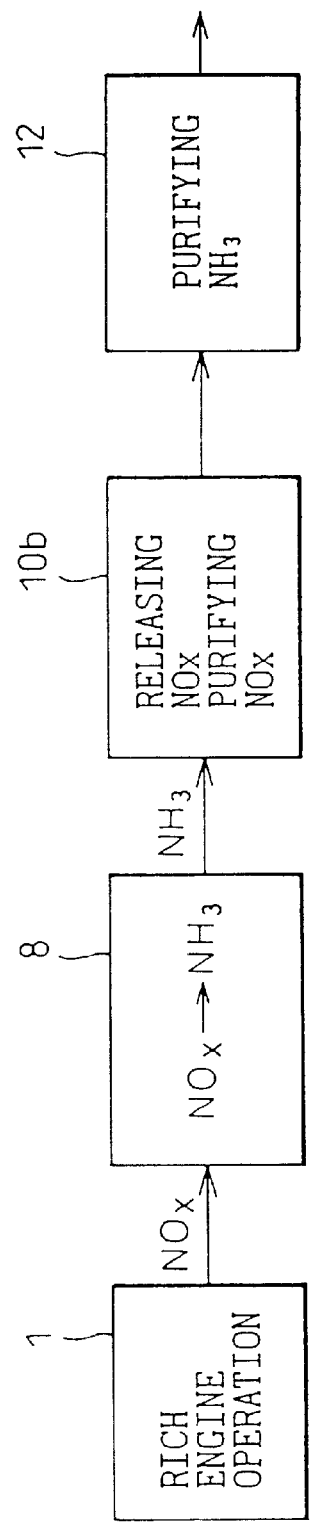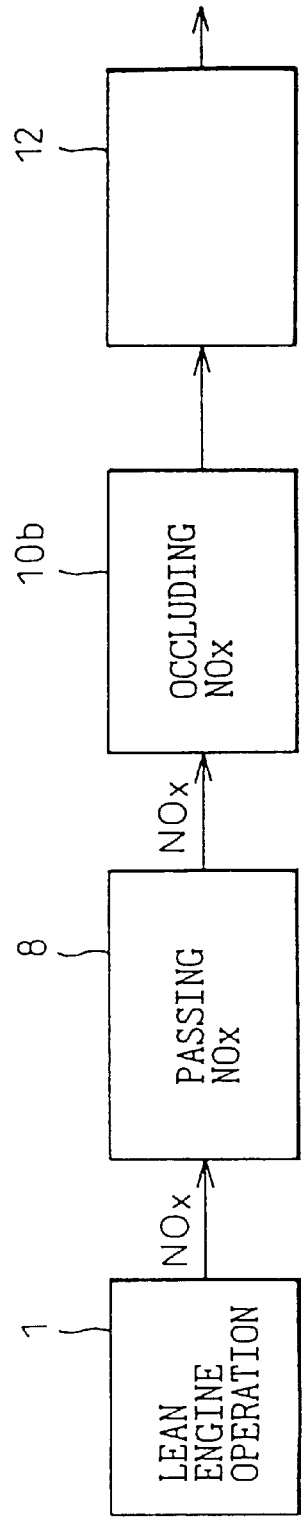

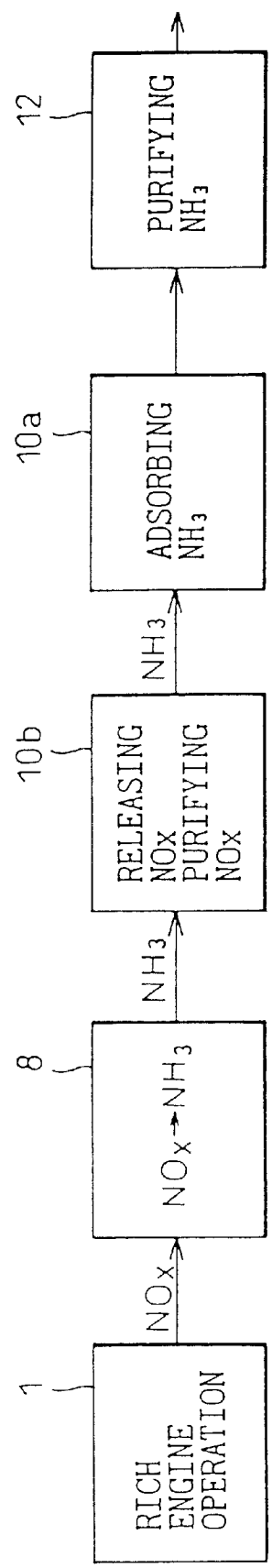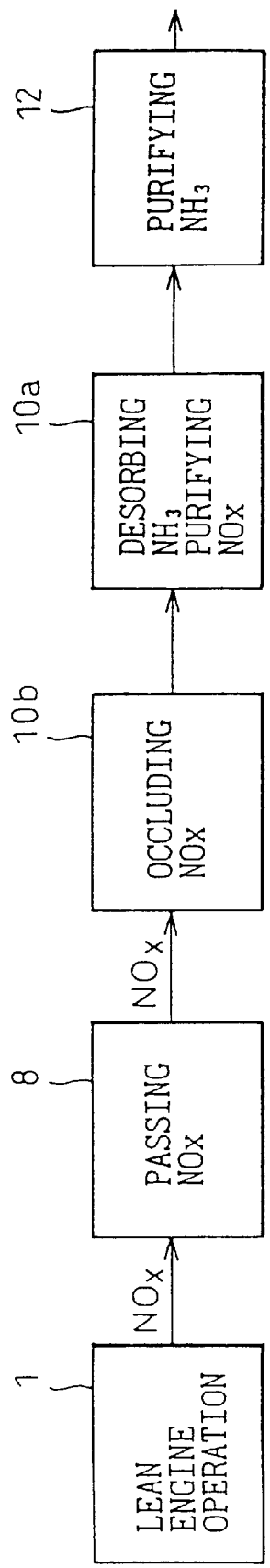

METHOD AND DEVICE FOR PURIFYING EXHAUST GAS OF AN ENGINE

CROSS-REFERENCE TO RELATED APPLICATIONS

This is a Continuation-in-Part of U.S. application Ser. No. 09/068,360, filed on May 7, 1998, which is a 371 of PCT/JP96/03205, filed Oct. 31, 1996, and U.S. application Ser. No. 09/068,422, filed on Jun. 29, 1998, now U.S. Pat. No. 6,047,542 which is a 371 of PCT/JP96/03332 filed Nov. 13, 1996.

BACKGROUND OF THE INVENTION

1. Filed of the Invention

The present invention relates to a method and a device for purifying an exhaust gas of an engine.

2. Description of the Related Art

If an air-fuel ratio of an air-fuel mixture in a combustion chamber of an internal combustion engine is referred to as an engine air-fuel ratio, an exhaust gas purifying device for an internal combustion engine with multi-cylinder has been known, in which a three-way catalyst is arranged in an exhaust passage, and the engine air-fuel ratio is controlled to be stoichiometric or rich with respect to the stoichiometric air-fuel ratio. If the engine air-fuel ratio is made lean with respect to the stoichiometric air-fuel ratio, the three way catalyst does not purify nitrogen oxides $NO_x$ in the exhaust gas sufficiently, and thus the $NO_x$ is emitted to the ambient air. Accordingly, the exhaust gas purifying device mentioned above makes the engine air-fuel ratio stoichiometric or rich, to thereby purify $NO_x$, at the three-way catalyst, as much as possible.

On the other hand, a lower fuel consumption rate is desirable, and thus it is desirable to make the engine air-fuel ratio as lean as possible. However, if the engine air-fuel ratio is made lean, the above-mentioned exhaust gas purifying device cannot purify $NO_x$ sufficiently. To solve this problem, Japanese Unexamined Patent Publication No. 4-365920 discloses an exhaust gas purifying device for an internal combustion engine with multi-cylinders, the engine having first and second cylinder groups. The purifying device is provided with; an engine operation control device to continuously make each cylinder operation of the first cylinder group a rich engine operation in which the engine air-fuel ratio is rich, and to continuously make each cylinder operation of the second cylinder group a lean engine operation in which the engine air-fuel ratio is lean; a first exhaust passage connected to each cylinder of the first cylinder group; a second exhaust passage connected to each cylinder of the second cylinder group and different from the first exhaust passage; an $NH_3$ synthesizing catalyst arranged in the first exhaust passage for synthesizing ammonia $NH_3$ from at least a part of $NO_x$ in the inflowing exhaust gas; an interconnecting passage interconnecting the first exhaust passage downstream of the $NH_3$ synthesizing catalyst and the second exhaust passage to each other; and an exhaust gas purifying catalyst arranged in the interconnecting passage to react $NO_x$ and $NH_3$ flowing therein to each other to thereby purify $NO_x$ and $NH_3$ simultaneously. In this exhaust gas purifying device, the fuel consumption rate is reduced by increasing the numbers of the cylinders of the second cylinder group in which the lean engine operation is performed, while purifying $NO_x$ by synthesizing $NH_3$ from $NO_x$ exhausted from the first group and reacting the $NH_3$ and $NO_x$ from the second group.

However, this device requires two, separate exhaust passages, one for the first cylinder group, and the other for the second cylinder group. This complicates the structure of the device, and makes the size of the device larger.

DISCLOSURE OF THE INVENTION

An object of the present invention is to provide a method and a device for purifying an exhaust gas of an engine which can purify the exhaust gas sufficiently with a simple structure.

According to one aspect of the present invention, there is provided a method for purifying an exhaust gas of an engine, comprising, in turn: forming an exhaust gas portion of which an exhaust gas air-fuel ratio is lean, and an exhaust gas portion of which the exhaust gas air-fuel ratio is rich, from the exhaust gas of the engine, alternately and repeatedly; and contacting the exhaust gas portions an $NH_3$ synthesizing catalyst and an exhaust gas purifying catalyst comprised of at least one selected from the group consisted of an $NH_3$ adsorbing and oxidizing ($NH_3$-AO) catalyst and a $NO_x$ occluding and reducing ($NO_x$-OR) catalyst, in turn, the $NH_3$ synthesizing catalyst synthesizing $NH_3$ from at least a part of $NO_x$ in the inflowing exhaust gas when the exhaust gas air-fuel ratio of the inflowing exhaust gas is rich, and passing $NO_x$ in the inflowing exhaust gas therethrough when the exhaust gas air-fuel ratio of the inflowing exhaust gas is lean, the $NH_3$-AO catalyst adsorbing $NH_3$ in the inflowing exhaust gas therein, and desorbing the adsorbed $NH_3$ therefrom and oxidizing the $NH_3$ when an $NH_3$ concentration in the inflowing exhaust gas becomes lower, and the $NO_x$-OR catalyst occluding $NO_x$ in the inflowing exhaust gas therein when the exhaust gas air-fuel ratio of the inflowing exhaust gas is lean, and releasing the occluded $NO_x$ therefrom and reducing the $NO_x$ when the exhaust gas air-fuel ratio of the inflowing exhaust gas is rich.

According to another aspect of the present invention, there is provided a device for purifying an exhaust gas of an engine having an exhaust passage, comprising: exhaust gas portion forming means arranged in the engine or the exhaust passage for forming an exhaust gas portion of which an exhaust gas air-fuel ratio is lean, and an exhaust gas portion of which the exhaust gas air-fuel ratio is rich, from the exhaust gas of the engine, alternately and repeatedly; an $NH_3$ synthesizing catalyst arranged in the exhaust passage downstream of the exhaust gas portion forming means, the $NH_3$ synthesizing catalyst synthesizing $NH_3$ from at least a part of $NO_x$ in the inflowing exhaust gas when the exhaust gas air-fuel ratio of the inflowing exhaust gas is rich, and passing $NO_x$ in the inflowing exhaust gas therethrough when the exhaust gas air-fuel ratio of the inflowing exhaust gas is lean; and an exhaust gas purifying catalyst arranged in the exhaust passage downstream of the $NH_3$ synthesizing catalyst, the exhaust gas purifying catalyst comprising at least one selected from the group consisting of an $NH_3$ adsorbing and oxidizing ($NH_3$-AO) catalyst and a $NO_x$ occluding and reducing ($NO_x$-OR) catalyst, the $NH_3$-AO catalyst adsorbing $NH_3$ in the inflowing exhaust gas therein, and desorbing the adsorbed $NH_3$ therefrom and oxidizing the $NH_3$ when the $NH_3$ concentration in the inflowing exhaust gas becomes lower, and the $NO_x$-OR catalyst occluding $NO_x$ in the inflowing exhaust gas therein when the exhaust gas air-fuel ratio of the inflowing exhaust gas is lean, and releasing the occluded $NO_x$ therefrom and reducing the $NO_x$ when the exhaust gas air-fuel ratio of the inflowing exhaust gas is rich.

The present invention may be more fully understood from the description of preferred embodiments of the invention set forth below, together with the accompanying drawings.

BRIEF DESCRIPTION OF THE DRAWINGS

FIGS. 4A and 4B schematically illustrate the exhaust gas purifying method in the engine shown in FIG. 1;

FIG. 14 illustrates the lean and rich operation periods with RATIO=1;

FIG. 15 illustrates the lean and rich operation periods with RATIO=2;

FIG. 18 illustrates the relationship between RATIO and DRATIO;

FIG. 19 illustrates a method for calculating DRICH;

FIGS. 35A and 35B schematically illustrate the exhaust gas purifying method in the engine shown in FIG. 33;

FIGS. 40A and 40B schematically illustrate the exhaust gas purifying method in the engine shown in FIG. 39;

BEST MODE FOR CARRYING OUT THE INVENTION

In general, nitrogen oxides $NO_x$ includes nitrogen monoxide NO, nitrogen dioxide $NO_2$, dinitrogen tetraoxide $N_2O_4$, dinitrogen monoxide $N_2O$, etc. The following explanation is made referring $NO_x$ mainly as nitrogen monoxide NO and/or nitrogen dioxide $NO_2$, but a method and a device for purifying an exhaust gas of an engine according to the present invention can purify the other nitrogen oxides.

Figure 1:
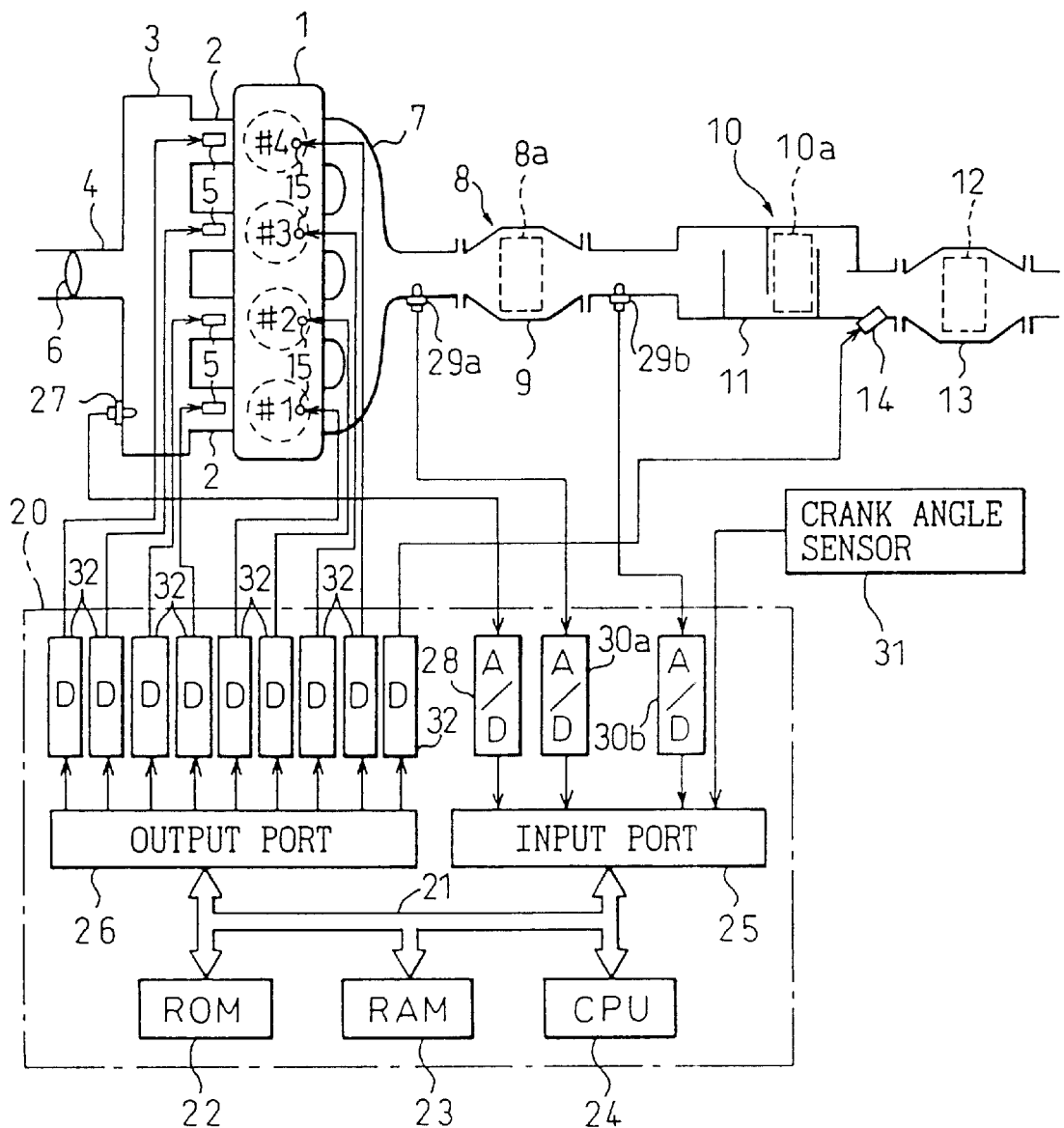
FIG. 1 is a general view of an internal combustion engine.

FIG. 1 shows the case where the present invention is applied to an internal engine of the spark ignition type. However, the present invention may be applied to a diesel engine. Also, the engine shown in FIG. 1 is used for an automobile, for example.

Referring to FIG. 1, an engine body 1, which is a spark-ignition type engine, has four cylinders, i.e., a first cylinder #1, a second cylinder #2, a third cylinder #3, a fourth cylinder #4. Each cylinder 1 to #4 is connected to a common surge tank 3, via a corresponding branch 2, and the surge tank 3 is connected to a air-cleaner (not shown) via an intake duct 4. In each branch 2, a fuel injector 5 is arranged to feed fuel, such as gasoline, to the corresponding cylinder. Further, a throttle valve 6 is arranged in the intake duct 4, an opening of which becomes larger as the depression of the acceleration pedal (not shown) becomes larger. Note that the fuel injectors 5 are controlled in accordance with the output signals from an electronic control unit 20.

On the other hand, each cylinder is connected to a common exhaust manifold 7, and the exhaust manifold 7 is connected to a catalytic converter 9 housing an $NH_3$ synthesizing catalyst 8 therein. The catalytic converter 9 is then connected to a muffler 11 housing an exhaust gas purifying catalyst 10 therein. The muffler 11 is then connected to a catalytic converter 13 housing an $NH_3$ purifying catalyst 12 therein. Further, as shown in FIG. 1, a secondary air supplying device 14 is arranged in the exhaust passage between the muffler 11 and the catalytic converter 13, for supplying a secondary air to the $NH_3$ purifying catalyst 12, and is controlled in accordance with the output signals from the electronic control unit 20. Further, each cylinder #1 to #4 is provided with a spark plug 15, which is controlled in accordance with the output signals from the electronic control unit 20.

The electronic control unit 20 comprises a digital computer and is provided with a ROM (read only memory) 22, a RAM (random access memory) 23, a CPU (micro processor) 24, an input port 25, and an output port 26, which are interconnected by a bidirectional bus 21. Mounted in the surge tank 3 is a pressure sensor 27 generating an output voltage proportional to a pressure in the surge tank 3. The output voltage of the sensor 27 is input via an AD converter 28 to the input port 25. The intake air amount Q is calculated in the CPU 24 on the basis of the output signals from the AD converter 28. Further, mounted in the collecting portion of the exhaust manifold 7 is an upstream side air-fuel ratio sensor 29a generating an output voltage proportional to an exhaust gas air-fuel ratio, explained hereinafter, of the exhaust gas flowing through the collecting portion of the exhaust manifold 7. The output voltage of the sensor 29a is input via an AD converter 30a to the input port 25. Mounted in the exhaust passage between the catalytic converter 9 and the muffler 11 is a downstream side air-fuel ratio sensor 29b generating an output voltage proportional to the exhaust gas air-fuel ratio of the exhaust gas flowing in that exhaust passage, that is, exhausted from the $NH_3$ synthesizing catalyst 8. The output voltage of the sensor 29b is input via an AD converter 30b to the input port 25. Further, connected to the input port 25 is a crank angle sensor 31 generating an output pulse whenever the crank shaft of the engine 1 turns by, for example, 30 degrees. The CPU 24 calculates the engine speed N in accordance with the pulse. On the other hand, the output port 26 is connected to the fuel injectors 5, the spark plugs 15, and the secondary supplying device 14, via corresponding drive circuits 32.

In the embodiment shown in FIG. 1, the $NH_3$ synthesizing catalyst 8 is comprised of a three-way catalyst 8a, which is simply expressed as a TW catalyst, here. The TW catalyst 8a is comprised of precious metals such as palladium Pd, platinum Pt, and rhodium Rh, carried on a layer of, for example, alumina, formed on a surface of a substrate.

Figure 2A:
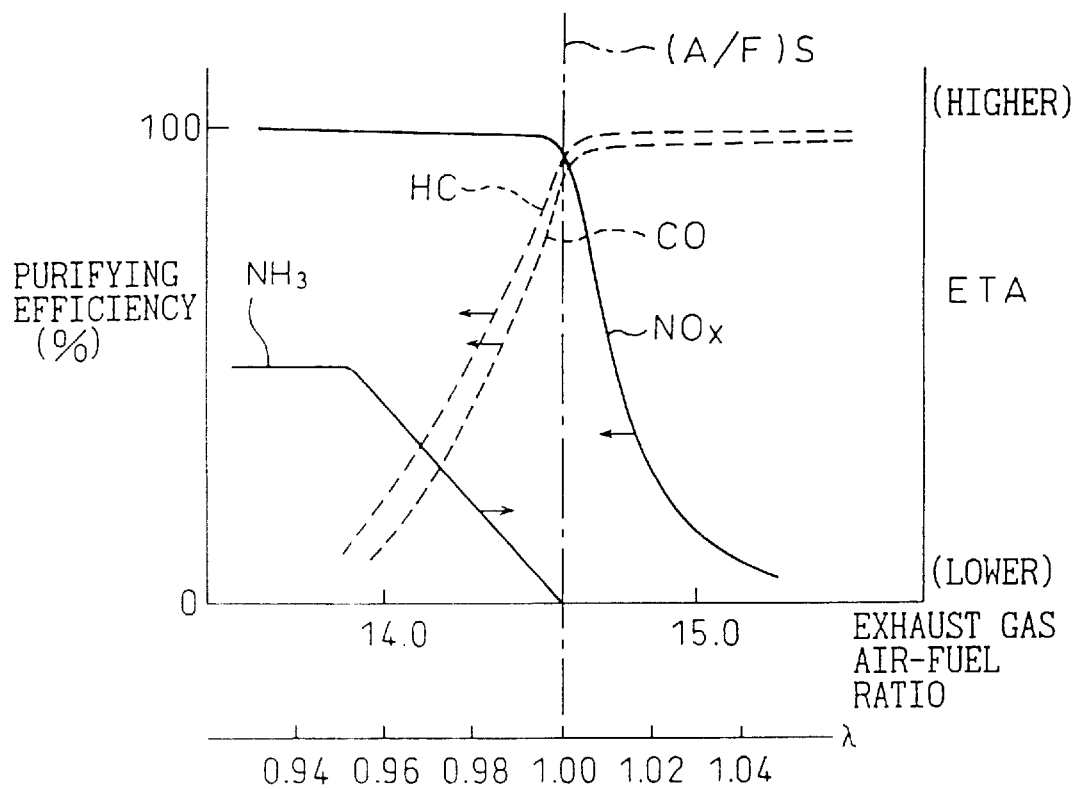
FIG. 2A illustrates a characteristic of a three-way catalyst.

FIG. 2A illustrates the purifying efficiency of the exhaust gas of the TW catalyst 8a. If a ratio of the total amount of air fed into the intake passage, the combustion chamber, and the exhaust passage upstream of a certain position in the exhaust passage to the total amount of fuel fed into the intake passage, the combustion chamber, and the exhaust passage upstream of the above-mentioned position is referred to as an exhaust gas air-fuel ratio of the exhaust gas flowing through the certain position, FIG. 2A shows that the TW catalyst 8a passes the inflowing $NO_x$ therethrough when the exhaust gas air-fuel ratio of the inflowing exhaust gas is lean with respect to the stoichiometric air-fuel ratio (A/F)S, which is about 14.6 and the air-excess ratio $\lambda=1.0$, and the TW catalyst 8a synthesizes $NH_3$ from a part of the inflowing $NO_x$ when the exhaust gas air-fuel ratio of the inflowing exhaust gas is rich. The $NH_3$ synthesizing function of the TW catalyst 8a is unclear, but it can be considered that some of $NO_x$ in the exhaust gas of which the exhaust gas air-fuel ratio is rich is converted to $NH_3$ according to the following reactions (1) and (2), that is:

$$5H_2 + 2NO \rightarrow 2NH_3 + 2H_2O \qquad (1)$$

$$7H_2 + 2NO_2 \rightarrow 2NH_3 + 4H_2O \qquad (2)$$

On the contrary, it is considered that the other $NO_x$ is reduced to the nitrogen $N_2$ according to the following reactions (3) to (6), that is:

$$2CO + 2NO \rightarrow N_2 + 2CO_2 \qquad (3)$$

$$2H_2 + 2NO \rightarrow N_2 + 2H_2O \qquad (4)$$

$$4CO + 2NO_2 \rightarrow N_2 + 4CO_2 \qquad (5)$$

$$4H_2 + 2NO_2 \rightarrow N_2 + 4H_2O \qquad (6)$$

Accordingly, $NO_x$ flowing in the TW catalyst 8a is converted to either $NH_3$ or $N_2$ when the exhaust gas air-fuel ratio of the inflowing exhaust gas is rich, and thus $NO_x$ is prevented from being discharged from the TW catalyst 8a.

As shown in FIG. 2A, an efficiency ETA of the $NH_3$ synthesizing of the TW catalyst 8a becomes larger as the exhaust gas air-fuel ratio of the inflowing exhaust gas becomes smaller or richer from the stoichiometric air-fuel ratio (A/F)S, and is kept constant when the exhaust gas air-fuel ratio of the inflowing exhaust gas becomes even smaller. In the example shown in FIG. 2A, the $NH_3$ synthesizing efficiency ETA is kept constant when the exhaust gas air-fuel ratio of the inflowing exhaust gas equals or is smaller than about 13.8, where the air-excess ratio $\lambda$ is about 0.95).

Figure 2B:
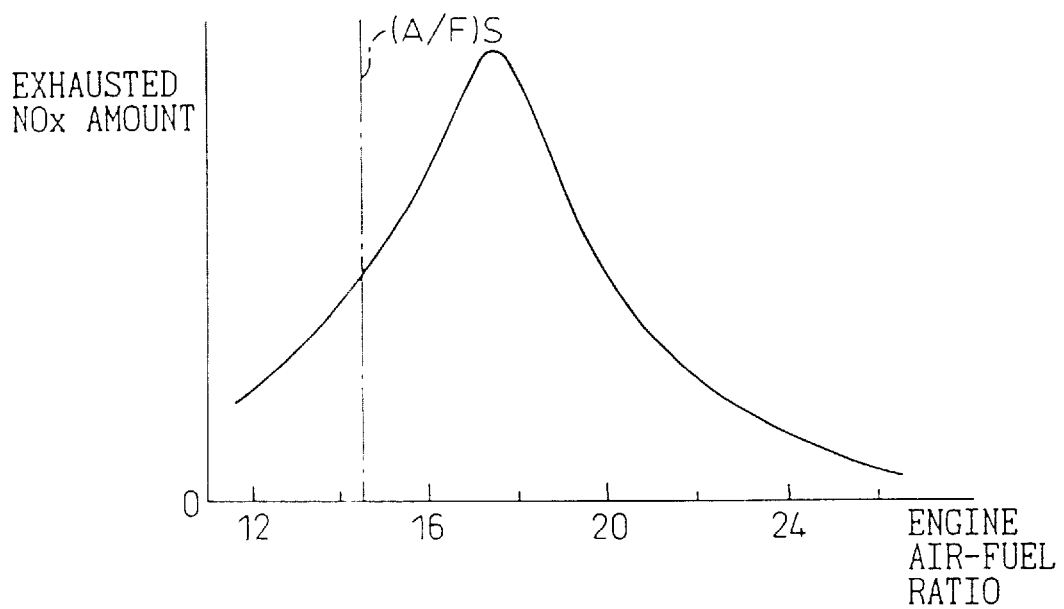
FIG. 2B illustrates a variation of a $NO_x$ amount exhaust from the engine with an engine air-fuel ratio.

On the other hand, the $NO_x$ amount exhausted from each cylinder per unit time depends on the engine air-fuel ratio, as shown in FIG. 2B. In particular, the exhausted $NO_x$ amount becomes smaller as the engine air-fuel ratio becomes smaller when the engine air-fuel ratio is rich. Therefore, considering the synthesizing efficiency ETA, the $NH_3$ amount synthesized in the TW catalyst 8a per unit time reaches the maximum amount thereof when the exhaust gas air-fuel ratio of the inflowing exhaust gas is about 13.8, if the exhaust gas air-fuel ratio of the inflowing exhaust gas conforms to the engine air-fuel ratio.

Note that, in the engine shown in FIG. 1, it is desired to synthesize $NH_3$ in as large amount as possible, when the exhaust gas air-fuel ratio of the exhaust gas flowing the TW catalyst 8a is rich, because of the reasons described below. Accordingly, a TW catalyst carrying palladium Pd or cerium Ce is used as the TW catalyst 8a. In particular, a TW catalyst carrying palladium Pd can also enhance a HC purifying efficiency, when the exhaust air-fuel ratio of the inflowing exhaust gas is rich. Further, note that a TW catalyst carrying rhodium Rh suppresses an $NH_3$ synthesizing therein, and a TW catalyst without rhodium Rh is desired used as the TW catalyst 8a.

On the other hand, in the embodiment shown in FIG. 1, the exhaust gas purifying catalyst 10 is consisted of an $NH_3$ adsorbing and oxidizing catalyst 10a, which is simply expressed as a $NH_3$-AO catalyst. The $NH_3$-AO catalyst 10a is comprised of a so-called zeolite denitration catalyst, such as zeolite carrying copper Cu thereon, zeolite carrying copper Cu and platinum Pt thereon, and zeolite carrying iron Fe thereon, which is carried on a surface of a substrate. Alternatively, the $NH_3$-AO catalyst 10a is comprised of solid acid such as zeolite, silica, silica-alumina, and titania, carrying the transition metals such as iron Fe and copper Cu or precious metals such as palladium Pd, platinum Pt and rhodium Rh.

It is considered that the $NH_3$-AO catalyst 10a adsorbs $NH_3$ in the inflowing exhaust gas, and desorbs the adsorbed $NH_3$ when the $NH_3$ concentration in the inflowing exhaust gas becomes lower, or when the inflowing exhaust gas includes $NO_x$. At this time, it is considered that, if the $NH_3$-AO catalyst 10a is under the oxidizing atmosphere, that is, if the exhaust gas air-fuel ratio of the inflowing exhaust gas is lean, the $NH_3$-AO catalyst 10a oxidizes all of $NH_3$ desorbed therefrom. Also, it is considered that, if the inflowing exhaust gas includes both of $NH_3$ and $NO_x$, the $NH_3$-AO catalyst 10a oxidizes $NH_3$ by $NO_x$. In these cases, the $NH_3$ oxidizing function has a portion which has been unclear, but it can be considered that the $NH_3$ oxidation occurs according to the following reactions (7) to (10), that is:

$$4NH_3 + 7O_2 \rightarrow 4NO_2 + 6H_2O \quad (7)$$

$$4NH_3 + 5O_2 \rightarrow 4NO + 6H_2O \quad (8)$$

$$8NH_3 + 6NO_2 \rightarrow 12H_2O + 7N_2 \quad (9)$$

$$4NH_3 + 4NO + O_2 \rightarrow 6H_2O + 4N_2 \quad (10)$$

The reactions (9) and (10), which are denitration, reduce both of $NO_x$ produced in the oxidation reactions (7) and (8), and $NO_x$ in the exhaust gas flowing in the $NH_3$-AO catalyst 10a.

It has been found, by experiment, that the $NH_3$-AO catalyst 10a of this embodiment performs good oxidation and denitration when the temperature of the inflowing exhaust gas is about 300 to 500° C. On the other hand, in general, the temperature of the exhaust gas passing through the muffler 11 is about 300 to 500° C. Therefore, in this embodiment, the $NH_3$-AO catalyst 10a is arranged in the muffler 11 to thereby ensure the good performance of the $NH_3$-AO catalyst 10a.

The $NH_3$ purifying catalyst 12 is comprised of transition metals such as iron Fe and copper Cu, or precious metals such as palladium Pd, platinum Pt, and rhodium Rh, carried on a layer of, for example, alumina, formed on a surface of a substrate. The $NH_3$ purifying catalyst 12 purifies or resolves $NH_3$ in the inflowing exhaust gas, if the catalyst 12 is under the oxidizing atmosphere, that is, if the exhaust gas air-fuel ratio of the inflowing exhaust gas is lean. In this case, it is considered that the oxidation and denitration reactions (7) to (10) mentioned above occur in the catalyst 12 and thereby $NH_3$ is purified or resolved. In this embodiment, basically, the $NH_3$ amount exhausted from the $NH_3$-AO catalyst 10a is kept zero, but the $NH_3$ purifying catalyst 12 prevents $NH_3$ from being emitted to the ambient air, even if $NH_3$ is discharged from the $NH_3$-AO catalyst 10a without being purified.

In the engine shown in FIG. 1, the fuel injection time TAU is calculated using the following equation:

$$TAU = TB \cdot ((A/F)S/(A/F)T) \cdot FAF$$

TB represents a basic fuel injection time suitable for making the engine air-fuel ratio of each cylinder equal to the stoichiometric air-fuel ratio (A/F)S, and is calculated using the following equation:

$$TB = (Q/N) \cdot K$$

where Q represents the intake air amount, N represents the engine speed, and K represents a constant. Accordingly, the basic fuel injection time TB is a product of an intake air amount per unit engine speed, and the constant.

(A/F)T represents a target value for the control of the engine air-fuel ratio. When the target value (A/F)T is made larger to make the engine air-fuel ratio lean with respect to the stoichiometric air-fuel ratio, the fuel injection time TAU is made shorter and thereby the fuel amount to be injected is decreased. When the target value (A/F)T is made smaller to make the engine air-fuel ratio rich with respect to the stoichiometric air-fuel ratio, the fuel injection time TAU is made longer and thereby the fuel amount to be injected is increased.

FAF represents a feedback correction coefficient for making the actual engine air-fuel ratio equal to the target value (A/F)T. The feedback correction coefficient FAF is determined on the basis of the output signals from the upstream side air-fuel ratio sensor 29a, mainly. The exhaust gas air-fuel ratio of the exhaust gas flowing through the exhaust manifold 7 and detected by the upstream side air-fuel ratio sensor 29a conforms to the engine air-fuel ratio. When the exhaust gas air-fuel ratio detected by the upstream side sensor 29a is lean with respect to the target value (A/F)T, the feedback correction coefficient FAF is made larger and thereby the fuel amount to be injected is increased. When the exhaust gas air-fuel ratio detected by the sensor 29a is rich with respect to the target value (A/F)T, FAF is made smaller and thereby the fuel amount to be injected is decreased. In this way, the actual engine air-fuel ratio is made equal to the target value (A/F)T. Note that the feedback correction coefficient FAF fluctuates around 1.0.

Contrarily, the downstream side air-fuel ratio sensor 29b is for compensating for the deviation of the engine air-fuel ratio from the target value (A/F)T due to the deterioration of the upstream side sensor 29a. For the upstream side and the downstream side sensors 29a and 29b, an air-fuel ratio sensor generating an output voltage which corresponds to the exhaust gas air-fuel ratio over a broader range of the exhaust gas air-fuel ratio may be used, while a Z-output type oxygen concentration sensor, of which an output voltage varies drastically when the detecting exhaust gas air-fuel ratio increases or decreases across the stoichiometric air-fuel ratio, may also be used. Note that the downstream side sensor 29b may be arranged in the exhaust passage between the exhaust gas purifying catalyst 10 and the secondary air supplying device 14, alternatively. Further, the deterioration of the catalyst(s) located between the two sensors 29a and 29b may be detected on the basis of the output signals from the sensors 29a and 29b.

In the engine shown in FIG. 1, there is no device for supplying secondary fuel or secondary air in the exhaust passage, other than the secondary air supplying device 14. Thus, the engine air-fuel ratio in the exhaust passage upstream of the secondary air supplying device 14 conforms to the engine air-fuel ratio. In other words, the exhaust gas air-fuel ratio of the exhaust gas flowing in the TW catalyst 8a conforms to the engine air-fuel ratio, and the exhaust gas air-fuel ratio of the exhaust gas flowing in the exhaust gas purifying catalyst 10 also conforms to the engine air-fuel ratio. Contrarily, in the exhaust passage downstream of the secondary air supplying device 14, the exhaust gas air-fuel ratio conforms to the engine air-fuel ratio when the supply of the secondary air is stopped, and is made lean with respect to the engine air-fuel ratio when the secondary air is supplied.

Figure 3:
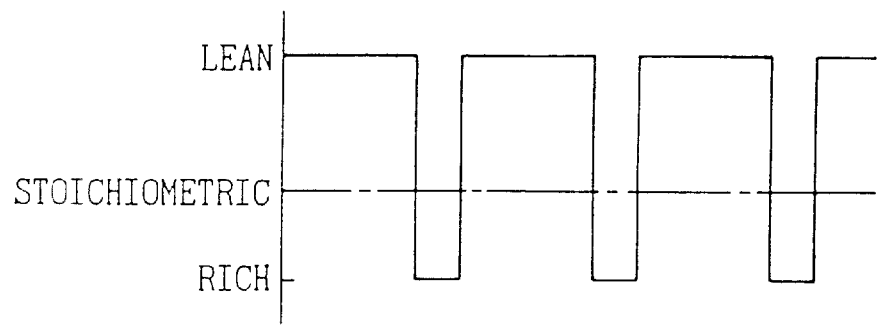
FIG. 3 schematically illustrates a method for purifying the exhaust gas according to the present invention.

Next, the exhaust gas purifying method in the engine shown in FIG. 1 will be explained with reference to FIGS. 3, 4A, and 4B.

In the engine shown in FIG. 1, an exhaust gas portion of which the exhaust gas air-fuel ratio is lean, and an exhaust gas portion of which the exhaust gas air-fuel ratio is rich, are formed from the exhaust gas of the engine 1, alternately and repeatedly. Then, the exhaust gas portions are introduced to, in turn, the TW catalyst 8a, the exhaust gas purifying catalyst 10, and the $NH_3$ purifying catalyst 12. In other words, the exhaust gas air-fuel ratio of the exhaust gas flowing the catalysts 8a and 10a is made lean and rich alternately and repeatedly, as shown in FIG. 3. When the exhaust gas air-fuel ratio of the inflowing exhaust gas is made rich, the TW catalyst 8a converts $NO_x$ in the inflowing exhaust gas to $NH_3$ or $N_2$, as shown in FIG. 4A, according to the above-mentioned reactions (1) and (2). The $NH_3$ synthesized in the TW catalyst 8a then flows into the $NH_3$-AO catalyst 10a. At this time, the concentration of $NH_3$ in the inflowing exhaust gas is relatively high, and thus almost all of $NH_3$ in the inflowing exhaust gas is adsorbed in the $NH_3$-AO catalyst 10a. Even though $NH_3$ flows out the $NH_3$-AO catalyst 10a without being adsorbed, the $NH_3$ then flows into the $NH_3$ purifying catalyst 12 and is purified or oxidized, because the catalyst 12 is kept under the oxidizing atmosphere by the secondary air supplying device 14. In this way, $NH_3$ is prevented from being emitted to the ambient air.

Contrarily, when the exhaust gas air-fuel ratio of the inflowing exhaust gas is made lean, the TW catalyst 8a passes the inflowing $NO_x$ therethrough, as shown in FIG. 4B, and the $NO_x$ then flows into the $NH_3$-AO catalyst 10a. At this time, the $NH_3$ concentration in the inflowing exhaust gas is substantially zero, and thus $NH_3$ is desorbed from the $NH_3$-AO catalyst 10a. At this time, the $NH_3$-AO catalyst 10a is under the oxidizing atmosphere, and thus the desorbed $NH_3$ acts as a reducing agent, and reduces and purifies $NO_x$ in the inflowing exhaust gas, according to the above-mentioned reactions (7) to (10) Note that, even if the $NH_3$ amount desorbed from the $NH_3$-AO catalyst 10a exceeds over the amount required for reducing the inflowing $NO_x$, the excess $NH_3$ is purified or resolved in the $NH_3$-AO catalyst 10a or the $NH_3$ purifying catalyst 12. Accordingly, $NH_3$ is prevented from being emitted to the ambient air. Note that, in this case, the secondary air is unnecessary.

As mentioned above, $NO_x$ exhausted from the engine is reduced to $N_2$ or adsorbed in the $NH_3$-AO catalyst 10a in the form of $NH_3$ when the exhaust gas air-fuel ratio of the exhaust gas flowing into the catalysts 8a and 10a is rich, and is reduced to $N_2$ by $NH_3$ desorbed from the $NH_3$-AO catalyst 10a when the exhaust gas air-fuel ratio of the exhaust gas flowing into the catalysts 8a and 10a is lean. Accordingly, $NO_x$ is prevented from being emitted to the ambient air, regardless whether the exhaust gas air-fuel ratio of the exhaust gas flowing into the catalysts 8a and 10a is rich or lean.

Note that, as mentioned above, it is desired that the $NH_3$ purifying catalyst 12 is kept under the oxidizing atmosphere to ensure good $NH_3$ purification. In this embodiment, the secondary air supplying device 14 supplies the secondary air to make the exhaust gas air-fuel ratio of the exhaust gas flowing into the $NH_3$ purifying catalyst 12 equal to about 15.3($\lambda$=1.05).

As long as the exhaust gas air-fuel ratio of the exhaust gas flowing into the TW catalyst 8a is kept lean, unburned hydrocarbon HC and/or carbon monoxide, etc. in the inflowing exhaust gas are oxidized and purified at the TW catalyst 8a. Contrarily, when the exhaust gas air-fuel ratio of the inflowing exhaust gas is rich, there may be the case where the HC and/or the CO passes through the TW catalyst 8a and the $NH_3$-AO catalyst 10a. However, the HC and/or the CO then flows into the $NH_3$ purifying catalyst 12 and are oxidized and purified sufficiently, because the catalyst 12 is kept under the oxidizing atmosphere, as mentioned above.

To form the exhaust gas portions of which the exhaust gas air-fuel ratios are lean and rich respectively, there may be provided a secondary air supplying device for supplying the secondary air in, for example, the exhaust manifold 7. In this case, while the engine air-fuel ratio is kept rich, the supply of the secondary air is stopped to thereby form the exhaust gas portion of which exhaust gas air-fuel ratio is rich, and the secondary air is supplied to thereby form the exhaust gas portion of which exhaust gas air-fuel ratio is lean. Or, there may be provided a secondary fuel supplying device for supplying the secondary fuel in, for example, the exhaust manifold 7. In this case, while the engine air-fuel ratio is kept lean, the supply of the secondary fuel is stopped to thereby form the exhaust gas portion of which exhaust gas air-fuel ratio is lean, and the secondary fuel is supplied to thereby form the exhaust gas portion of which exhaust gas air-fuel ratio is rich.

However, as mentioned above, the exhaust gas air-fuel ratio of the exhaust gas flowing into the catalysts 8a and 10a conforms to the engine air-fuel ratio, in the engine shown in FIG. 1. Therefore, the engine air-fuel ratio is controlled to be lean and rich alternately and repeatedly to thereby make the exhaust gas air-fuel ratio of the exhaust gas flowing into the catalysts 8a and 10a lean and rich alternately and repeatedly. Namely, the engine 1 operates in a lean engine operation in which the engine air-fuel ratio is lean to thereby make the exhaust gas air-fuel ratio of the exhaust gas flowing into the catalysts 8a and 10a lean, and the engine 1 operates in a rich engine operation in which the engine air-fuel ratio is rich to thereby make the exhaust gas air-fuel ratio of the exhaust gas flowing into the catalysts 8a and 10a rich, and the engine 1 operates in the lean and rich engine operations alternately and repeatedly.

In other words, $NO_x$ exhausted from the engine 1 is purified sufficiently and is prevented from being emitted to the ambient air, by the engine operating the lean and rich engine operations alternately and repeatedly.

If a target value of the exhaust gas air-fuel ratio of the exhaust gas flowing into the catalysts 8a and 10a is referred to as a target air-fuel ratio (A/F)T, the actual exhaust gas air-fuel ratio of the exhaust gas flowing into the catalysts 8a and 10a is made equal to the target air-fuel ratio (A/F)T, by making the target value of the engine air-fuel ratio equal to the target air-fuel ratio (A/F)T. Therefore, in the embodiment, the target value of the engine air-fuel ratio is conformed to the target air-fuel ratio (A/F)T. The target air-fuel ratio (A/F)T is made equal to a lean air-fuel ratio (A/F)L which is lean with respect to the stoichiometric air-fuel ratio (A/F)S, and equal to a rich air-fuel ratio (A/F)R which is rich with respect to the stoichiometric air-fuel ratio (A/F)S, alternately and repeatedly, to thereby make the exhaust gas air-fuel ratio of the exhaust gas flowing into the catalysts 8a and 10a lean and rich alternately and repeatedly. Note that, if an engine operation period during which the engine performs the lean engine operation is referred as a lean operation period TL, and if an engine operation period during which the engine performs the rich engine operation is referred as a rich operation period TR, one lean operation period TL and one rich operation period TR, next to each other, form a cycle.

The lean air-fuel ratio (A/F)L and the rich air-fuel ratio (A/F)R may be determined in accordance with the engine operating condition, respectively. However, in the present embodiment, the lean air-fuel ratio (A/F)L is set constant at about 25.0, and the rich air-fuel ratio (A/F)R is set constant at about 13.8, regardless the engine operating condition. Therefore, the target air-fuel ratio (A/F)T is made equal to about 25.0 when the lean engine operation is to be performed, and is made equal to about 13.8 when the rich engine operation is to be performed.

If the air-fuel mixture spreading over the entire combustion chamber uniformly is formed when the engine air-fuel ratio is very lean, such as 25.0, the spark plug 15 cannot ignite the air-fuel mixture, because the air-fuel mixture is very thin, and misfiring may occur. To solve this, in the engine shown in FIG. 1, an ignitable air-fuel mixture is formed in a restricted region in the combustion chamber and the reminder is filled with only the air or only the air and the EGR gas, and the air-fuel mixture is ignited by the spark plug 15, when the lean engine operation is to be performed. This prevents the engine from misfiring, even though the engine air-fuel ratio is very lean. Alternatively, the misfiring may be prevented by forming the swirl flow in the combustion chamber, while forming the uniform air-fuel mixture in the combustion chamber.

As mentioned at the beginning, a lower fuel consumption rate is desired, and thus it is desired to make the lean operation period TL as long as possible, and to make the rich operation period TR as short as possible. In particular, it is preferable that TL/TR is equal to or larger than 3, for the lesser fuel consumption rate. However, as the lean operation period TL becomes longer, the $NH_3$ amount desorbed from the $NH_3$-AO catalyst 10a becomes smaller. Thus, a longer lean operation period TL may lead to a lack of $NH_3$ for purifying $NO_x$ in the $NH_3$-AO catalyst 10a, and to the emit $NO_x$ to the ambient air without reduction. To solve this, in this embodiment, an $NH_3$ amount adsorbed in the $NH_3$-AO catalyst 10a S($NH_3$) is obtained by obtaining an $NH_3$ amount desorbed from the $NH_3$-AO catalyst 10a during the lean engine operation, and the lean engine operation is stopped and the rich engine operation starts when the adsorbed $NH_3$ amount S($NH_3$) becomes smaller than a predetermined minimum amount MIN($NH_3$). This prevents $NO_x$ flowing into the $NH_3$-AO catalyst 10a from being emitted to the ambient air without being reduced.

On the other hand, the shorter rich operation period is preferable. However, if the rich operation period TR is made too short, the adsorbed $NH_3$ amount S($NH_3$) may be smaller than that required for the sufficient reduction of $NO_x$, and thereby $NO_x$ may be discharged without being reduced when the $NO_x$ amount inflowing the $NH_3$-AO catalyst 10a increases drastically. Further, too short a rich operation period may lead to frequent changes in the target air-fuel ratio (A/F)T between the lean and rich air-fuel ratios, and thus an undesired deterioration of the drivability may occur. However, if the rich operation period TR becomes longer, the $NH_3$-AO catalyst 10a is saturated with $NH_3$, and a large amount of $NH_3$ is discharged therefrom. To solve this, in this embodiment, the $NH_3$ amount adsorbed in the $NH_3$-AO catalyst 10a during the rich engine operation is obtained to thereby obtain the adsorbed $NH_3$ amount S($NH_3$), and the rich engine operation is stopped and the lean engine operation is started when the adsorbed $NH_3$ amount S($NH_3$) becomes larger than a maximum amount MAX($NO_x$), which is determined in accordance with the adsorbing capacity of the $NH_3$-AO catalyst 10a. In this way, the lean and the rich operation periods TL and TR are determined in accordance with the adsorbed $NH_3$ amount S($NH_3$) of the $NH_3$-AO catalyst 10a, in the present embodiment.

It is difficult to directly find the adsorbed $NH_3$ amount in the $NH_3$-AO catalyst 10a. Therefore, in this embodiment, the adsorbed $NH_3$ amount is estimated on the basis of the $NH_3$ amount synthesized in the TW catalyst 8a or flowing into the $NH_3$-AO catalyst 10a. In this case, a sensor for detecting the $NH_3$ amount flowing into the $NH_3$-AO catalyst 10a may be arranged in the exhaust passage between the TW catalyst 8a and the $NH_3$-AO catalyst 10a. However, in the embodiment, considering the applicability, the synthesized $NH_3$ amount is estimated on the basis of the $NO_x$ amount flowing into the TW catalyst 8a, and then the adsorbed $NH_3$ amount is estimated on the basis of the synthesized $NH_3$ amount. That is, the synthesized $NH_3$ amount per unit time becomes larger as the $NO_x$ amount flowing into the TW catalyst 8a per unit time becomes larger. Also, the synthesized $NH_3$ amount per unit time becomes larger as the synthesizing efficiency ETA becomes higher.

On the other hand, the $NO_x$ amount exhausted from the engine per unit time becomes larger as the engine speed N becomes higher, and thus the $NO_x$ amount flowing into the TW catalyst 8a per unit time becomes larger. Also, the exhaust gas amount exhausted from the engine becomes larger and the combustion temperature becomes higher as the engine load Q/N (the intake air amount Q/the engine speed N) becomes higher, and thus the $NO_x$ amount flowing into the TW catalyst 8a per unit becomes larger as the engine load Q/N becomes higher.

Figure 6A:
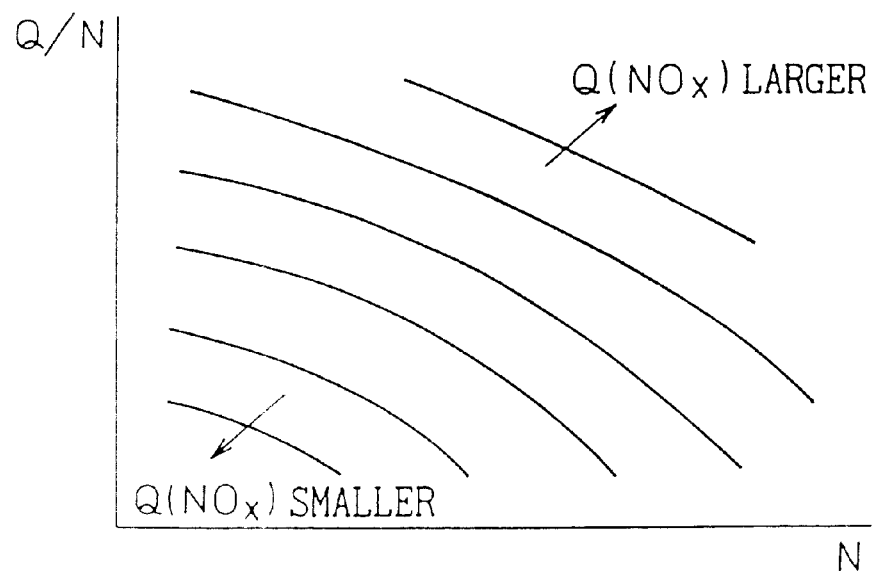
FIGS. 6A and 6B are diagrams illustrating the $NO_x$ amount exhausted from the engine per unit time.
Figure 6B:
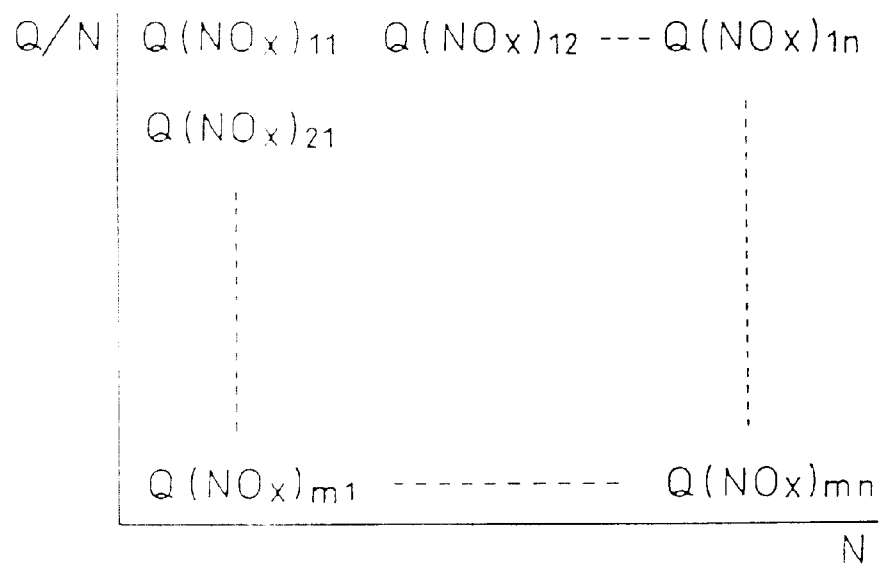

FIG. 6A illustrates the relationships, obtained by experiments, between the $NO_x$ amount exhausted from the engine per unit time Q($NO_x$), the engine load Q/N, and the engine speed N, with a constant lean or rich air-fuel ratio (A/F)L or (A/F)R. In FIG. 6A, the curves show the identical $NO_x$ amount. As shown in FIG. 6A, the exhausted $NO_x$ amount Q($NO_x$) becomes larger as the engine load Q/N becomes higher, and as the engine speed N becomes higher. Note that the exhausted $NO_x$ amount Q($NO_x$) is stored in the ROM 22 in advance in the form of a map as shown in FIG. 6B.

Figure 7:
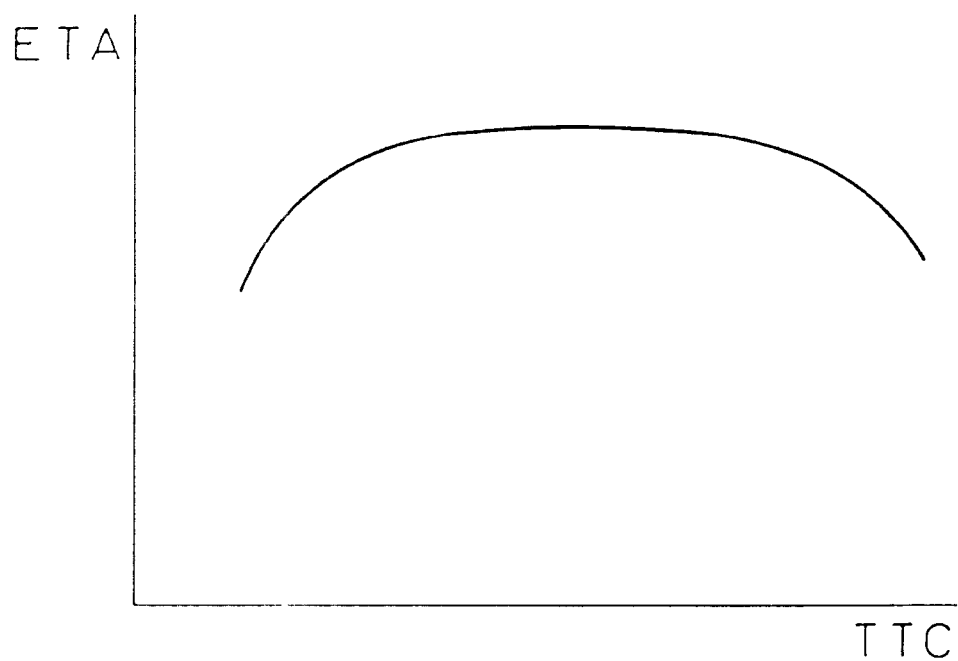
FIG. 7 is a diagram illustrating the $NH_3$ synthesizing efficiency of the $NH_3$ synthesizing catalyst.

The synthesizing efficiency ETA varies in accordance with the temperature TTC of the exhaust gas flowing into the TW catalyst 8a, which represents the temperature of the TW catalyst 8a. That is, as shown in FIG. 7, the synthesizing efficiency ETA becomes higher as the exhaust gas temperature TTC becomes higher when TTC is low, and becomes lower as TTC becomes higher when TTC is high, with the constant rich air-fuel ratio (A/F)R. The synthesizing efficiency ETA is stored in the ROM 22 in advance in the form of a map as shown in FIG. 7.

Note that the exhausted $NO_x$ amount from the engine per unit time Q($NO_x$) varies in accordance with the engine air-fuel ratio, as described above with reference to FIG. 2B. Therefore, if the lean or rich air-fuel ratio (A/F)L, (A/F)R is changed in accordance with, for example, the engine operating condition, the exhausted $NO_x$ amount Q($NO_x$) obtained by the map shown in FIG. 6B must be corrected on the basis of the actual lean or rich air-fuel ratio (A/F)L, (A/F)R. Further, the synthesizing efficiency ETA also varies in accordance with the exhaust gas air-fuel ratio of the exhaust gas flowing into the TW catalyst 8a, that is, the rich air-fuel ratio (A/F)R, as shown in FIG. 2A. Therefore, if the rich air-fuel ratio (A/F)R is changed in accordance with, for example, the engine operating condition, the synthesizing efficiency ETA obtained by the map shown in FIG. 7 is also required to be corrected on the basis of the actual rich air-fuel ratio (A/F)R.

The product of Q($NO_x$) calculated using the engine load Q/N and the engine speed N and the synthesizing efficiency ETA calculated using the exhaust gas temperature TTC represents the $NH_3$ amount flowing into the $NH_3$-AO catalyst 10a per unit time. Accordingly, during the rich engine operation, the $NH_3$ amount adsorbed in the $NH_3$-AO catalyst 10a is calculated using the following equation:

$$S(NH_3)=S(NH_3)+Q(NO_x) \cdot ETA \cdot DELTAa$$

where DELTAa represents the time interval of calculation of $Q(NO_x)$ and ETA. Thus, $Q(NO_x) \cdot ETA \cdot DELTAa$ represents the $NH_3$ amount adsorbed in the $NH_3$-AO catalyst 10a from the last calculation of $Q(NO_x)$ and ETA until the present calculation.

Figure 8A:
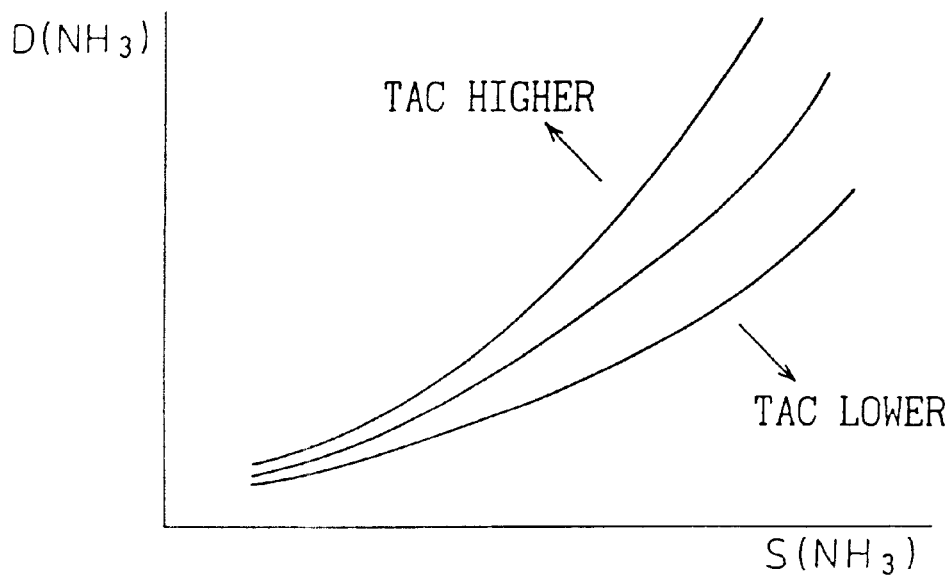
FIGS. 8A and 8B are diagrams illustrating the $NH_3$ amount desorbed from the $NH_3$ adsorbing and oxidizing catalyst per unit time.
Figure 8B:
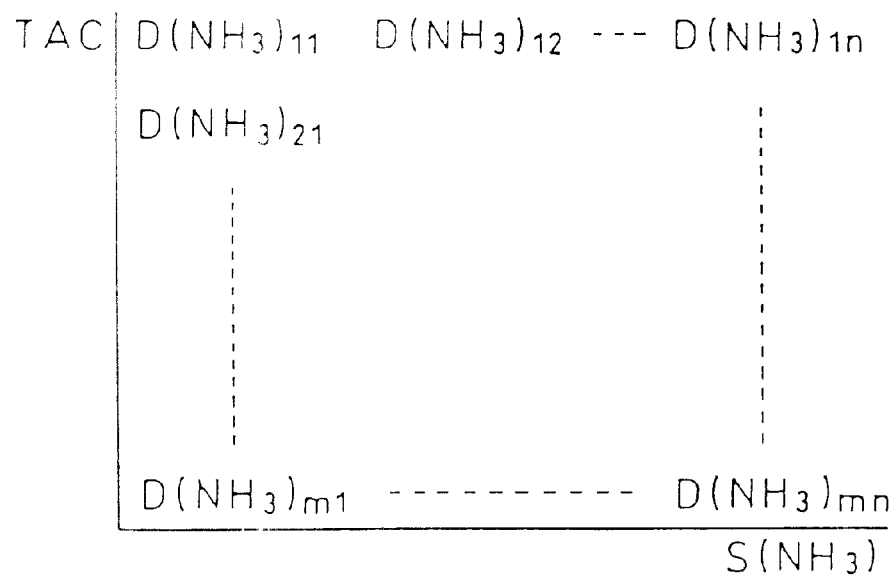

FIG. 8A illustrates the $NH_3$ amount $D(NH_3)$ desorbed from the $NH_3$-AO catalyst 10a per unit time, when the exhaust gas air-fuel ratio of the exhaust gas flowing into the $NH_3$-AO catalyst 10a is changed from rich to lean, obtained by experiment. In FIG. 8A, the curves show the identical desorbed $NH_3$ amount. As shown in FIG. 8A, the desorbed $NH_3$ amount $D(NH_3)$ becomes larger as the adsorbed $NH_3$ amount $S(NH_3)$ becomes larger. Also, $D(NH_3)$ becomes larger as the temperature TAC of the exhaust gas flowing into the $NH_3$-AO catalyst 10a, which represents the temperature of the $NH_3$-AO catalyst 10a, becomes higher. The desorbed $NH_3$ amount $D(NH_3)$ is stored in the ROM 22 in advance in the form of a map as shown in FIG. 8B.

Accordingly, during the lean engine operation, the adsorbed $NH_3$ amount $S(NH_3)$ is calculated using the following equation:

$$S(NH_3)=S(NH_3)-D(NH_3) \cdot DELTAd$$

where DELTAd represents the time interval of the calculation of $D(NH_3)$, and thus $D(NH_3) \cdot DELTAd$ in represents the $NH_3$ amount desorbed from the $NH_3$-AO catalyst 10a, from the last calculation of $D(NH_3)$ until the present calculation.

Figure 9A:
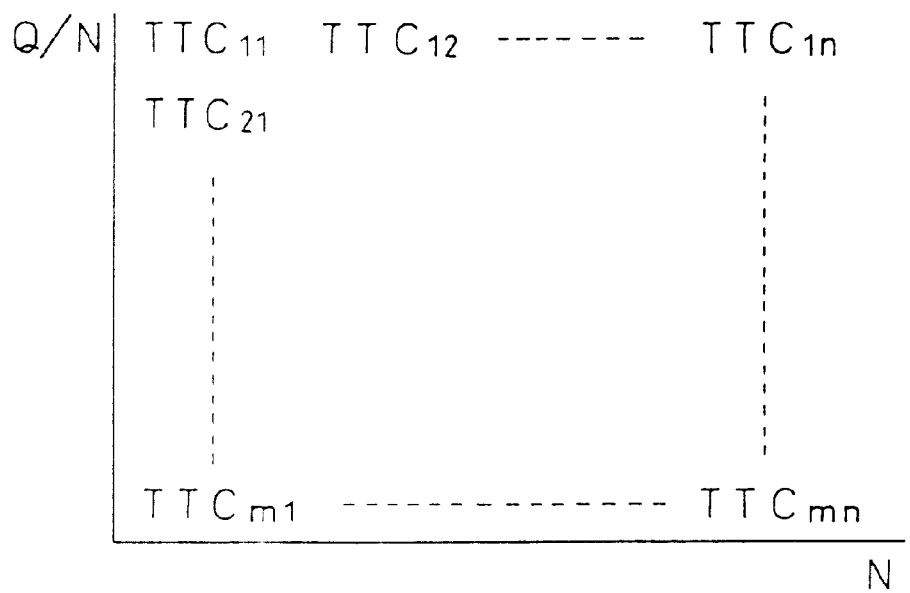
FIGS. 9A and 9B are diagrams illustrating the temperatures of the exhaust gas.
Figure 9B:
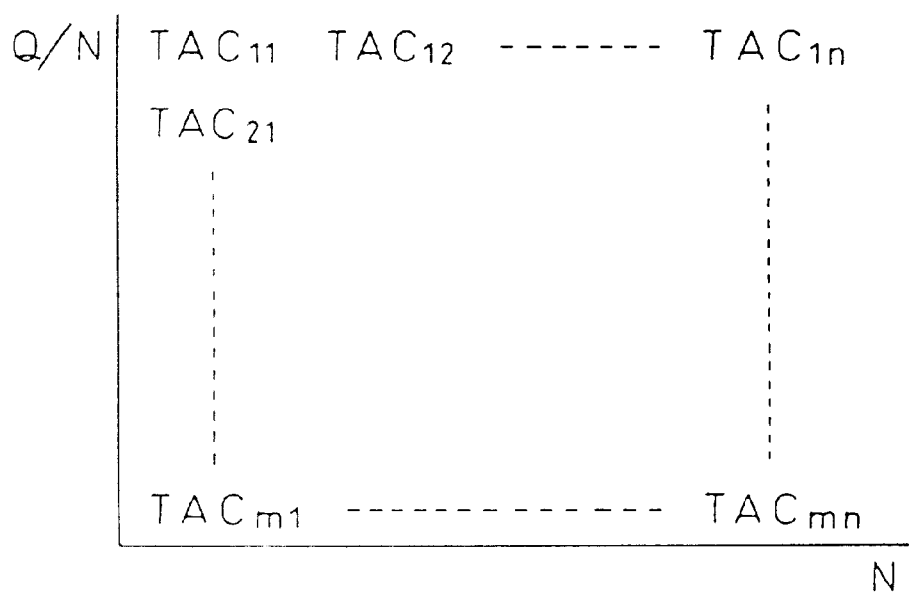

To obtain the temperature TTC of the exhaust gas flowing into the TW catalyst 8a, and the temperature TAC of the exhaust gas flowing into the $NH_3$-AO catalyst 10a, temperature sensors may be arranged in the exhaust passage directly upstream of the TW catalyst 8a and directly upstream of the $NH_3$-AO catalyst 10a, respectively. However, the exhaust gas temperatures can be estimated on the basis of the engine operating condition, that is, the engine load Q/N and the engine speed N. Thus, in the engine shown in FIG. 1, TTC and TAC are stored in the ROM 22 in advance in the form of a map as shown in FIGS. 9A and 9B. ETA and $D(NH_3)$ are calculated using TTC and TAC obtained from the maps shown in FIGS. 9A and 9B.

In this embodiment, one lean operation period TL is performed for several minutes, and one rich operation period is performed for several seconds, for example. Therefore, in this embodiment, the engine 1 performs the lean engine operation basically, and performs the rich engine operation temporarily. In this case, a plurality of cylinders perform the lean engine operation during the lean engine operation, and a plurality of cylinders perform the rich engine operation during the rich engine operation. Note that the lean and the rich operation periods may be predetermined as a time. Further, alternatively, first, the total $NO_x$ amount flowing into the $NH_3$-AO catalyst 10a during the lean engine operation may be found, and the lean operation period TL may be set so that the total inflowing $NO_x$ amount does not exceed a $NO_x$ amount which $NH_3$ adsorbed in the $NH_3$-AO catalyst 10a can purify.

Next, the control of the ignition timing in the engine shown in FIG. 1 will be explained with reference to FIG. 5.

In the engine shown in FIG. 1, the ignition timing IT in the lean engine operation is made ITL which provides, for example, the suitable output torque of the engine. On the contrary, the ignition timing IT in the rich engine operation is made ITR which is retarded with respect to the ignition timing ITL. Retarding the ignition timing suppresses the increase of the output torque, and thereby suppresses the undesired fluctuation in the output torque when the engine performs the lean and rich engine operations alternately and repeatedly. Further, retarding the ignition timing increases the temperature of the exhaust gas flowing into the TW catalyst 8a, and thereby the synthesized $NH_3$ amount is kept larger. As a result, the $NH_3$ amount for purifying $NO_x$ increases without extending the rich operation period TR. Note that the ignition timing in the lean engine operation ITL is set in accordance with the engine operating condition, such as the lean air-fuel ratio (A/F)L. Also, the ignition timing in the rich engine operation ITR is set in accordance with the engine operating condition, such as the rich air-fuel ratio (A/F)R and the ignition timing ITL.

Figure 10:
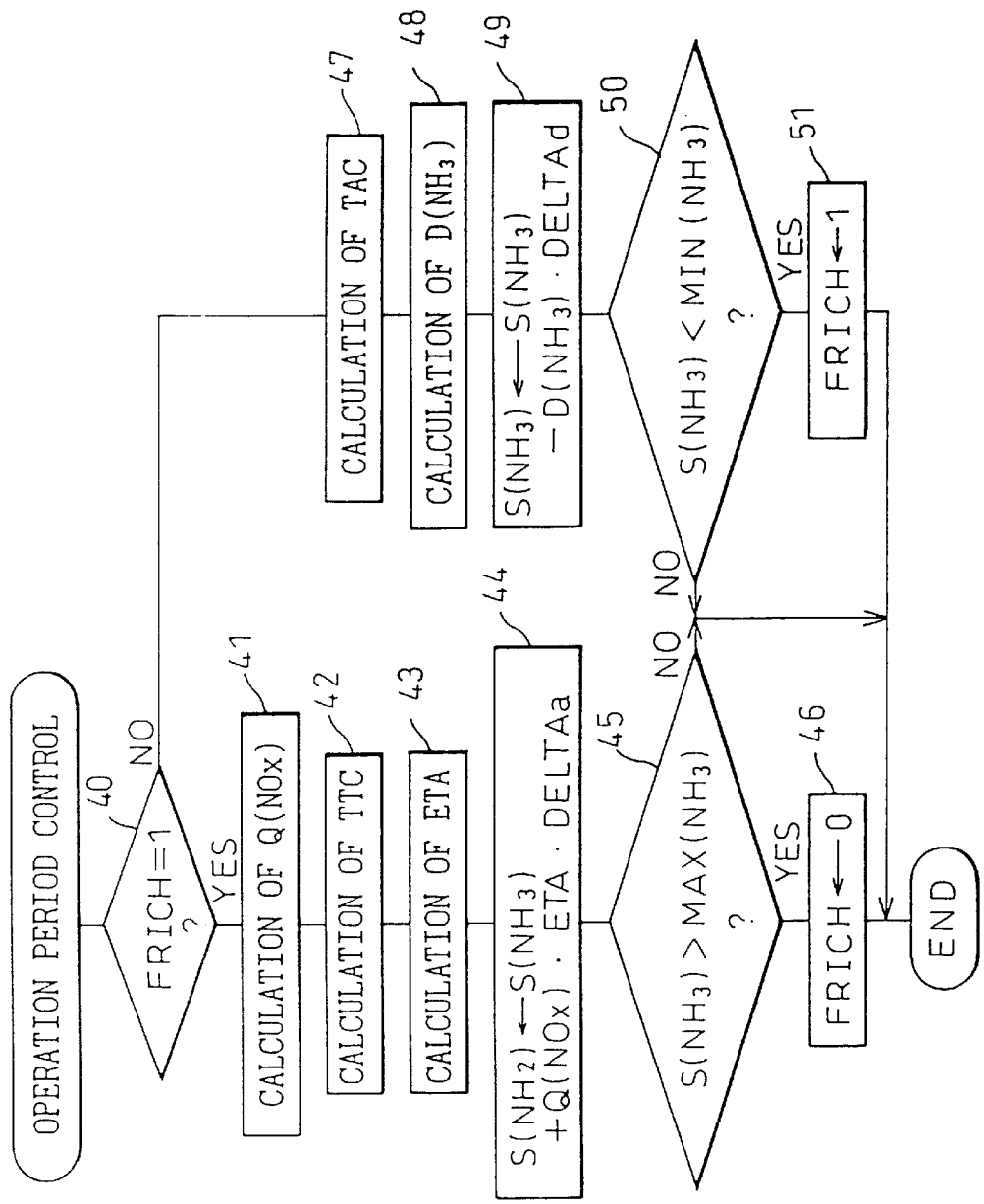
FIG. 10 is a flow chart for controlling the engine operation period.
Figure 11:
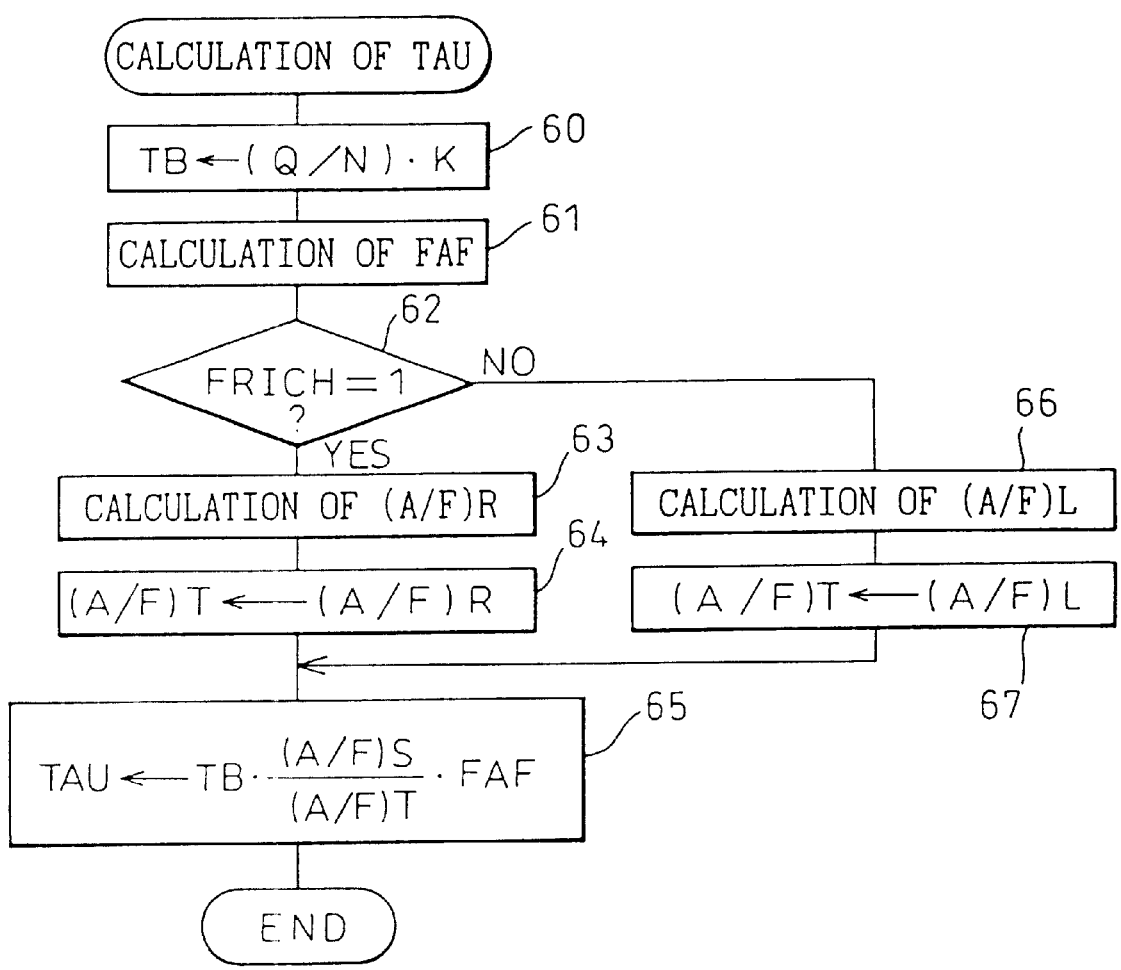
FIG. 11 is a flow chart for calculating the fuel injection time.
Figure 12:
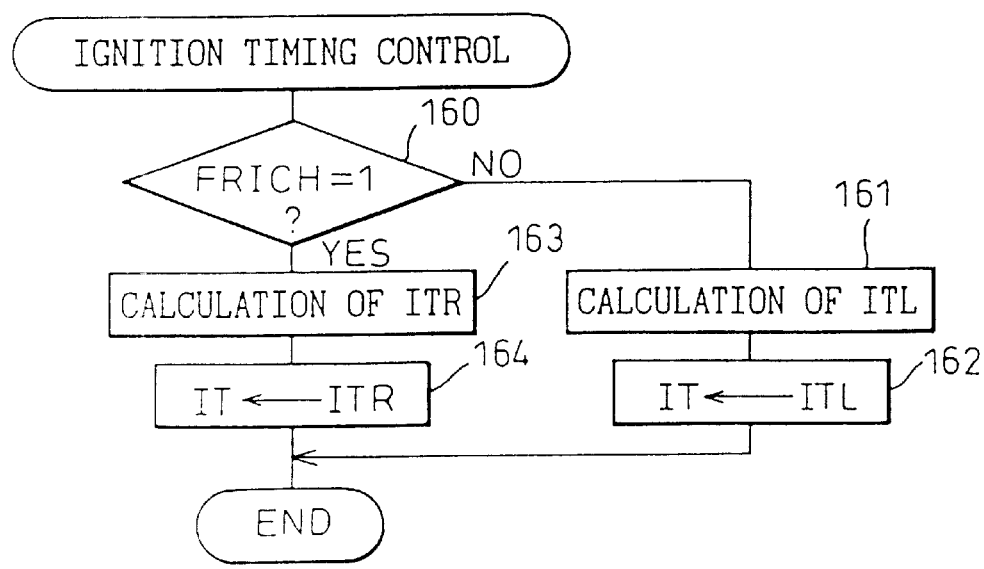
FIG. 12 is a flow chart for controlling the ignition timing.

FIGS. 10 to 12 illustrate routines for executing the above-mentioned embodiment. Each routine is executed by interruption every predetermined crank angle.

FIG. 10 illustrates a routines for executing the control of the engine operation periods.

Referring to FIG. 10, first, in step 40, it is judged whether FRICH is made 1. FRICH is made 1 when the rich operation is to be performed, and is made zero when the lean operation is to be performed. If FRICH is 1, that is, if the rich operation is to be performed, the routine goes to step 41, where the exhausted $NO_x$ amount $Q(NO_x)$ is calculated using the map shown in FIG. 6B on the basis of the engine load Q/N and the engine speed N. In the following step 42, the exhaust gas temperature TTC is calculated using the map shown in FIG. 9A. In the following step 43, the $NH_3$ synthesizing efficiency ETA is calculated using the map shown in FIG. 7 on the basis of the exhaust gas temperature TTC. In the following step 44, the adsorbed $NH_3$ amount $S(NH_3)$ is calculated using the following equation:

$$S(NH_3)=S(NH_3)+Q(NO_x) \cdot ETA \cdot DELTAa$$

where DELTAa is a time interval from the last processing cycle until the present processing cycle, and is obtained by, for example, a timer. In the following step 45, it is judged whether the adsorbed $NH_3$ amount $S(NH_3)$ is larger than the maximum amount $MAX(NH_3)$. If $S(NH_3) \leq MAX(NH_3)$, the processing cycle is ended. Namely, if $S(NH_3) \leq MAX(NH_3)$, the adsorbed $NH_3$ amount is judged to be too small to purify $NO_x$, and thus the rich operation is continuously performed.

If $S(NH_3)>MAX(NH_3)$, the routine goes to step 46, where FRICH is made zero, and then the processing cycle is ended. Namely, if $S(NH_3)>MAX(NH_3)$, the adsorbed $NH_3$ amount is sufficient to purify $NO_x$, and the rich operation is stopped and the lean operation starts (as at the time a, c, e, or g shown in FIG. 5). Accordingly, the rich operation period TR is a period from when FRICH is made 1 until $S(NH_3)>MAX(NH_3)$.

Contrarily, if FRICH=0 in step 40, that is, if the lean operation is to be performed, the routine goes to step 47, where the exhaust gas temperature TAC is calculated using the map shown in FIG. 9B. In the following step 48, the desorbed $NH_3$ amount $D(NH_3)$ is calculated using the map shown in FIG. 8B, on the basis of TAC and the present $S(NH_3)$. In the following step 49, the adsorbed $NH_3$ amount $S(NH_3)$ is calculated using the following equation:

$$S(NH_3)=S(NH_3)-D(NH_3) \cdot DELTAd$$

where DELTAd is a time interval from the last processing cycle until the present processing cycle. In the following step 50, it is judged whether the adsorbed $NH_3$ amount $S(NH_3)$ is smaller than the minimum amount $MIN(NH_3)$. If $S(NH_3) \geq MIN(NH_3)$, the processing cycle is ended. Namely, if $S(NH_3) \geq MIN(NH_3)$, the adsorbed $NH_3$ amount $S(NH_3)$ is judged to be still large to purify $NO_x$, and thus the lean operation is continued.

If $S(NH_3) < MIN(NH_3)$, the routine goes to step 51, FRICH is made 1 and the processing cycle is ended. Namely, if $S(NH_3) < MIN(NH_3)$, the adsorbed $NH_3$ amount is judged to be insufficient to purify $NO_x$, and thus the lean operation is stopped and the rich engine operation starts (as at the time b, d, or f shown in FIG. 5). Accordingly, the lean operation period TL is from when the FRICH is made zero until $S(NH_3) < MIN(NH_3)$.

FIG. 11 illustrates the routine for calculating the fuel injection time TAU.

Referring to FIG. 11, first, in step 60, the basic fuel injection time TB is calculated using the following equation, on the basis of the engine load Q/N and the engine speed N:

$$TB = (Q/N) \cdot K$$

In the following step 61, the feedback correction coefficient FAF is calculated. In the following step 62, it is judged whether FRICH, which is controlled in the routine shown in FIG. 10, is made 1. If FRICH=1, that is, if the rich operation is to be performed, the routine goes to step 63, where the rich air-fuel ratio (A/F)R is calculated. In this embodiment, the rich air-fuel ratio (A/F)R is kept constant at 13.8 regardless the engine operating condition, and thus the rich air-fuel ratio (A/F)R is made 13.8 in step 63. In the following step 64, the rich air-fuel ratio (A/F)R is memorized as the target air-fuel ratio (A/F)T. Next, the routine goes to step 65.

Contrarily, if FRICH is zero, that is, if the lean operation is to be performed, the routine goes to step 66, where the lean air-fuel ratio (A/F)L is calculated. In this embodiment, the lean air-fuel ratio (A/F)L is kept constant at 25.0 regardless the engine operating condition, and thus the lean air-fuel ratio (A/F)L is made 25.0 in step 66. In the following step 67, the lean air-fuel ratio (A/F)L is memorized as the target air-fuel ratio (A/F)T. Next, the routine goes to step 65.

In step 65, the fuel injection time TAU is calculated using the following equation:

$$TAU = TB \cdot ((A/F)S/(A/F)T) \cdot FAF$$

Each fuel injector 5 injects the fuel for the fuel injection time TAU.

FIG. 12 illustrates a routine for executing the control of the ignition timing.

Referring to FIG. 12, first, in step 160, it is judged whether FRICH, which is controlled in the routine shown in FIG. 10, is made zero. If FRICH=0, that is, if the lean operation is to be performed, the routine goes to step 161, where ITL is calculated in accordance with, for example, the engine operating condition. In the following step 162, ITL is memorized as the ignition timing IT. Then, the processing cycle is ended.

If FRICH=1 in step 160, that is, if the rich operation is to be performed, the routine goes to step 163, where ITR is calculated in accordance with, for example, ITL. In the following step 164, ITR is memorized as the ignition timing IT. Then, the processing cycle is ended. Each spark plug 15 performs the igniting operation in accordance with the ignition timing ITL or ITR.

In the embodiment mentioned above, the exhaust gas can be purified sufficiently using a single exhaust passage, that is, without providing a plurality of the exhaust passages. Accordingly, the structure of the exhaust gas purifying device is kept small and simple.

On the other hand, if a ratio of the number of the cylinders which performs the lean engine operation to the number of the cylinders which performs the rich engine operation in one cycle (see FIG. 5) is referred as a cylinder number ratio RATIO, it is desired to make the cylinder number ratio RATIO as large as possible, to thereby make the fuel consumption rate as small as possible. However, if a part of the cylinders performs the rich engine operation and the other performs the lean engine operation as in the prior art device mentioned at the beginning, the cylinder number ratio RATIO is limited. That is, in the four-cylinder engine, for example, the ratio RATIO is limited to 3 and cannot made larger than 3. Thus, the decrease of the fuel consumption rate is limited, with the identical lean and rich air-fuel ratio (A/F)L and (A/F)R. Contrarily, in the embodiment, the ratio RATIO is allowed to be made larger until the $NO_x$ amount flowing into the $NH_3$-AO catalyst 10a exceeds the $NH_3$ amount desorbed from the catalyst 10a. In particular, the cylinder number ratio RATIO is made larger than 3 in the four-cylinders engine. As a result, the fuel consumption rate is made more lower.

Further, if the first cylinder #1 continuously performs the rich operation and the second, third, and fourth cylinders #2, #3, #4 continuously perform the lean operation, for example, as in the prior art, a large temperature difference between the exhaust gases exhausted from the cylinders #1 to #4 may occur, and may lead a larger temperature drop in the engine body or in the exhaust manifold 7, to thereby lead to a large thermal distortion therein. Furthermore, in this example, a large amount of the deposition may exist in the first cylinder #1 which performs the rich operation continuously. Contrarily, in this embodiment, a cylinder in which the lean or rich operation is to be performed is not specified, that is, every cylinder performs both the lean and the rich operations. Accordingly, a large thermal distortion in the engine body or in the exhaust manifold 7 is prevented, and the large amount of the deposition on the particular cylinder is also prevented.

Additionally, the exhaust gas purifying method according to the present embodiment may be used in a single cylinder engine.

Next, another embodiment for determining the lean and the rich operation period TL, TR, in the engine shown in FIG. 1, will be explained.

In the above-mentioned embodiment, the lean and the rich operation period TL, TR are set in accordance with the adsorbed $NH_3$ amount $S(NH_3)$. As a result, the cylinder number ratio RATIO is set in accordance with the adsorbed $NH_3$ amount $S(NH_3)$. Contrarily, in this embodiment, a ratio RATIO suitable for purifying $NO_x$ for every engine operating condition is stored in advance, and the lean and the rich operation period TL and TR are set to make the actual cylinder number ratio equal to this suitable ratio RATIO.

Figure 13:
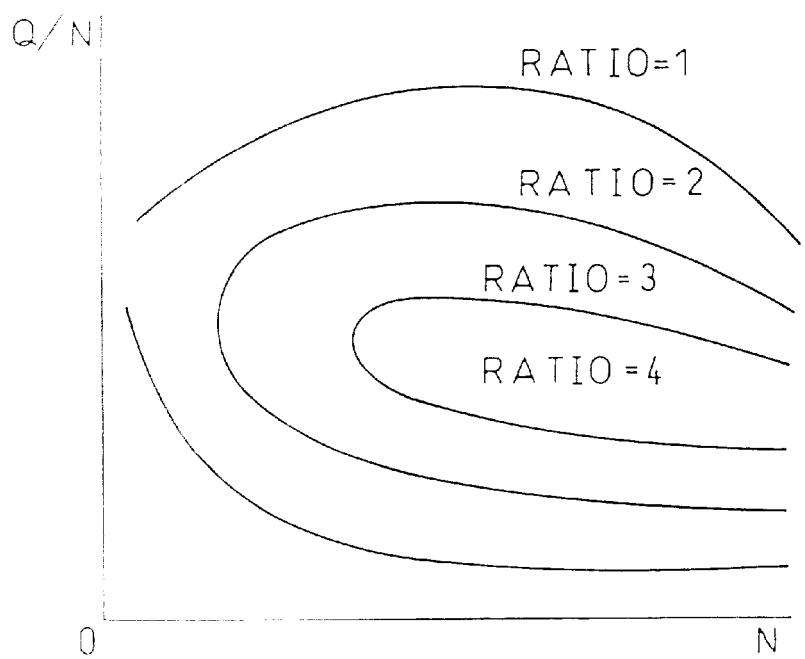
FIG. 13 is a diagram illustrating a cylinder number ratio.

In this embodiment, the ratio RATIO is one selected from 1, 2, 3, and 4. FIG. 13 shows the ratio RATIO suitable for purifying $NO_x$ for an engine operating condition defined by the engine load Q/N and the engine speed N. As shown in FIG. 13, the ratio RATIO becomes larger as the engine load Q/N become higher when the engine load Q/N is low, and becomes smaller as the engine load Q/N becomes higher when the engine load Q/N is high, with the constant engine speed N. The ratio RATIO is stored in the ROM 22 in advance in the form of a map as shown in FIG. 13.

For the ratio RATIO obtained from the map shown in FIG. 13, any method can be applied to set the number of the cylinders performing the lean engine operation and that performing the rich engine operation. In this embodiment, the number of the cylinder performing the rich engine operation is set to 1 regardless the ratio RATIO. As mentioned above, the ratio RATIO is a ratio of the number of the cylinders performing the lean engine operation to that performing the rich engine operation, in one cycle. Thus, the number of the cylinders performing the lean engine operation is made 1, 2, 3, and 4, for the ratio RATIO 1, 2, 3, and 4, respectively, with the number of cylinder performing the rich engine operation being 1. Next, the method for controlling the engine operation period will be explained in more detail, with reference to FIGS. 14 to 17.

In the engine shown in FIG. 1, the combustion stroke of one of the cylinders is in process whenever the crankshaft turns by about 180 degree. That is, the combustion strokes are in process repeatedly in the order of the first #1, the third #3, the fourth #4, and the second cylinder #2. In FIGS. 14 to 17, white and black circles represent the lean and the rich engine operations, respectively. FIG. 14 illustrates the case in which the ratio RATIO is made 1. In this case, the rich operation is performed in one cylinder, that is, for example, the first cylinder #1, and the lean operation is performed in one cylinder, that is, the third cylinder #3. Thus, the rich operation in the first cylinder #1 forms the rich operation period TR, and the lean operation in the third cylinder #3 forms the lean operation period TL, and the operations in the two cylinders form the cycle. The following cycle is formed by the operations of the fourth and the second cylinders #4 and 190 2.

As mentioned above, in the engine shown in FIG. 1, the combustion stroke is in process whenever the crankshaft turns by about 180 degree, and thus the exhaust stroke periods of the cylinders are different from each other, that is, do not overlap each other. As a result, in the case of RATIO=1, the exhaust gas exhausted from the first cylinder #1 of which exhaust gas air-fuel ratio is rich first flows into the TW catalyst 8a, and then the exhaust gas exhausted from the third cylinder #3 of which exhaust gas air-fuel ratio is lean flows into the TW catalyst 8a, and, in this manner, the exhaust gases from the cylinders flow into the TW catalyst 8a, in turn. Accordingly, the exhaust gas portions of which the exhaust gas air-fuel ratios are rich and lean flow into the TW catalyst 8a alternately and repeatedly. Note that the present invention may be applied in the case in which the exhaust stroke periods slightly overlap to each other.

FIG. 15 shows the case where RATIO=2. In this case, the rich operation is performed in, for example, the first cylinder #1, and the lean operation is performed in two cylinders, that is, the third and the fourth cylinders #3 and #4. Thus, the rich operation in the first cylinder #1 forms the rich operation period TR, and the lean operations in the third and the fourth cylinders #3 and #4 form the lean operation period TL, and the operations in the three cylinders form the cycle. The following cycle is formed by the operations of the second, the first, and the third cylinders #2, #1, and #3.

Figure 16:
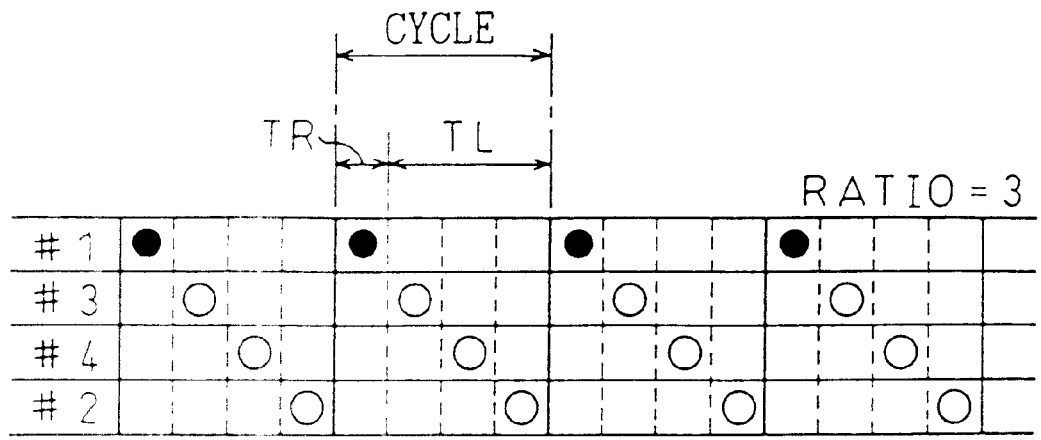
FIG. 16 illustrates the lean and rich operation periods with RATIO=3.

FIG. 16 shows the case where RATIO=3. In this case, the rich operation is performed in, for example, the first cylinder #1, and the lean operation is performed in three cylinders, that is, the third, the fourth, and the second cylinders #3, #4, and #2. Thus, the rich operation in the first cylinder #1 forms the rich operation period TR, and the lean operations in the third, the fourth, and the second cylinders #3, #4, and #2 form the lean operation period TL, and the operations in the four cylinders form the cycle. The following cycle is formed by the operation of the first, the third, and the fourth cylinders #1, #3, and #4.

Figure 17:
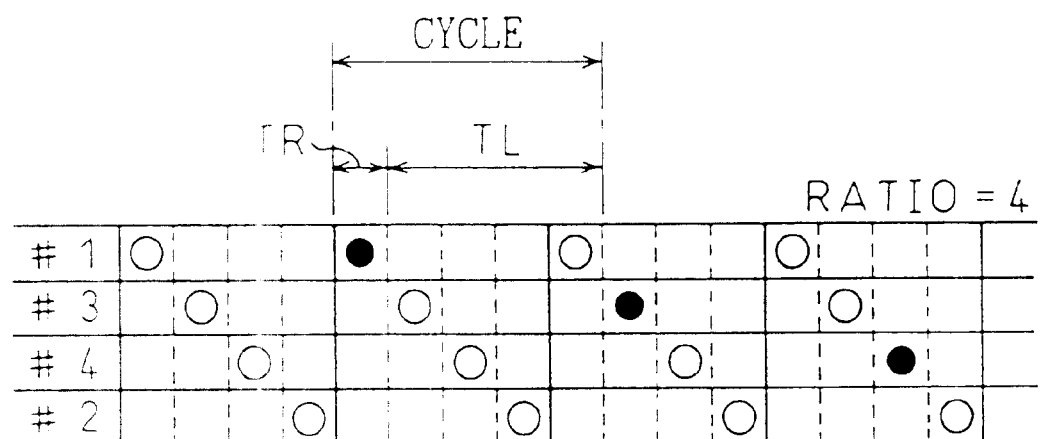
FIG. 17 illustrates the lean and rich operation periods with RATIO=4.

FIG. 17 shows the case where RATIO=4. In this case, the rich operation is performed in, for example, the first cylinder #1, and the lean operation is performed in four cylinders, that is, the third, the fourth, the second, and the first cylinders #3, #4, #2, and #1. Thus, the rich operation in the first cylinder #1 forms the rich operation period TR, and the lean operations in the third, the fourth, the second, and the first cylinders #3, #4, #2, and #1 form the lean operation period TL, and the operations in the five cylinders form the cycle. The following cycle is formed by the operation of the third, the fourth, the second, the first, and the third cylinders #3, #4, #2, #1, and #3.

When the ratio RATIO is made equal to or larger than the total number of the cylinders of the engine as in the example shown in FIG. 17, all of the cylinders performs the lean engine operation in one lean operation period. This ensures the longer lean operation period TL, to thereby decrease the fuel consumption rate.

When setting the cylinder number ratio RATIO to thereby set the lean and the rich operation periods TL and TR in this way, the $NH_3$ amount and the $NO_x$ amount flowing into the $NH_3$-AO catalyst 10a can be controlled accurate. This results in preventing $NO_x$ and $NH_3$ from passing through the $NH_3$-AO catalyst 10a, and in purifying the exhaust gas sufficiently.

A cylinder performing the rich operation is not fixed when setting the ratio RATIO to thereby set the lean and the rich operation periods TL and TR. Further, a cylinder performing the rich operation varies in every cycle, when the ratio RATIO is made 2 or 4, for example. Thus, the engine body 1 or the exhaust manifold 7 is further prevented from the thermal distortion, and the deposition in the specific cylinder is further prevented.

Note that the cylinder performing the rich operation is fixed when the ratio is made 1 or 3, as shown in FIG. 14 or 16. Namely, only the first and the third cylinders #1 and #3 perform the rich operation in the example shown in FIG. 14, and only the first cylinder #1 performs the rich operation in the example shown in FIG. 16. However, if the ratio RATIO changes due to the change in the engine operating condition, the cylinder performing the rich operation is changed. Namely, the cylinder performing the rich operation changes whenever the ratio RATIO changes, and thus the cylinder is not necessarily fixed. Note that, if the ratio RATIO is kept identical for a long period due to the stable engine operating condition and thereby a specific cylinder performs the rich operation for a predetermined period, the cylinder performing the rich operation may be changed to the other while keeping the ratio RATIO. Namely, in the example shown in FIG. 16, if the first cylinder #1 performs the rich operation for the predetermined period, the third cylinder #3 performs the rich operation, while the first cylinder performs the lean operation to keep the ratio RATIO, for example. natively, the ratio RATIO may be changed to 2 or 4 temporarily, to thereby change the cylinder performing the rich operation.

When the lean and the rich operations are performed in accordance with the ratio RATIO, each cylinder is required to be judged whether it has to perform the lean operation or the rich operation. Next, the method for judging whether the cylinder has to perform the lean operation or the rich operation will be explained.

In this embodiment, the product DRICH of the data DRATIO of 5 bits representing the cylinder number ratio RATIO, and the history data DHISTORY of 5 bits representing the engine operations in the last five cylinders is calculated whenever the combustion stroke is in process, and it is judged whether the lean operation or the rich operation is to be performed, on the basis of the product DRICH. The data DRATIO is "00001" for RATIO=1, "00011" for RATIO=2, "00111" for RATIO=3, and "01111" for RATIO=4, as shown in FIG. 18, and is a stored in the ROM 22 in advance in the form of a map as shown in FIG. 18.

The bit in $2^4$ of DHISTORY represents the engine operation performed five times before, the bit in $2^3$ represents the engine operation performed four times before, the bit in $2^2$ represents the engine operation performed three times before, the bit in $2^1$ represents the engine operation performed two times before, and the bit in $2^0$ represents the last engine operation. In each cylinder, each bit is made zero when the lean operation is performed, and is made 1 when the rich operation is performed. Thus, DHISTORY= "10010", for example, represents that the rich, the lean, the lean, the rich, and the lean operations have been performed, in turn.

The product DRICH of DRATIO and DHISTORY is calculated when the fuel injection time TAU for each cylinder is calculated. The cylinder performs the rich operation when DRICH is "00000", and performs the lean operation when DRICH is the other. Next, an example of DRICH will be explained with reference to FIG. 19, as well as FIG. 15.

FIG. 19 illustrates the product DRICH in the case in which RATIO=2. In the example shown in FIG. 19, for the second cylinder #2, DHISTORY is "10010" and DRATIO is "00011", and thus DRICH is "00010". As a result, the second cylinder #2 performs the lean operation. That is, the target air-fuel ratio (A/F)T for the second cylinder #2 is made the lean air-fuel ratio (A/F)L. For the following first cylinder #1, DHISTORY is "00100" and DRATIO is "00011", and thus DRICH is "00000". As a result, the first cylinder #1 performs the rich operation. That is, the target air-fuel ratio (A/F)T for the first cylinder #1 is made the rich air-fuel ratio (A/F)R. The following third cylinder #3 performs the lean operation because DRICH is "00001", the following fourth cylinder #4 performs the lean operation because DRICH is "00010", and the following second cylinder #2 performs the rich operation because DRICH is "00000".

Figure 20:
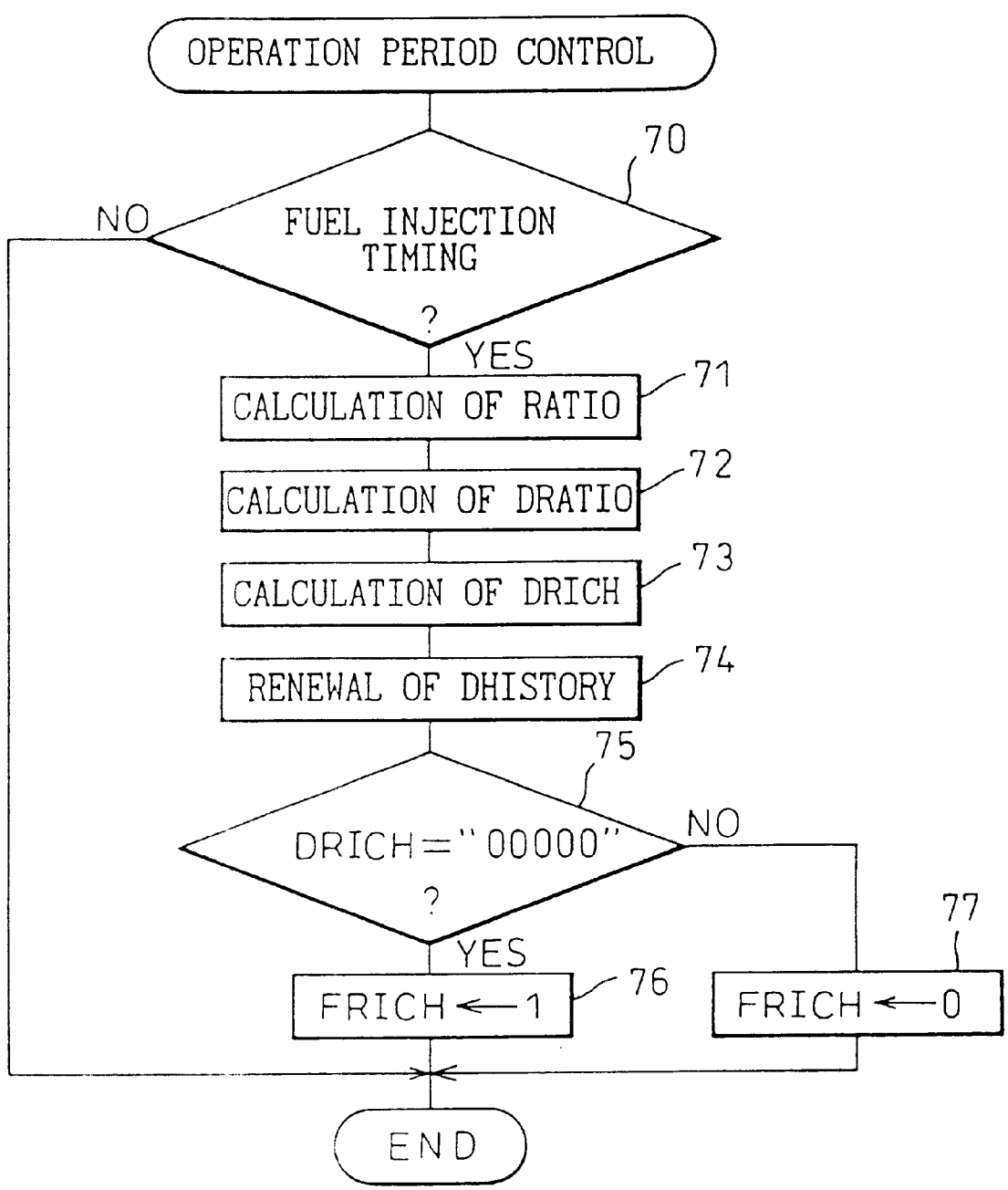
FIG. 20 is a flow chart for controlling the engine operation period, using the ratio, according to another embodiment.

FIG. 20 shows a routine for executing the embodiment mentioned above. This routine is executed by interruption every predetermined crank angle.

Referring to FIG. 20, first, in step 70, it is judged whether it is in the fuel injection timing of any one of the cylinders. If it is not in the fuel injection timing, the processing cycle is ended. If it is in the fuel injection timing, the routine goes to step 71, where the cylinder number ratio RATIO is calculated using the map shown in FIG. 13. In the following step 72, DRATIO is calculated using the map shown in FIG. 18, on the basis of the ratio RATIO obtained in the step 71. In the following step 73, DRICH is calculated as the product of proposition of DRATIO and DHISTORY. In the following step 74, DHISTORY is renewed on the basis of DRICH in the present processing cycle. In the following step 75, it is judged whether DRICH is "00000". If DRICH="00000", the routine goes to step 76, where FRICH is made 1. FRICH is identical one shown in the routine shown in FIG. 10, and the rich engine operation is performed when FRICH is made 1, as can be seen from the routine shown in FIG. 11. Then, the processing cycle is ended.

If DRICH≠"00000" in step 75, the routine goes to step 77, where FRICH is made zero. When FRICH is made zero, the lean operation is performed. Then, the processing cycle is ended.

In this embodiment, the number of the cylinders performing the rich engine operation in one rich operation period is made 1. As a result, the $NH_3$ amount flowing into the $NH_3$-AO catalyst 10a during one rich operation period is made smaller. Therefore, the volume of the $NH_3$-AO catalyst 10a, as well as the size thereof, can be made very small.

Figure 21:
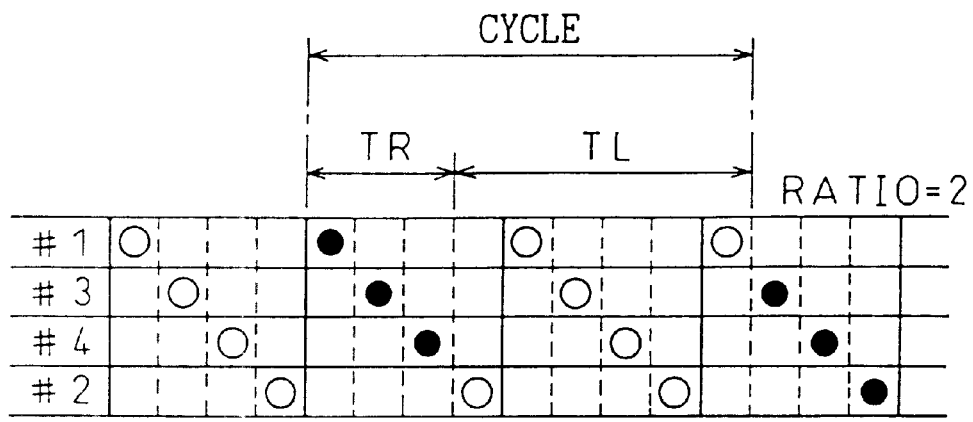
FIG. 21 illustrates the lean and rich operation periods with RATIO=2, according to further another embodiment.

Note that, in one cycle, a plurality of cylinders may perform the rich operation. Referring to FIG. 21 which illustrates an example in which the number of the cylinders performing the rich operation in one cycle is made 3, the first, the third, and the fourth cylinders 1, #3, and #4 perform the rich operation, in turn. Then, if the ratio RATIO is made 2, the following six cylinders perform the lean operation. In the following cycle, the third, the fourth, and the second cylinders #3, #4, and #2 perform the rich operation, in turn. In this case, it is prevented that the cylinders performing the rich operation are completely identical to those in the last cycle. That is, the cylinders performing the rich operation vary in every cycle. As a result, in the example shown in FIG. 21, the engine body, for example, is prevented from the thermal distortion, and a large amount of deposition on a specific cylinder is also prevented.

Figure 22:
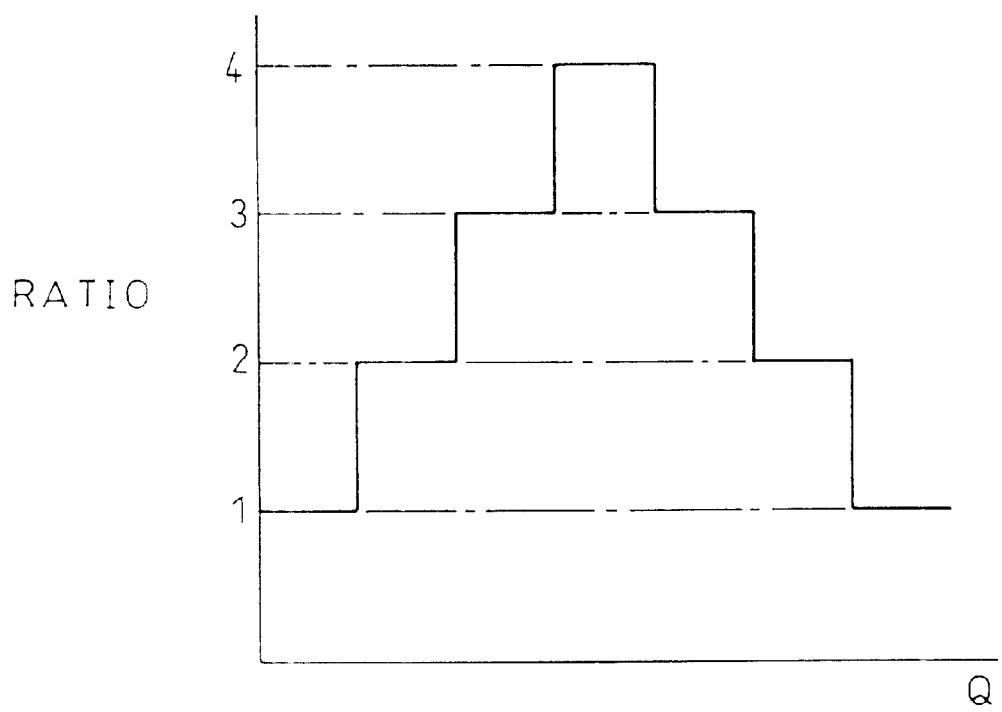
FIG. 22 illustrates the cylinder number ratio, according to another embodiment.

In the above-mentioned embodiment, the cylinder number ratio RATIO is set as a function of the engine load Q/N and the engine speed N. Alternatively, the ratio RATIO may be set as a function of the intake air amount Q, as shown in FIG. 22. In this case, the ratio RATIO becomes larger as the intake air amount Q becomes larger when Q is small, and becomes smaller as Q becomes larger when Q is large, as shown in FIG. 22.

Next, another method for setting the lean air-fuel ratio (A/F)L will be explained.

During the lean operation in which the engine air-fuel ratio is made the lean air-fuel ratio (A/F)L, it is often difficult to ensure the adequate output torque of the engine, and the actual output torque may deviate from the required output torque which is determined in accordance with the engine operating condition, if the target air-fuel ratio (A/F)T is simply made lean. To solve this, in this embodiment, the lean air-fuel ratio (A/F)L( which make the actual output torque equal to the required torque in the lean operation, is stored in advance, and the target air-fuel ratio (A/F)T is set to this lean air-fuel ratio (A/F)L in the lean operation.

Figure 23:
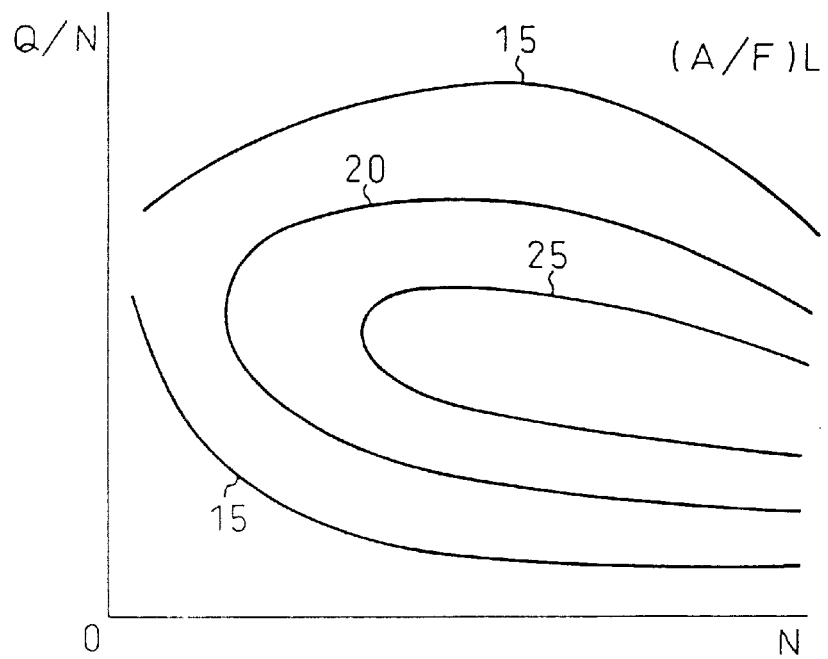
FIG. 23 illustrates the lean air-fuel ratio, according to another embodiment.

FIG. 23 shows the lean air-fuel ratio (A/F)L making the actual output torque equal to the required output torque. As shown in FIG. 23, the lean air-fuel ratio (A/F)L is obtained, as a function of the engine load Q/N and the engine speed N, in advance, by experiment. The lean air-fuel ratio (A/F)L becomes larger as the engine load Q/N becomes higher when the engine load Q/N is low, and becomes smaller as the engine load Q/N becomes higher when the engine load Q/N is high, with a constant engine speed N. Further, the lean air-fuel ratio (A/F)L is stored in the ROM 22 in advance in the form of a map of shown in FIG. 23. The lean air-fuel ratio (A/F)L may be calculated using the map shown in FIG. 23, in the step 66 in the routine shown in FIG. 11.

Next, another method for setting the rich air-fuel ratio (A/F)R will be explained.

As mentioned above, shorter rich operation period is desirable for a lower fuel consumption rate. Thus, it is desired to change the rich air-fuel ratio (A/F)R in accordance with the engine operating condition, to thereby make the $NH_3$ amount synthesized in the rich operation period larger. However, if the $NH_3$ amount flowing into the $NH_3$-AO catalyst 10a suddenly increases when the engine air-fuel ratio changes from the lean air-fuel ratio (A/F)L to the rich air-fuel ratio (A/F)R, the $NH_3$ may be discharged from the $NH_3$-AO catalyst 10a without being adsorbed. Therefore, in this embodiment, the rich air-fuel ratio (A/F)R, which makes the $NH_3$ amount flowing into the $NH_3$-AO catalyst 10a in the rich operation suitable for the decreasing the fuel consumption rate and for good purification of the exhaust gas, is stored in advance, and the target air-fuel ratio (A/F)T is made equal to the rich air-fuel ratio (A/F)R, in the rich operation.

Figure 24:
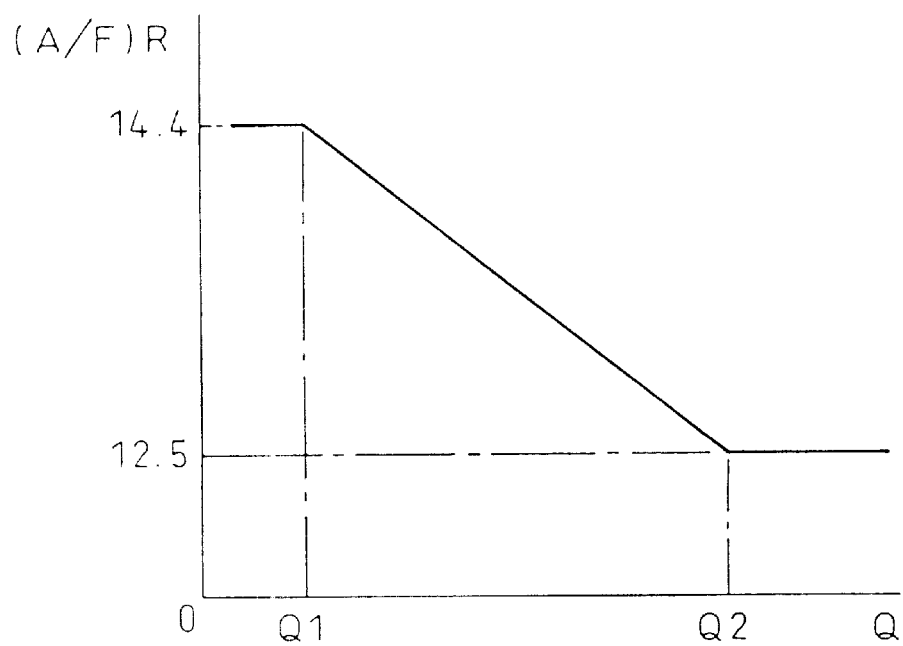
FIG. 24 illustrates the rich air-fuel ratio, according to another embodiment.

FIG. 24 shows the rich air-fuel ratio (A/F)R making the $NH_3$ amount flowing into the $NH_3$-AO catalyst 10a in the rich operation suitable for the decreasing the fuel consumption rate and for good purification of the exhaust gas. As shown in FIG. 24, the rich air-fuel ratio (A/F)R is stored as a function of the intake air amount Q, in advance, by experiment. The rich air-fuel ratio (A/F)R is made 14.4 when Q<Q1, becomes smaller as the intake air amount Q becomes larger when Q1<Q<Q2, and is made 12.5 when Q2<Q, where Q1 and Q2 are predetermined values. When the intake air amount Q becomes larger and thus the combustion temperature becomes higher, the $NO_x$ amount exhausted from the engine becomes larger suddenly and thus the $NH_3$ amount flowing into the $NH_3$-AO catalyst 10a becomes larger suddenly. Therefore, when the rich air-fuel ratio (A/F)R is made smaller and thereby the combustion temperature is lowered, $NH_3$ is prevented from excessively flowing into the $NH_3$-AO catalyst 10a. Note that the rich air-fuel ratio (A/F)R is stored in the ROM 22 in advance in the form of the map as shown in FIG. 24. The rich air-fuel ratio (A/F)R may be calculated using the map shown in FIG. 24, in the step 63 in the routine shown in FIG. 11.

Figure 25A:
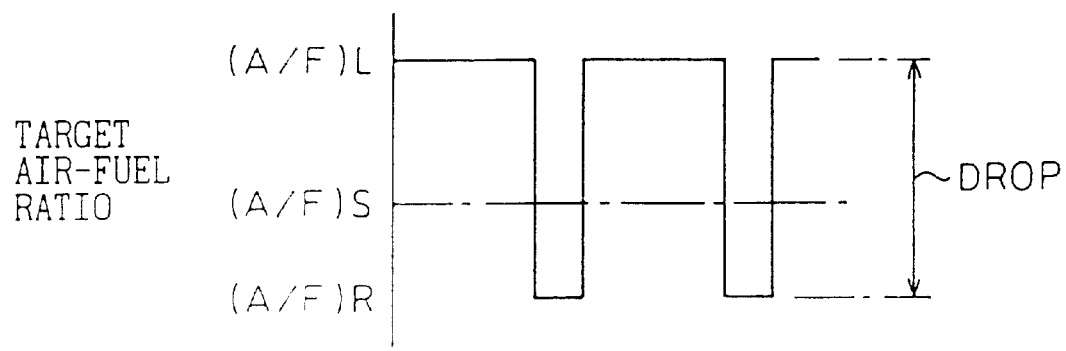
FIGS. 25A and 25B illustrate the rich air-fuel ratio, according to further another embodiment.

Next, a further embodiment for setting the rich air-fuel ratio (A/F)R will be explained with reference to FIGS. 25A and 25B.

As mentioned above, the engine shown in FIG. 1 mainly performs the lean operation, and performs the rich operation temporarily. Thus, it is desired that the engine performs the rich operation suitable for the lean operation which is a basic engine operation. In other words, it is desired that the engine performs the rich operation to make the synthesized $NH_3$ amount thereby equal to that suitable for purifying $NO_x$ flowing into the $NH_3$-AO catalyst 10a in the lean operation. Therefore, in this embodiment, a changing value DROP in the target air-fuel ratio (A/F)T making the rich operation suitable for the last lean operation is stored in advance, and the rich air-fuel ratio (A/F)R is calculated by subtracting the changing value DROP from the lean air-fuel ratio (A/F)L in the last lean operation, as shown in FIG. 25A. The changing value DROP varies in accordance with the engine operating condition, and is thus set in accordance with the engine operating condition just before the rich operation in question starts, such as an engine load. This results in purifying the exhaust gas sufficiently, regardless the lean air-fuel ratio (A/F)L.

Figure 25B:
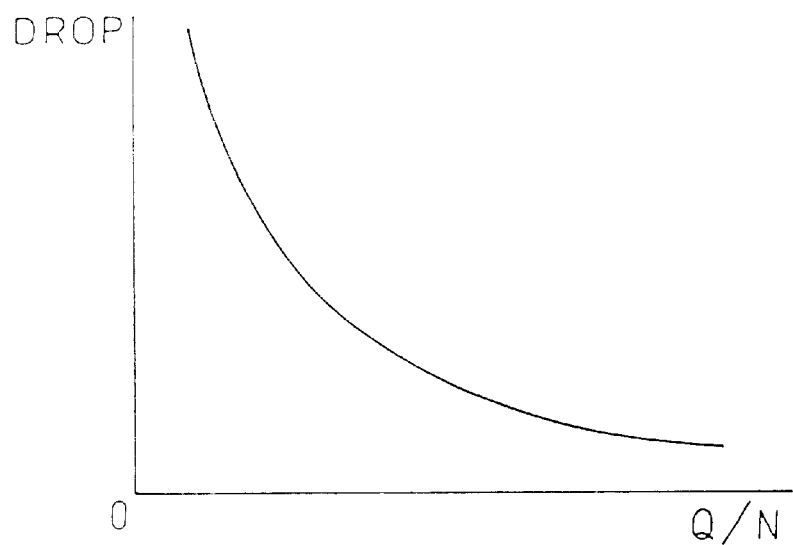

FIG. 25B shows the changing value DROP obtained in advance by experiment. As shown in FIG. 25B, the changing value DROP becomes smaller as the engine load Q/N becomes higher, and is stored in the ROM 22 in advance in the form of a map as shown in FIG. 25B. In the step 63 in the routine shown in FIG. 11, first the changing value DROP may be calculated using the map shown in FIG. 25B, and then the rich air-fuel ratio (A/F)R may be calculated by subtracting DROP from the lean air-fuel ratio (A/F)L calculated in the step 66.

Alternatively, the rich air-fuel ratio (A/F)R may be a standard value, and the lean air-fuel ratio (A/F)L may be calculated by adding a changing value to the rich air-fuel ratio (A/F)R, to thereby make the lean operation suitable for the last rich operation.

Next, another embodiment for controlling the target air-fuel ratio (A/F)T for each cylinder will be explained with reference to FIGS. 26 to 30.

Figure 5:
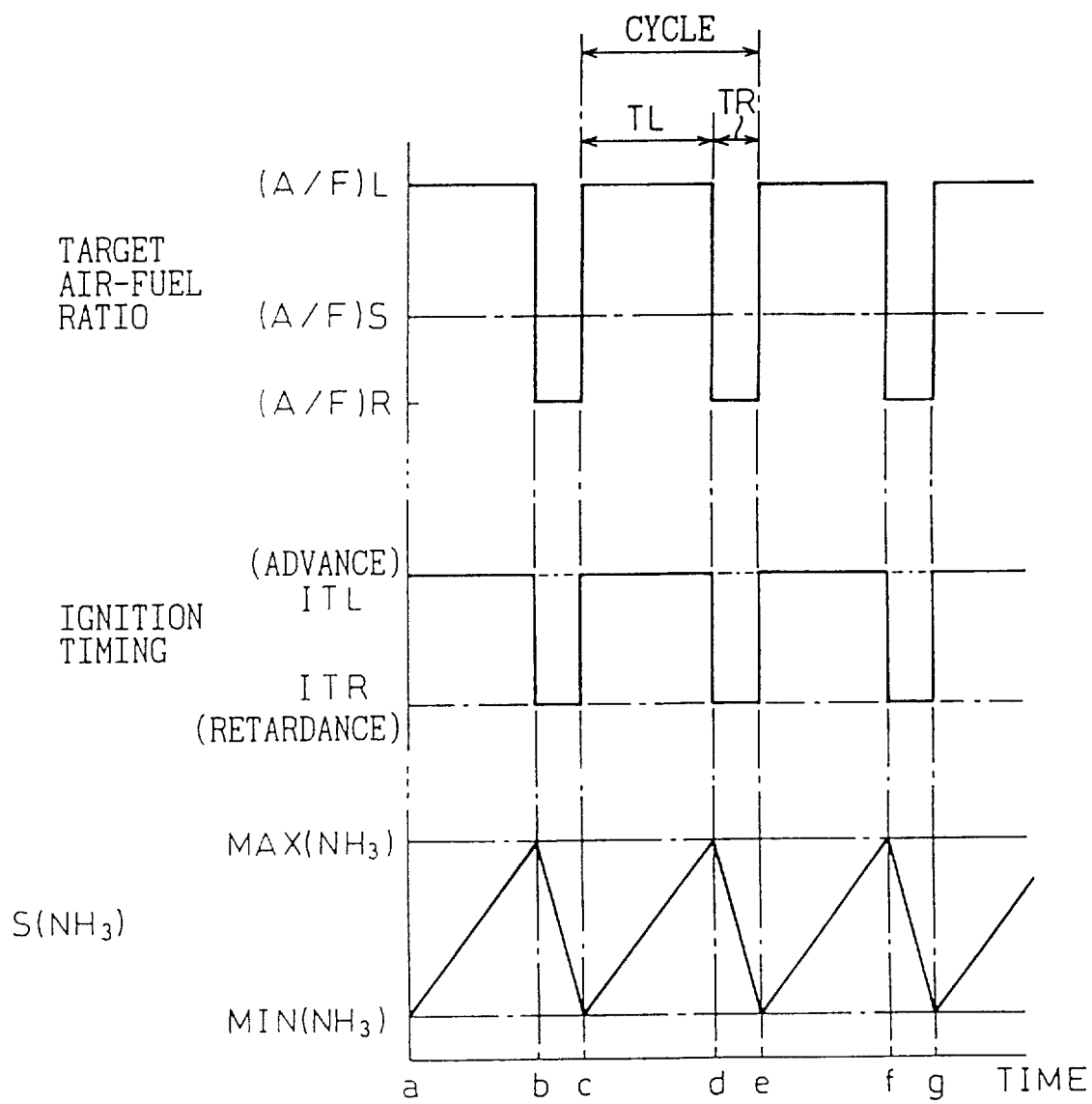
FIG. 5 is a time chart for explaining the exhaust gas purifying method in the engine shown in FIG. 1.
Figure 26:
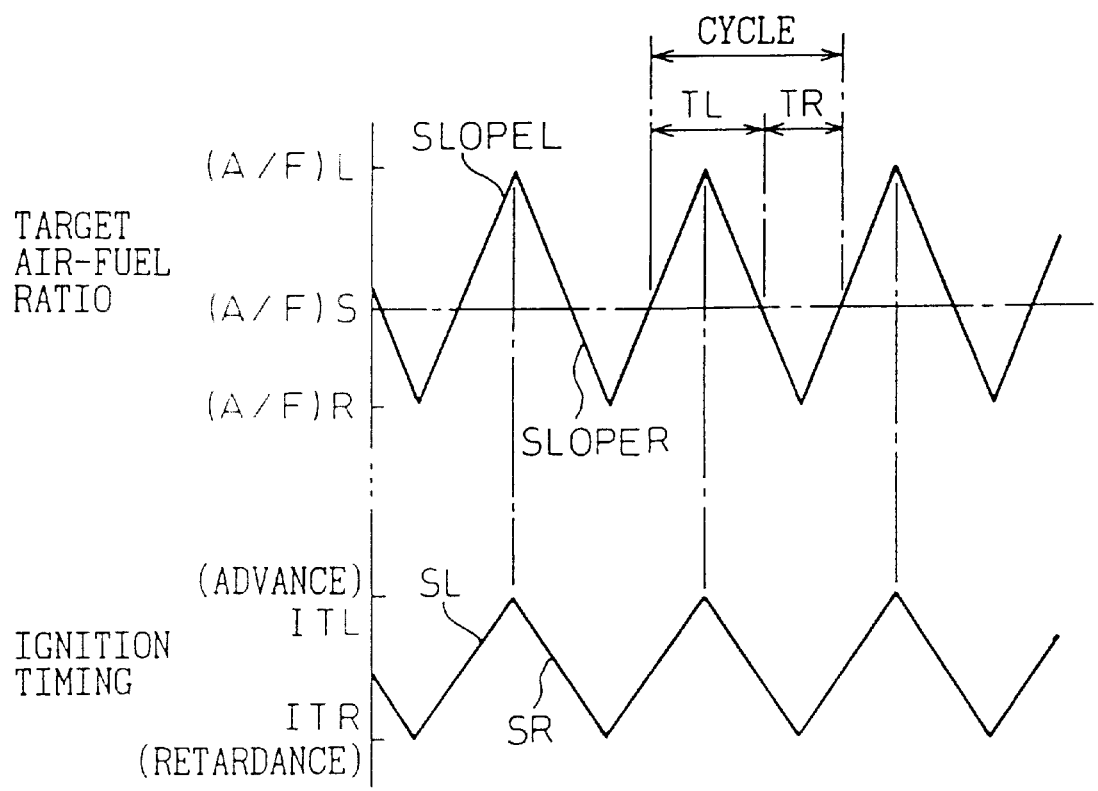
FIGS. 26 to 29 are time charts illustrating the variation in the target air-fuel ratio, according to further another embodiments, respectively.

In the above-mentioned embodiments, the target air-fuel ratio (A/F)T of the cylinders is made the lean and the rich air-fuel ratios (A/F)L and (A/F)R alternately and repeatedly to make the exhaust air-fuel ratio of the exhaust gas flowing into the catalysts 8a and 10a lean and rich alternately and repeatedly, as shown in FIG. 5. Also, in the above-mentioned embodiments, the target air-fuel ratio is changed in the form of the step. However, if the target air-fuel ratio is changed in the form of the step, there may occur a drastic change in the output torque of the engine, which is undesirable, and the drivability may deteriorate. Thus, in this embodiment, as shown in FIG. 26, the target air-fuel ratio (A/F)T is made smaller from the lean air-fuel ratio (A/F)L such as 25.0 to the rich air-fuel ratio (A/F)R such as 13.8 gradually with a predetermined changing rate SLOPER, and is made larger from the rich air-fuel ratio (A/F)R to the lean air-fuel ratio (A/F)L with a predetermined changing rate SLOPEL. The rates SLOPER and SLOPEL are set in accordance with the engine operating condition, respectively. This prevents a drastic change in the output torque, and ensures the good drivability.

Figure 27:
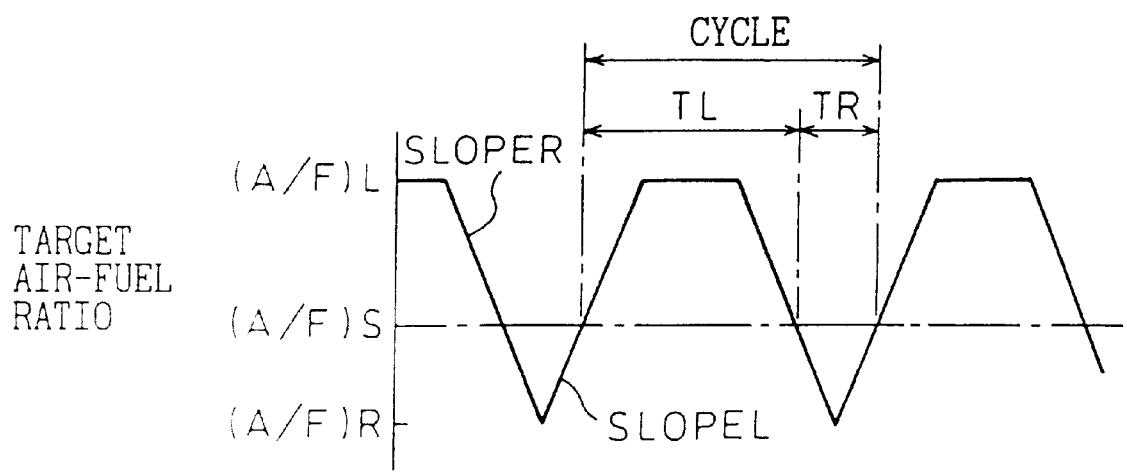
Figure 28:
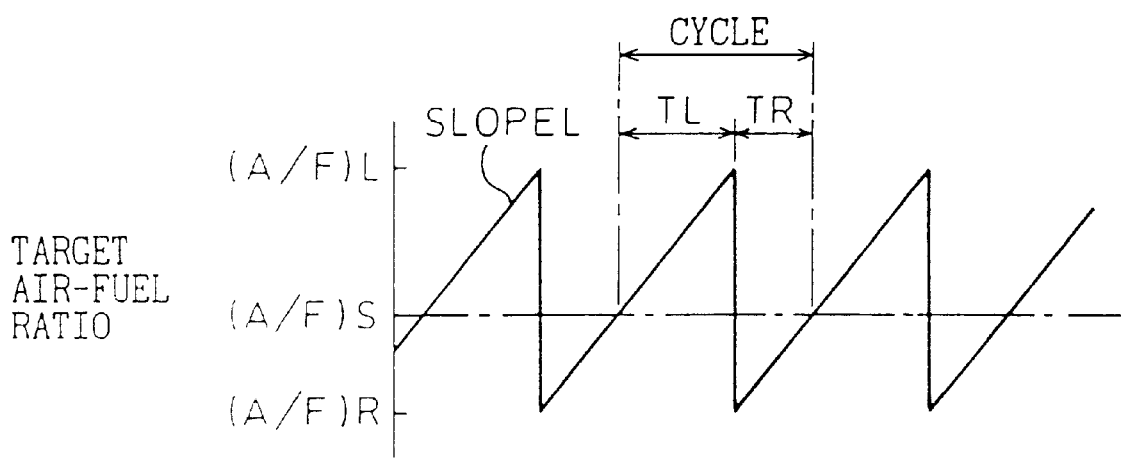

In the embodiment shown in FIG. 27, the target airfuel ratio (A/F)T is also made smaller gradually with the changing rate SLOPER, and is also made larger gradually with the changing rate SLOPEL. This ensures good drivability. Further, in this embodiment, the target air-fuel ratio (A/F)T is kept constant at the lean air-fuel ratio (A/F)L, for a predetermined period, after the target air-fuel ratio (A/F)T reaches the lean air-fuel ratio (A/F)L, and then is made smaller with the rate SLOPER toward the rich air-fuel ratio (A/F)R. As a result, the lean operation period TL is made longer than that in the embodiment shown in FIG. 26, and the fuel consumption rate is made further smaller. Additionally, the changing operation of the target air-fuel ratio (A/F)T between the lean and the rich air-fuel ratios per unit time is made smaller, and thereby the drivability is further enhanced.

As mentioned above, the TW catalyst 8a synthesizes $NH_3$ for purifying $NO_x$ in the rich operation. However, if the target air-fuel ratio (A/F)T is made smaller gradually from the lean air-fuel ratio (A/F)L to the rich air-fuel ratio (A/F)R, the $NH_3$ amount synthesized in the TW catalyst 8a may not increases quickly, or the $NH_3$-AO catalyst 10a may desorb $NH_3$ excessive to $NO_x$ flowing into the catalyst 10a. Thus, in the embodiment shown in FIG. 28, the target air-fuel ratio (A/F)T is changed from the lean air-fuel ratio to the rich air-fuel ratio quickly in the form of the step, to thereby prevent $NH_3$ and $NO_x$ from being discharged without being purified. Note that the target air-fuel ratio (A/F)T is changed from the rich air-fuel ratio to the lean air-fuel ratio gradually with the rate SLOPEL, to thereby suppress the undesired fluctuation of the output torque.

Figure 29:
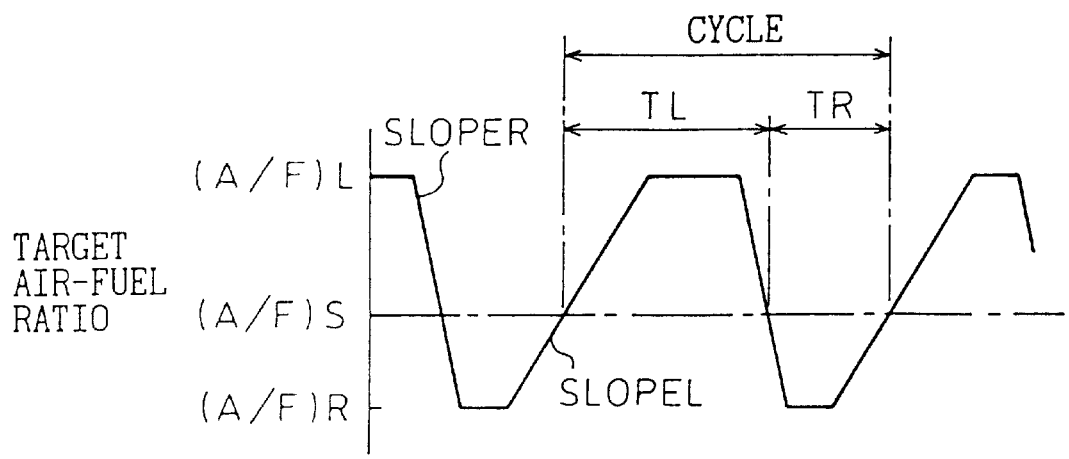

In the embodiment shown in FIG. 29, the target air-fuel ratio (A/F)T is made smaller gradually with the rate SLOPER, and is made larger gradually with the rate SLOPEL, as shown in, for example, FIG. 26. However, in this embodiment, the absolute value SLOPER is made smaller that of SLOPEL, and thus the fluctuation of the output torque is suppressed, while preventing the $NH_3$ amount from being too small to purify $NO_x$.

Further, in the embodiment shown in FIG. 29, the target air-fuel ratio (A/F)T is kept constant at the lean air-fuel ratio (A/F)L for a predetermined period, after the target air-fuel ratio (A/F)T is made equal to the lean air-fuel ratio (A/F)L, and then is made smaller toward the rich air-fuel ratio (A/F)R. The target air-fuel ratio (A/F)T is kept constant at the rich air-fuel ratio (A/F)R for a predetermined period, after the target air-fuel ratio (A/F)T is made equal to the rich air-fuel ratio (A/F)R, and then is made larger toward the lean air-fuel ratio (A/F)L. As a result, the changing operation of the target air-fuel ratio (A/F)T between the lean and the rich air-fuel ratios per unit time is made smaller, and thereby the drivability is further enhanced.

Figure 30:
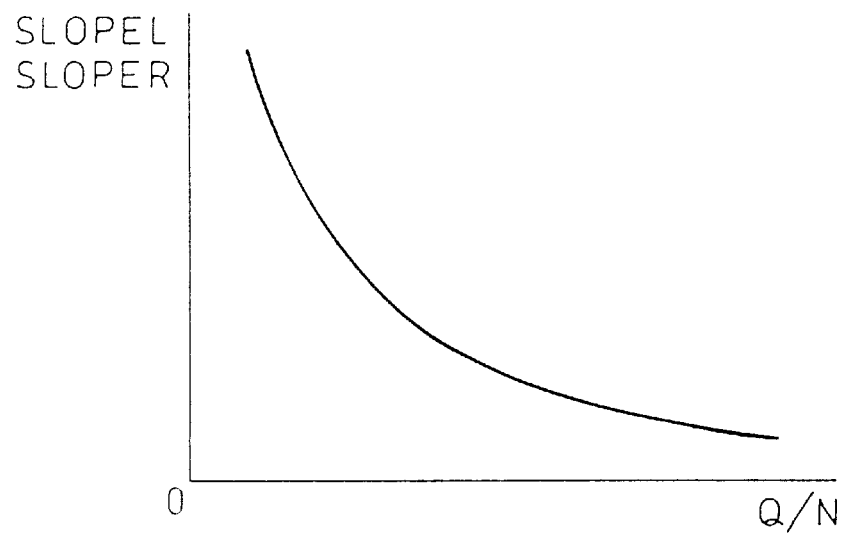
FIG. 30 is a diagram illustrating the changing rate of the target air-fuel ratio.

In the embodiments shown in FIGS. 26 to 29, while the changing rate SLOPEL, SLOPER may be set constant regardless the engine operating condition, the rate SLOPEL, SLOPER may be set in accordance with the engine operating condition. FIG. 30 shows relationships between the rates SLOPEL and SLOPER and the engine load Q/N. As shown in FIG. 30, each rate SLOPEL, SLOPER becomes smaller as the engine load Q/N becomes higher. The rates SLOPEL and SLOPER are stored in the ROM 22 in advance in the form of a map shown in FIG. 30.

Further, in the embodiments shown in FIGS. 26 to 29, the changing rates SLOPEL and SLOPER are kept constant through one changing process of the target air-fuel ratio (A/F)T between the lean and the rich air-fuel ratios. Alternatively, the changing rates SLOPEL and SLOPER may be changed in one changing process of the target air-fuel ratio (A/F)T, in accordance with, for example, the engine operating condition.

On the other hand, the ignition timing for each cylinder is changed gradually in accordance with the change in the target air-fuel ratio (A/F)T, when the target air-fuel ratio (A/F)T is changed as in the embodiments mentioned above. Namely, in the embodiment shown in FIG. 26, for example, the ignition timing IT is retarded gradually with a changing rate SR when the target air-fuel ratio (A/F)T is made smaller gradually, and is advanced gradually with a changing rate SL when the target air-fuel ratio (A/F)T is made larger gradually. The rates SL and SR corresponds to the rates SLOPEL and SLOPER, respectively. This suppresses the undesired fluctuation in the output torque more effectively. Note that the rates SL and SR may be kept constant, or may be changed in accordance with the engine operating condition.

Figure 31:
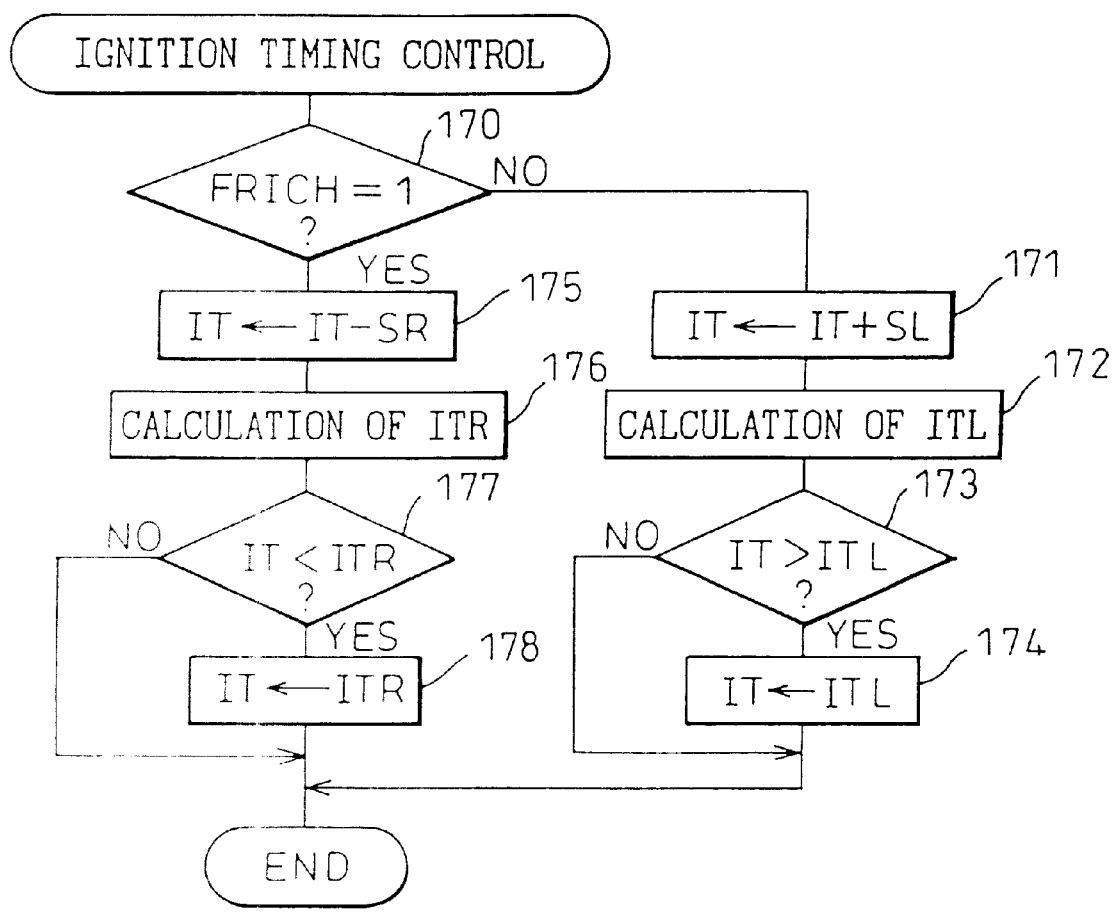
FIG. 31 is a flow chart for controlling the ignition timing in the embodiment shown in FIG. 26.

FIG. 31 shows a routine for controlling the ignition timing in the embodiment shown in FIG. 26. This routine is executed by interruption every predetermined crank angle.

Referring to FIG. 31, first, in step 170, it is judged whether FRICH, which is made zero or 1 in the routine shown in FIG. 10, is made 1. If FRICH=0, that is, if the engine has to perform the lean operation, the routine goes to step 171, where the ignition timing IT is increased by SL, namely, is advanced by SL. In the following step 172, ITL is calculated in accordance with the engine operating condition, for example. In the following step 173, it is judged whether the ignition timing IT is larger than ITL. If IT>ITL, the routine goes to step 174, where the ignition timing IT is limited to ITL. Then, the processing cycle is ended.

If FRICH=1 in step 170, that is, if the engine has to perform the rich operation, the routine goes to step 175, where the ignition timing IT is decreased by SR, namely, is retarded by SR. In the following step 176, ITR is calculated in accordance with, for example, the engine operation. In the following step 177, it is judged whether the ignition timing IT is smaller than ITR. If IT<ITR, the routine goes to step 178, where the ignition timing IT is limited to ITR. Then, the processing cycle is ended.

Figure 32:
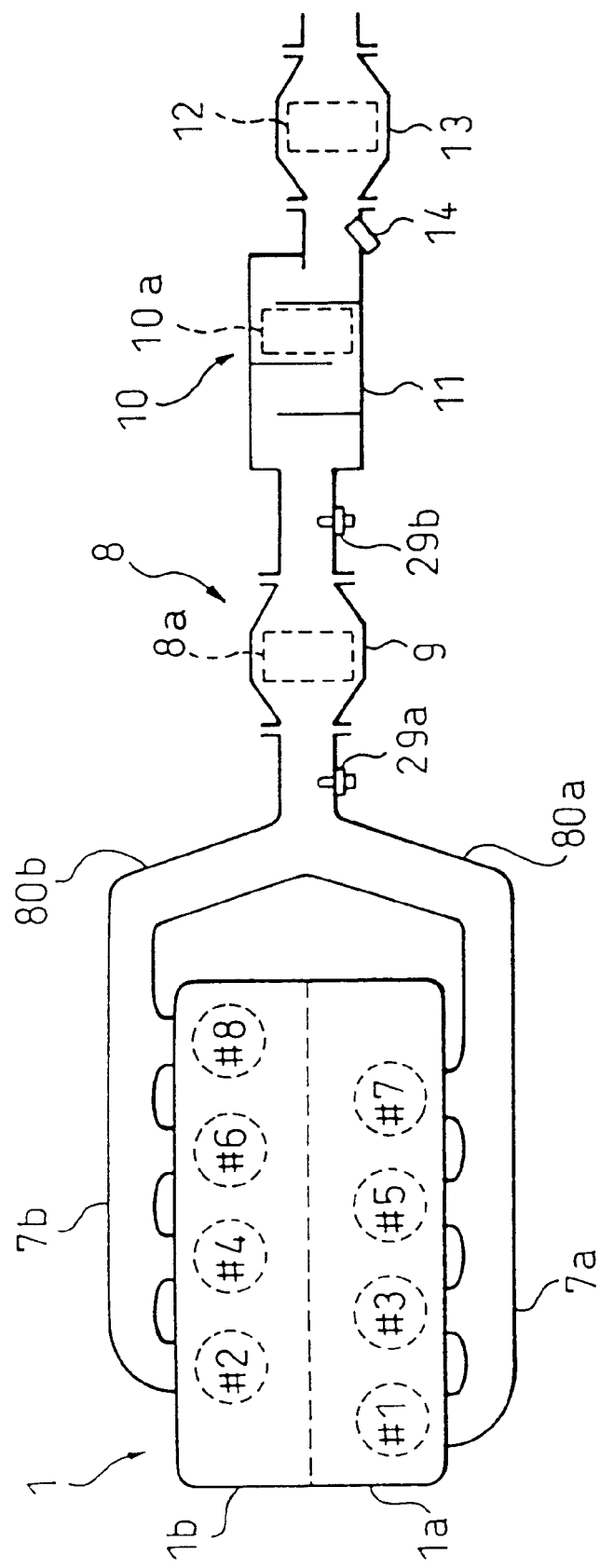
FIG. 32 is a general view of an engine, according to a further another embodiment.

FIG. 32 shows another embodiment for the engine according to the present invention. In FIG. 32, constituent elements the same as those in FIG. 1 are given the same reference numerals. The engine is provided with an electronic control unit same as shown in FIG. 1, but it is not depicted in FIG. 32.

Referring to FIG. 32, the engine body 1 is provided with a first bank 1a arranged in one side of the crank shaft (not shown), and a second bank 1b arranged in the other side of the crank shaft. The first bank 1a comprises the first, the third, the fifth, and the seventh cylinders #1, #3, #5, and #7 aligned straight, and the second bank 1b comprises the second, the fourth, the sixth, and the eighth cylinders #2, #4, #6, and #8 aligned straight. Connected to the cylinders of the first bank 1a is a common exhaust manifold 7a, and connected to the cylinders of the second bank 1b is a common exhaust manifold 7b. The exhaust manifolds 7a and 7b are connected to the common TW catalyst 8a via corresponding exhaust pipes 80a, 80b. Note that the upstream side air-fuel ratio sensor 29a is arranged in the exhaust passage downstream of the portion meeting the exhaust pipes 80a and 80b, in this embodiment. Alternatively, the upstream side sensor 29a may comprise a pair of sensors, one being arranged in the manifold 7a, and the other being arranged in the manifold 7b.

This engine also performs the lean and the rich engine operations alternately and repeatedly, to thereby make the exhaust gas air-fuel ratio of the exhaust gas flowing into the catalysts 8a and 10a lean and rich alternately and repeatedly, as shown in FIG. 5. Namely, the engine performs the rich operation to make the exhaust gas air-fuel ratio of the exhaust gas flowing into the catalysts 8a and 10a rich, to thereby synthesize $NH_3$ and adsorbed $NH_3$ in the $NH_3$-AO catalyst 10a, and performs the lean operation to make the exhaust gas air-fuel ratio of the exhaust gas flowing into the catalysts 8a and 10a lean, to thereby desorb $NH_3$ and reduce $NO_x$ by the desorbed $NH_3$ in the $NH_3$-AO catalyst 10a.

In this engine, the lean and the rich operation period may be set on the basis of the cylinder number ratio RATIO, as explained with reference to FIGS. 13 to 21. In this case, the ratio RATIO is selected from 1 to 7. In the multi-cylinder engine with 8 or more cylinders, as shown in FIG. 32, the ratio RATIO can be set larger such as 5, 6, and 7, and thus the fuel consumption rate is made lower than that in the engine shown in FIG. 1.

In the engine shown in FIG. 32, the exhaust stroke is in process, in the order of the first, the eighth, the fourth, the third, the sixth, the fifth, the seventh, and the second cylinders, whenever the crank shaft turns by about 90 degrees. In this case, the beginning of the exhaust stroke period of a certain cylinder overlaps the end of that of the preceding cylinder, and the end of the exhaust stroke period of that certain cylinder overlaps the beginning of that of the following cylinder. However, when the engine performs the lean and the rich operations alternately and repeatedly, the exhaust gas air-fuel ratio of the exhaust gas flowing into the catalysts 8a and 10a is made lean and rich alternately and repeatedly. Thus, even though the exhaust stroke period overlaps that of the other cylinder, the exhaust gas can be purified sufficiently. The other constructions of the exhaust purifying device and the operation thereof are the same as those in the engine shown in FIG. 1, and thus the explanations therefor are omitted.

Next, another embodiment for the engine shown in FIG. 32 will be explained.

In this embodiment, the engine 1 is provided with four cylinder groups, that is, a first group having the first and the second cylinders, a second group having the third and the fourth cylinders, a third group having the fifth and the sixth cylinders, a fourth group having the seventh and the eighth cylinders. The exhaust stroke periods of the cylinders in the same cylinder groups are substantially identical to each other, but the exhaust stroke periods of the groups are different from each other. Namely, the exhaust strokes are in process whenever the crank shaft turns by about 90 degrees, in the order of the first, the third, the fourth, and the second cylinder groups.

This engine also performs the lean and the rich engine operations alternately and repeatedly, to thereby make the exhaust gas air-fuel ratio of the exhaust gas flowing into the catalysts 8a and 10a lean and rich alternately and repeatedly, as shown in FIG. 5. Namely, the engine performs the rich operation to make the exhaust gas air-fuel ratio of the exhaust gas flowing into the catalysts 8a and 10a rich, to thereby synthesize $NH_3$ and adsorbed $NH_3$ in the $NH_3$-AO catalyst 10a, and performs the lean operation to make the exhaust gas air-fuel ratio of the exhaust gas flowing into the catalysts 8a and 10a lean, to thereby desorb $NH_3$ and reduce $NO_x$ by the desorbed $NH_3$ on the $NH_3$-AO catalyst 10a.

In this engine, to make the exhaust gas air-fuel ratio of the exhaust gas exhausted from the first cylinder group, for example, equal to the target air-fuel ratio (A/F)T, any method may be applied to set the engine air-fuel ratios of the first and the second cylinders #1 and #2. In the embodiment, the engine air-fuel ratios of the first and the second cylinders #1 and #2 are set identical to each other and are made equal to the target air-fuel ratio(A/F)T. However, the important point is that making the exhaust gas air-fuel ratio of the exhaust gas flowing into the catalysts 8a and 10a equal to the target air-fuel ratio (A/F)T, and making both of the engine air-fuel ratios of the first and the second cylinders equal to the target air-fuel ratio (A/F)T is unnecessary. The above explanation may be applied to the other cylinder groups, and thus particular explanations therefor are omitted.

In this engine, the lean and the rich operation period may also be set on the basis of the cylinder number ratio RATIO, as explained with reference to FIGS. 13 to 21. In this case, the ratio RATIO may be considered as a ratio of the number of the cylinder groups performing the lean operation to the number of the cylinder groups performing the rich operation, in one cycle. Further, note that each cylinder group may have a single cylinder. The other constructions of the exhaust purifying device and the operation thereof are the same as those in the engine shown in FIG. 1, and thus the explanations therefor are omitted.

Figure 33:
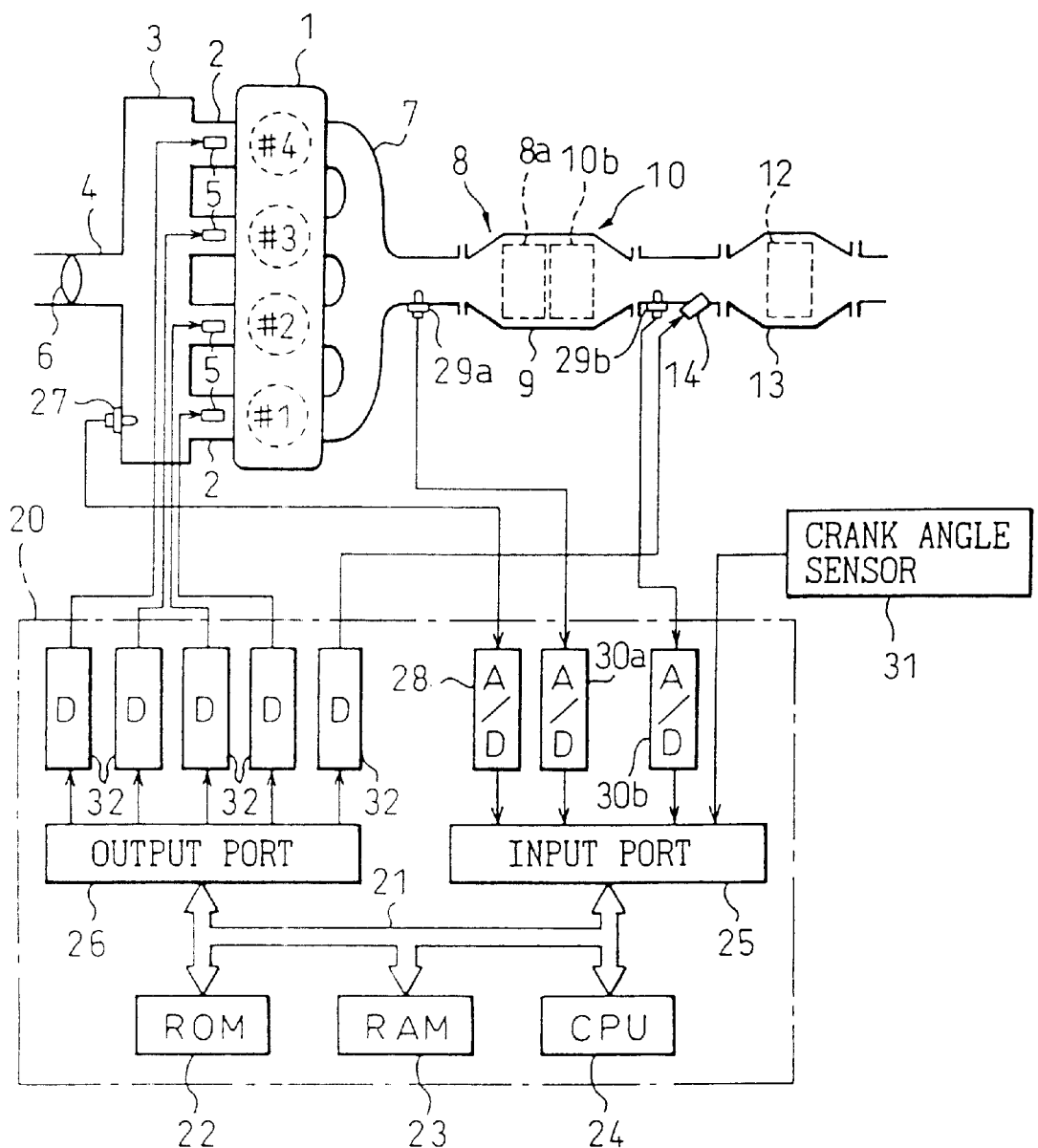
FIG. 33 is a general view of an engine, according to a further another embodiment.

Next, another embodiment for the engine shown in FIG. 33 will be explained. In FIG. 33, constituent elements the same as those in FIG. 1 are given the same reference numerals.

Referring to FIG. 33, the exhaust gas purifying catalyst 10 is housed in the catalytic converter 9 in which the TW catalyst 8a is housed. Especially, the exhaust gas purifying catalyst 10 is carried on the substrate carrying the TW catalyst 8a, and is arranged downstream of the TW catalyst 8a, in series, as shown in FIG. 33. Additionally, the $NH_3$ purifying catalyst 12 is arranged downstream of the exhaust gas purifying catalyst 10, as in the engine shown in FIG. 1.

In the engine shown in FIG. 33, the exhaust gas purifying catalyst 10 consists of a $NO_x$ occluding and reducing catalyst 10b, which is simply expressed as a $NO_x$-OR catalyst. The $NO_x$-OR catalyst 10b comprises at least one substance selected from alkali metals such as potassium K, sodium Na, lithium Li, and cesium Cs, alkali earth metals such as barium Ba and calcium Ca, rare earth metals such as lanthanum La and yttrium Y, and transition metals such as iron Fe and copper Cu, and of precious metals such as palladium Pd, platinum Pt, and rhodium Rh, which are carried on alumina as a carrier. The $NO_x$-OR catalyst 10b performs the $NO_x$ occluding and releasing function in which it occludes $NO_x$ therein when the exhaust gas air-fuel ratio of the inflowing exhaust gas is lean, and releases the occluded $NO_x$ therefrom when the oxygen concentration in the inflowing exhaust gas becomes lower.

Figure 34A:
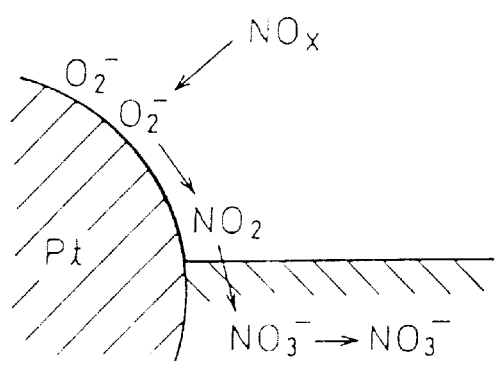
FIGS. 34A and 34B is an illustration for explaining the $NO_x$ occluding and reducing mechanism of the $NO_x$ occluding and reducing catalyst.
Figure 34B:
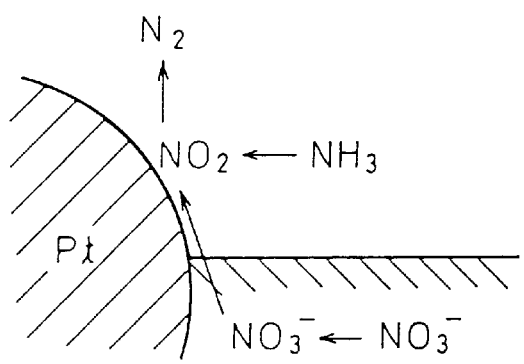

When the $NO_x$-OR catalyst 10b is disposed in the exhaust passage of the engine, the $NO_x$-OR catalyst 10b actually performs the $NO_x$ occluding and releasing function, but the function is unclear. However, it can be considered that the function is performed according to the mechanism as shown in FIGS. 34A and 34B. This mechanism will be explained by using as an example a case where platinum Pt and barium Ba are carried on the carrier, but a similar mechanism is obtained even if another precious metal, alkali metal, alkali earth metal, or rare earth metal is used.

Namely, when the exhaust gas air-fuel ratio of the inflowing exhaust gas becomes lean, that is, when the oxygen concentration in the inflowing exhaust gas increases, the oxygen $O_2$ is deposited on the surface of platinum Pt in the form of $O_2^-$ or $O^{2-}$, as shown in FIG. 34A. On the other hand, NO in the inflowing exhaust gas reacts with the $O_2^-$ or $O^{2-}$ on the surface of the platinum Pt and becomes $NO_2$ ($2NO+O_2 \rightarrow 2NO_2$). Subsequently, a part of the produced $NO_2$ is oxidized on the platinum Pt and is occluded into the $NO_x$-OR catalyst 10b. While bonding with barium oxide BaO, it is diffused in the catalyst 10b in the form of nitric acid ions $NO_3^-$, as shown in FIG. 34A. In this way, $NO_x$ is occluded in the $NO_x$-OR catalyst 10b.

Contrarily, when the oxygen concentration in the inflowing exhaust gas becomes lower and the production of $NO_2$ is lowed, the reaction proceeds in an inverse direction ($NO_3^- \rightarrow NO_2$), and thus nitric acid ions $NO_3^-$ in the $NO_x$-OR catalyst 10b is released in the form of $NO_2$ from the $NO_x$-OR catalyst 10b, as shown in FIG. 34B. Namely, when the oxygen concentration in the inflowing exhaust gas is lowered, that is, when the exhaust gas air-fuel ratio of the inflowing exhaust gas is changed lean to rich, $NO_x$ is released from the $NO_x$-OR catalyst 10b. At this time, if the reducing agent, such as $NH_3$, exists in the $NO_x$-OR catalyst 10b, $NO_x$ is reduced and purified by the agent. Note that, when the exhaust gas air-fuel ratio of the inflowing exhaust gas is rich, hydrocarbon HC, carbon monoxide CO, or hydrogen $H_2$ may pass through the TW catalyst 8a and may flow into the $NO_x$-OR catalyst 10b. It is considered that the HC, CO, etc. act as the reducing agent, as well as $NH_3$, and reduce a part of $NO_x$ on the $NO_x$-OR catalyst 10b. However, the reducing ability of $NH_3$ is higher than those of HC, CO, etc., and thus $NO_x$ can be reliably purified by using $NH_3$ as the reducing agent.

Figure 38A:
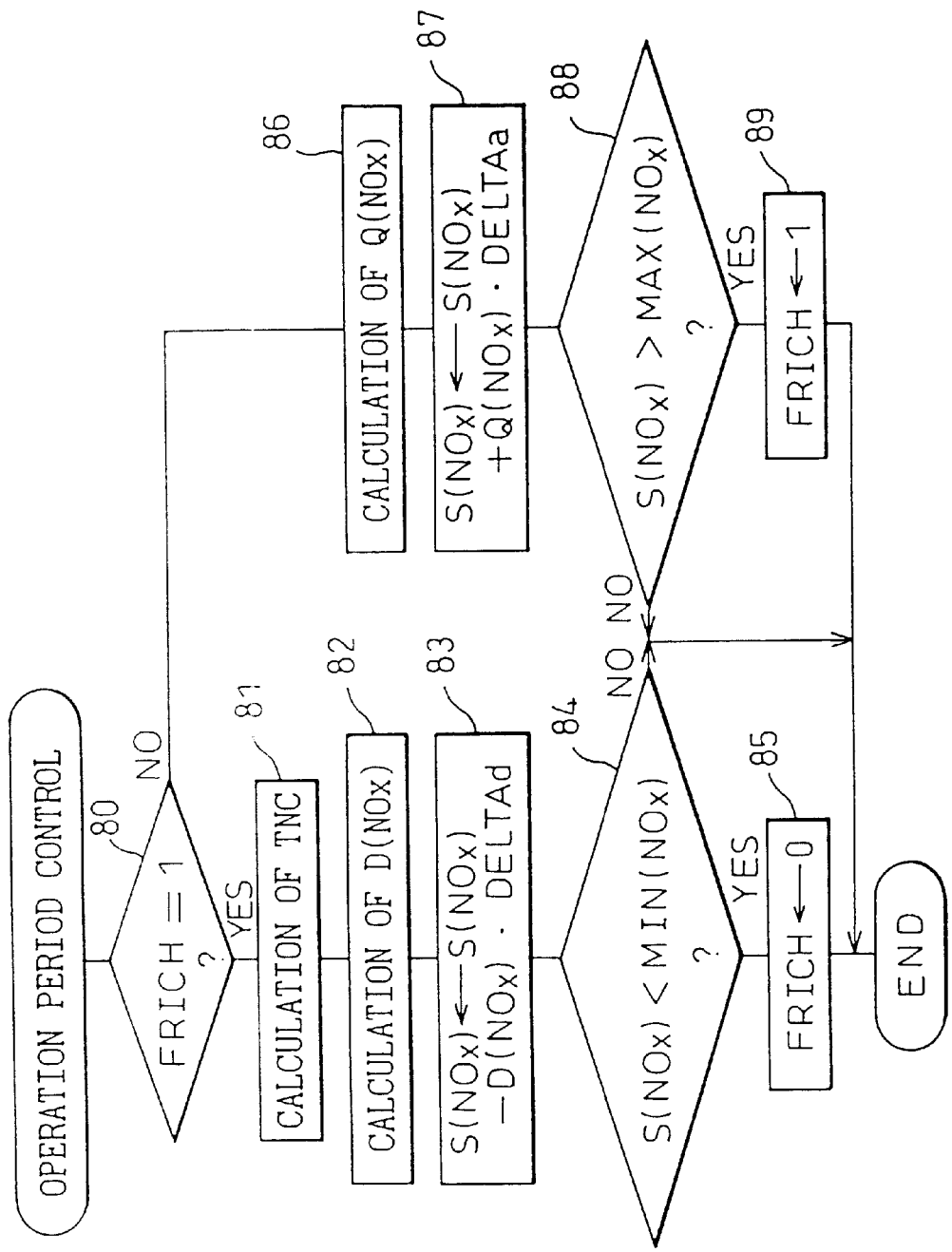
FIG. 38A is a flow chart for controlling the engine operation period in the engine shown in FIG. 33.
Figure 38B:
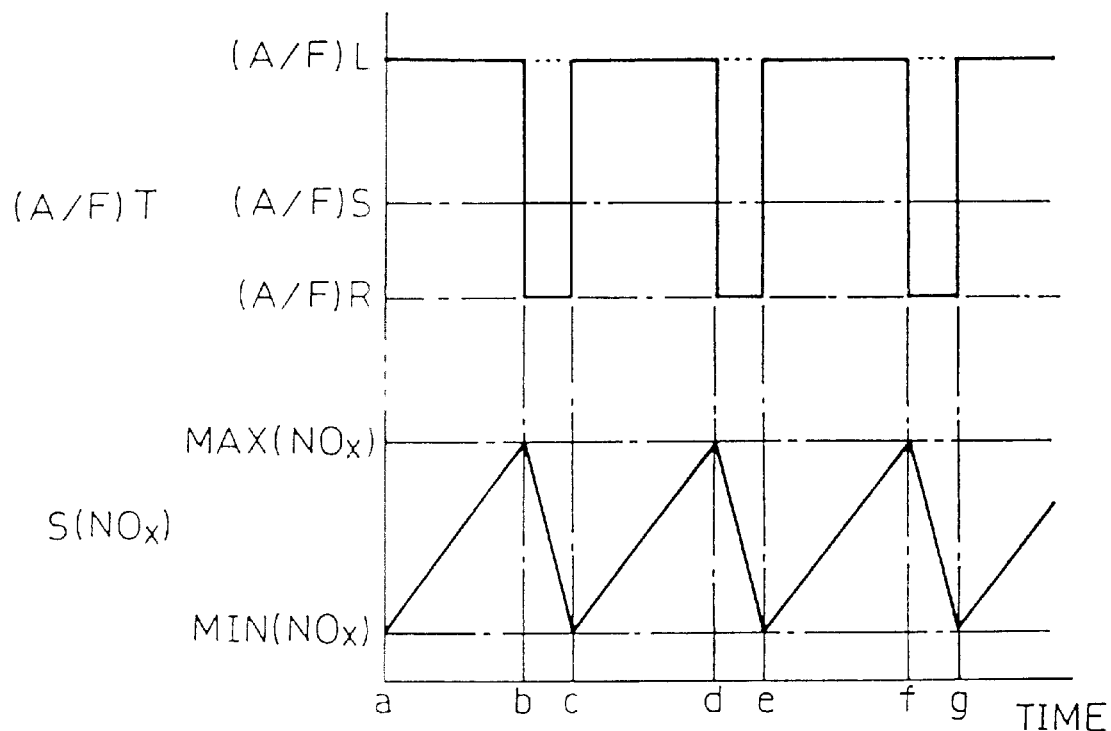
FIG. 38B is a time chart for explaining the exhaust gas purifying method in the engine shown in FIG. 33.

This engine also performs the lean and the rich engine operations alternately and repeatedly, to thereby make the exhaust gas air-fuel ratio of the exhaust gas flowing into the catalysts 8a and 10b lean and rich alternately and repeatedly, as shown in FIG. 38B. When the engine performs the lean operation to make the exhaust gas air-fuel ratio of the exhaust gas flowing into the catalysts 8a and 10b lean, $NO_x$ in the exhaust gas passes through the TW catalyst 8a, and then flows into the $NO_x$-OR catalyst 10b, as shown in FIG. 35B. At this time, the exhaust gas air-fuel ratio of the inflowing exhaust gas is lean, and thus $NO_x$ in the inflowing exhaust gas is occluded in the $NO_x$-OR catalyst 10b.

On the other hand, when the engine performs the rich operation to make the exhaust gas air-fuel ratio of the exhaust gas flowing into the catalysts 8a and 10b rich, a part of the $NO_x$ is converted to $NH_3$ on the TW catalyst 8a, as shown in FIG. 35A. The $NH_3$ then flows into the $NO_x$-OR catalyst 10b. At this time, the exhaust gas air-fuel ratio of the inflowing exhaust gas is rich, and thus the occluded $NO_x$ is released from the $NO_x$-OR catalyst 10b. The released $NO_x$ is reduced by the $NH_3$ in the inflowing exhaust gas, and is thus purified. Note that, even if the $NH_3$ amount inflowing the $NO_x$-OR catalyst 10b exceeds an amount required for purifying the released $NO_x$, the excess $NH_3$ flows into the $NH_3$ purifying catalyst 12, and is purified there. This prevents $NH_3$ from being emitted to the ambient air. Further, the lean and the rich air-fuel ratio (A/F)L and (A/F)R are also set to 25.0 and 13.8, respectively, in this engine.

The $NH_3$ synthesizing catalyst 8 may be combined in any of the described embodiments of the present invention with a $NO_x$-OR catalyst to define a $NO_x$ occluding and $NH_3$ synthesizing catalyst, hereinafter referred to as a $NO_x$-$NH_3$ catalyst. In this case, when the exhaust gas air-fuel ratio of the exhaust gas flowing into $NO_x$-$NH_3$ catalyst is rich, the $NO_x$-$NH_3$ catalyst additionally releases occluded $NO_x$ therefrom and reduces the $NO_x$ in the $NO_x$-$NH_3$ catalyst. When the exhaust gas air-fuel ratio of the exhaust gas flowing into the $NO_x$-$NH_3$ catalyst is lean, the $NO_x$-$NH_3$ catalyst additionally occludes $NO_x$ in inflowing exhaust gas therein.

Next, the method for controlling the lean and the rich operation periods in the engine shown in FIG. 33 will be explained.

It is desirable that the lean operation period TL is made longer, as in the engine shown in FIG. 1, but the $NO_x$-OR catalyst 10b will saturate with $NO_x$ if the lean operation is made too long. On the other hand, if the rich operation is made too short, the target air-fuel ratio (A/F)T has to be changed between the lean and the rich air-fuel ratios frequently. Thus, in this embodiment, the $NO_x$ amount occluded in the $NO_x$-OR catalyst 10b is obtained, and the engine performs the rich operation when the occluded $NO_x$ amount exceeds a predetermined maximum amount in the lean operation, and performs the lean operation when the occluded $NO_x$ amount falls below a predetermined minimum amount in the rich operation.

It is difficult to directly find the occluded $NO_x$ amount in the $NO_x$-OR catalyst 10b. Therefore, in this embodiment, the occluded $NO_x$ amount is estimated on the basis of the $NO_x$ amount flowing into the $NO_x$-OR catalyst 10b, that is, the $NO_x$ amount exhausted from the engine. Namely, the exhausted $NO_x$ amount per unit time $Q(NO_x)$ is calculated using the map shown in FIG. 6.

Figure 36A:
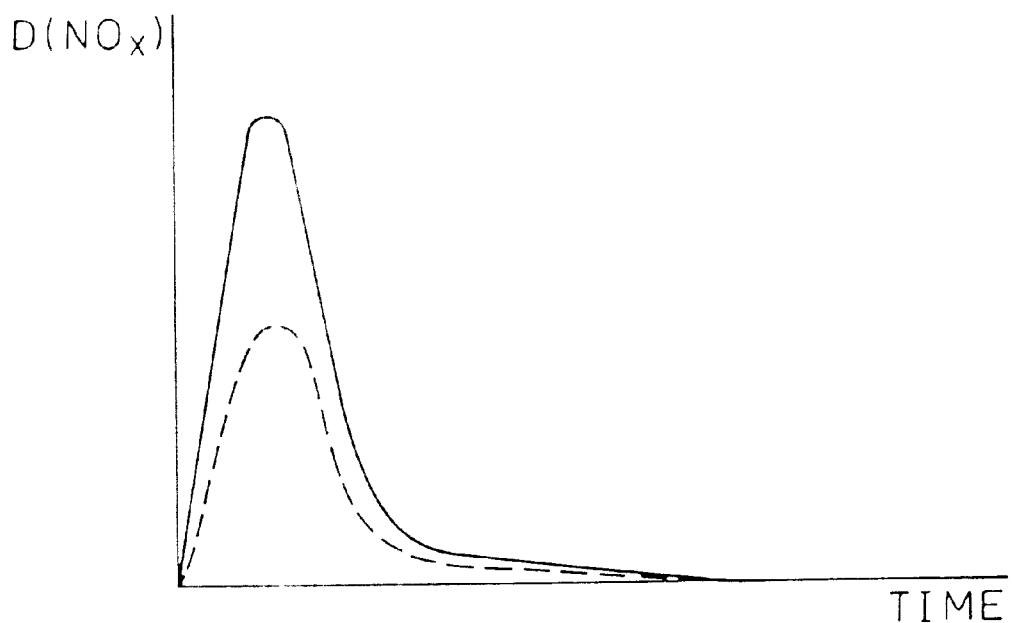
FIGS. 36A and 36B are diagrams illustrating the $NO_x$ amount released from the $NO_x$ occluding and reducing catalyst per unit time.
Figure 36B:
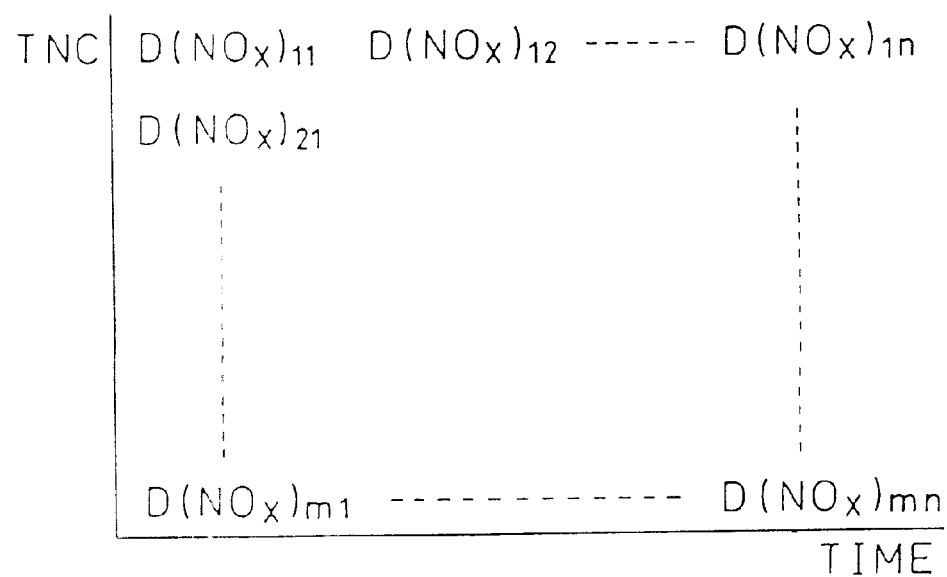

FIG. 36A illustrates the $NO_x$ amount $D(NO_x)$ released from the $NO_x$-OR catalyst 10b per unit time, obtained by experiments. In FIG. 36A, the solid curve shows the case where the temperature of the $NO_x$-OR catalyst 10b is high, and the broken curve shows the case where the temperature of the $NO_x$-OR catalyst 10b is low. Further, in FIG. 36A, TIME represents a time starting from when the rich operation starts, that is, when the exhaust gas air-fuel ratio of the exhaust gas flowing into the catalysts 8a and 10b is changed from the lean air-fuel ratio (A/F)L to the rich air-fuel ratio (A/F)R. The decomposition rate of $NO_x$ in the $NO_x$-OR catalyst 10b becomes higher as the temperature of the catalyst 10b becomes higher. Thus, when the temperature of the $NO_x$-OR catalyst 10b, that is, the temperature of the exhaust gas flowing into the catalyst 10b TNC, is high, as shown by the solid line in FIG. 36A, a large amount of $NO_x$ is released from the $NO_x$-OR catalyst 10b in a short time, while when TNC is low as shown by the broken line in FIG. 36A, a small amount of $NO_x$ is released. In other words, the released $NO_x$ amount per unit time $D(NO_x)$ becomes larger as the exhaust gas temperature TNC becomes higher. The released $NO_x$ amount $D(NO_x)$ is stored in the ROM 22 in advance in the form of a map as shown in FIG. 36B.

Figure 37:
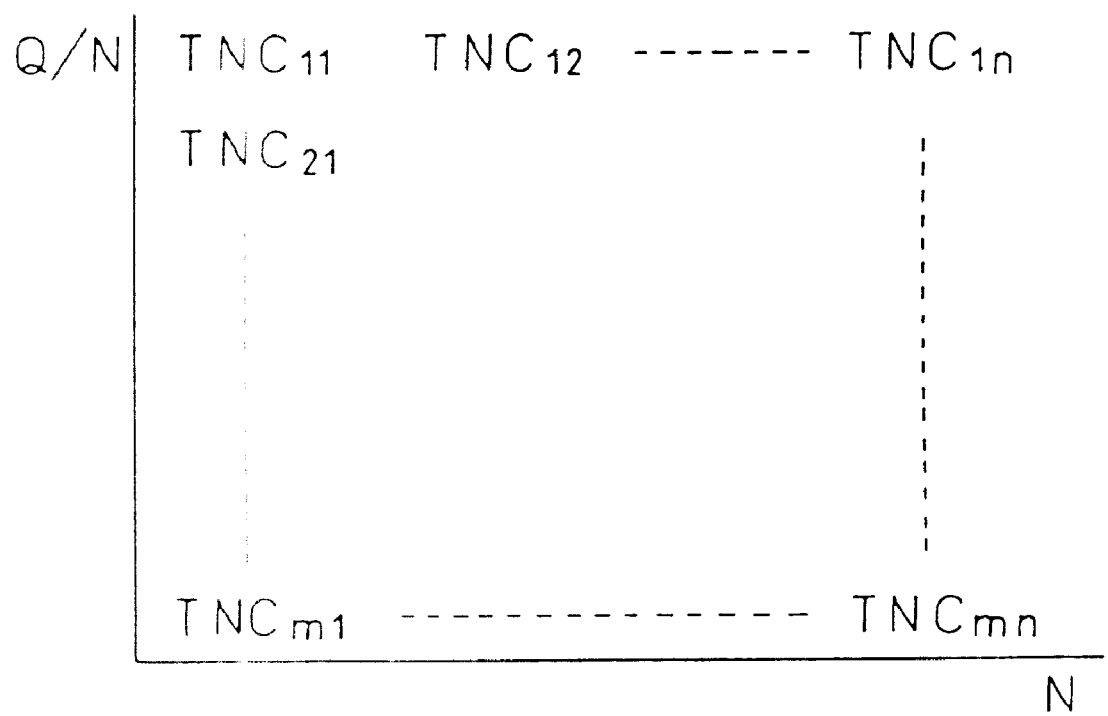
FIG. 37 is a diagram illustrating the temperature of the exhaust gas.

While the exhaust gas temperature TNC may be detected by using a temperature sensor arranged in the exhaust passage, TNC is estimated on the basis of the engine load Q/N and the engine speed N, in this embodiment. That is, TNC is obtained in advance by experiment and is stored in the ROM 22 in advance in the form of a map as shown in FIG. 37.

Next, the method for controlling the operation period for the engine shown in FIG. 33 will be explained in more detail, with reference to FIGS. 38A and 38B. The routine shown in FIG. 38A is executed by interruption every predetermined crank angle.

Referring to FIG. 38A, first, in step 80, it is judged whether FRICH is made 1. FRICH is made 1 when the rich operation is to be performed, and is made zero when the lean operation is to be performed. If FRICH is 1, that is, if the rich operation is to be performed, the routine goes to step 81, where the exhaust gas temperature TNC is calculated using the map shown in FIG. 37. In the following step 82, $D(NO_x)$ is calculated using the map shown in FIG. 36B. In the following step 83, the $NO_x$ amount $S(NO_x)$ occluded in the $NO_x$-OR catalyst 10b is calculated using the following equation:

$$S(NO_x)=S(NO_x)-D(NO_x)\cdot DELTAd$$

where DELTAd is a time interval from the last processing cycle until the present processing cycle. In the following step 84, it is judged whether the occluded $NO_x$ amount $S(NO_x)$ is smaller than the minimum amount $MIN(NO_x)$ If $S(NO_x) \geq MIN(NO_x)$, the processing cycle is ended. Namely, if $S(NO_x) \geq MIN(NO_x)$, it is judged that the occluded $NO_x$ amount $S(NO_x)$ is still large, and thus the rich operation is continued.

If $S(NO_x)<MIN(NO_x)$, the routine goes to step 85, where FRICH is made zero and the processing cycle is ended. Namely, if $S(NO_x)<MIN(NO_x)$, it is judged that the $NO_x$-OR catalyst 10b cannot release $NO_x$ sufficient for the $NH_3$ flowing therein, and thus the rich operation is stopped and the lean engine operation starts (as at the time a, c, e, or g shown in FIG. 38B).

Contrarily, if FRICH=0 in step 80, that is, if the lean operation is to be performed, the routine goes to step 86, where the exhausted $NO_x$ amount $Q(NO_x)$ is calculated using the map shown in FIG. 6B. In the following step 87, the occluded $NO_x$ amount $S(NO_x)$ is calculated using the following equation:

$$S(NO_x)=S(NO_x)+Q(NO_x)\cdot DELTAa$$

where DELTAa is a time interval from the last processing cycle until the present processing cycle. In the following step 88, it is judged whether the occluded $NO_x$ amount $S(NO_x)$ is larger than the maximum amount $MAX(NO_x)$, which is determined in accordance with the occluding capacity of the catalyst 10b. If $S(NO_x) \leq MAX(NO_x)$, the processing cycle is ended. Namely, if $S(NO_x) \leq MAX(NO_x)$, the occluded $NO_x$ amount is judged to be small, and thus the lean operation is continuously performed.

If $S(NO_x)>MAX(NO_x)$, the routine goes to step 89, where FRICH is made 1, and then the processing cycle is ended. Namely, if $S(NO_x)>MAX(NO_x)$, the occluded $NO_x$ amount is considerably large, and the lean operation is stopped and the rich operation starts (as at the time b, d, or f shown in FIG. 38B).

Also, in this embodiment, the exhaust gas can be purified sufficiently without providing a plurality of the exhaust passages. Accordingly, the structure of the exhaust passage is kept small and simple. The other constructions of the exhaust purifying device and the operation thereof are the same as those in the engine shown in FIG. 1, and thus the explanations therefor are omitted.

Figure 39:
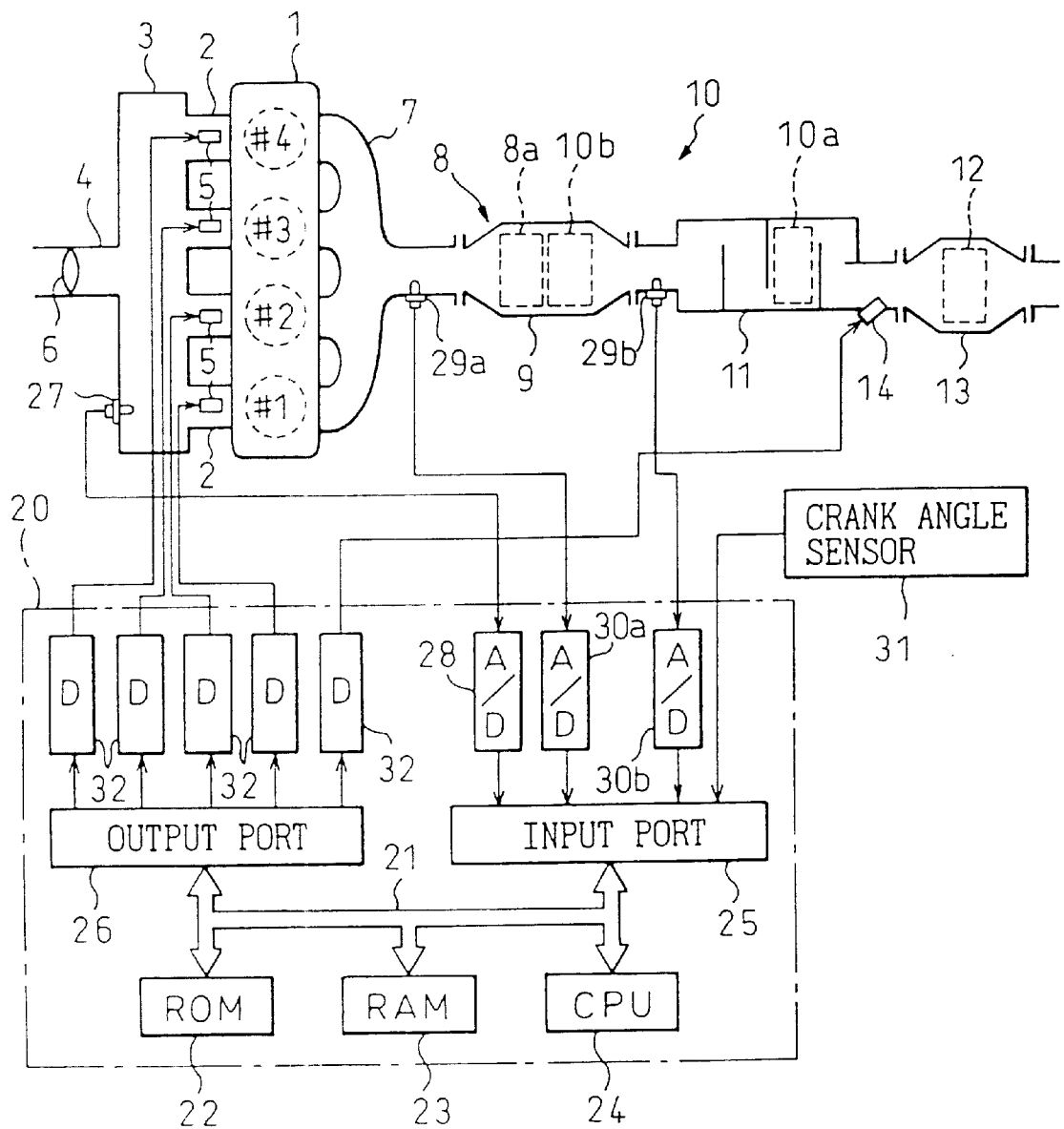
FIG. 39 is a general view of an engine, according to further another embodiment.

Next, a further embodiment will be explained with reference to FIG. 39. In FIG. 39, constituent elements the same as those in FIG. 1 are given the same reference numerals.

Referring to FIG. 39, the exhaust gas purifying catalyst 10 comprises both of the $NH_3$-AO catalyst 10a and the $NO_x$-OR catalyst 10b. The $NO_x$-OR catalyst 10b is carried on the carrier common to the TW catalyst 8a, and the $NH_3$-AO catalyst 10a is arranged in the muffler 11 downstream of the $NO_x$-OR catalyst 10b. Further, the $NH_3$ purifying catalyst 12 is arranged downstream of the $NH_3$-AO catalyst 10a.

In this engine again, the target air-fuel ratio (A/F)T of the cylinders is made equal to the lean and the rich air-fuel ratios (A/F)L and (A/F)R alternately and repeatedly, to thereby make the exhaust gas air-fuel ratio of the exhaust gas flowing into the catalysts 8a, 10b, and 10a lean and rich alternately and repeatedly. In this embodiment, the purification of the exhaust gas is performed mainly by the $NO_x$-OR catalyst 10b, arranged on the upstream side, and the $NH_3$-AO catalyst 10a is auxiliary. Namely, when the exhaust gas air-fuel ratio of the exhaust gas flowing into the catalysts 8a, 10b, and 10a is made lean, as shown in FIG. 40B, $NO_x$ exhausted from the engine passes through the TW catalyst 8a, and then flows into the $NO_x$-OR catalyst 10b. At this time, the exhaust gas air-fuel ratio of the inflowing exhaust gas is lean, and thus $NO_x$ is occluded in the $NO_x$-OR catalyst 10b. Even if the $NO_x$ passes through the $NO_x$-OR catalyst 10b without being occluded, the $NO_x$ is purified in the following $NH_3$-AO catalyst 10a. Namely, at this time, the exhaust gas air-fuel ratio of the inflowing exhaust gas is lean and thus $NH_3$ is desorbed therefrom, and thereby this $NH_3$ reduces $NO_x$. Note that, when the exhaust gas air-fuel ratio of the inflowing exhaust gas is lean, $NH_3$ is desorbed from the $NH_3$-AO catalyst 10a regardless the $NO_x$ amount flowing therein. However, the excess $NH_3$ is purified in the following catalyst 12. Accordingly, $NO_x$ and $NH_3$ both are prevented from being emitted to the ambient air.

When the exhaust gas air-fuel ratio of the exhaust gas flowing into the catalysts 8a, 10b, and 10a is made rich, as shown in FIG. 40A, $NO_x$ exhausted from the engine flows into the TW catalyst 8a, and a part thereof is converted to $NH_3$. The $NH_3$ then flows into the $NO_x$-OR catalyst 10b. At this time, the exhaust gas air-fuel ratio of the inflowing exhaust gas is rich, $NO_x$ is released from the $NO_x$-OR catalyst 10b. The $NO_x$ is reduced and purified by the inflowing $NH_3$. Even if $NH_3$ passes through the $NO_x$-OR catalyst 10b without reducing $NO_x$, the $NH_3$ is adsorbed in the $NH_3$-AO catalyst 10a. Further, even if $NH_3$ passes through the $NH_3$-AO catalyst 10a without being adsorbed therein, the $NH_3$ is purified in the catalyst 12. Accordingly, $NO_x$ and $NH_3$ both are purified sufficiently.

In this embodiment, the lean and the rich operation periods TL and TR are set in accordance with the occluded $NO_x$ amount in the $NO_x$-OR catalyst 10b, as in the engine shown in FIG. 33. Namely, the lean operation is stopped and the rich operation starts when the occluded $NO_x$ amount exceeds over the maximum amount, and the rich operation is stopped and the lean operation starts when the occluded $NO_x$ amount falls below the minimum amount. However, if the occluded $NO_x$ amount exceeds the maximum amount and the catalyst 10b saturates, $NO_x$ passing through the catalyst 10b then flows into the $NH_3$-AO catalyst 10a and is reduced by $NH_3$ desorbed therefrom. Accordingly, precise control of the operation period is unnecessary for purifying $NO_x$ sufficiently.

Alternatively, the lean and the rich operation periods TL and TR may be set in accordance with the $NH_3$ amount adsorbed in the $NH_3$-AO catalyst 10a, as in the engine shown in FIG. 1. Further alternatively, the lean and the rich operation periods TL and TR may be set in the manner that the lean operation is stopped and the rich operation starts when the occluded $NO_x$ amount in the $NO_x$-OR catalyst 10b exceeds the maximum amount therefor, and the rich operation is stopped and the lean operation starts when the adsorbed $NH_3$ amount in the $NH_3$-AO catalyst 10a exceeds the maximum amount therefor. Further alternatively, the rich operation may start when the adsorbed $NH_3$ amount in the $NH_3$-AO catalyst 10a falls below the minimum amount therefor during the lean operation, and lean operation may start when the occluded $NO_x$ amount in the $NO_x$-OR catalyst 10b falls below the minimum amount therefor during the rich operation. In this alternative, setting the minimum amounts for the catalysts 10a and 10b relatively large results in that $NH_3$ is always adsorbed in the $NH_3$-AO catalyst 10a and $NO_x$ is always occluded in the $NO_x$-OR catalyst 10b. Thus, even though the actual engine air-fuel ratio deviates from the target air-fuel ratio (A/F)T due to the engine transient operation, the exhaust gas is purified sufficiently by at least one of the catalysts 10a and 10b. Accordingly, the exhaust gas is purified regardless the engine operation condition.

In this way, the engine shown in FIG. 39 also purifies the exhaust gas with a single exhaust passage.

In the embodiment shown in FIG. 39, the $NO_x$-OR catalyst 10b is arranged on the upstream side, and the $NH_3$-AO catalyst 10a is arranged on the downstream side, considering the endurance temperatures of the catalysts 10a and 10b. Alternatively, the $NH_3$-AO catalyst 10a may be arranged on the upstream side, and the $NO_x$-OR catalyst 10b is arranged on the downstream side. In this alternative, setting the lean and the rich operation periods in accordance with the adsorbed $NH_3$ amount in the $NH_3$-AO catalyst 10a makes the controllability easier. Further alternatively, the catalysts 10a and 10b may be arranged in parallel. The other constructions of the exhaust purifying device and the operation thereof are the same as those in the engine shown in FIG. 1, and thus the explanations therefor are omitted.

Figure 41A:
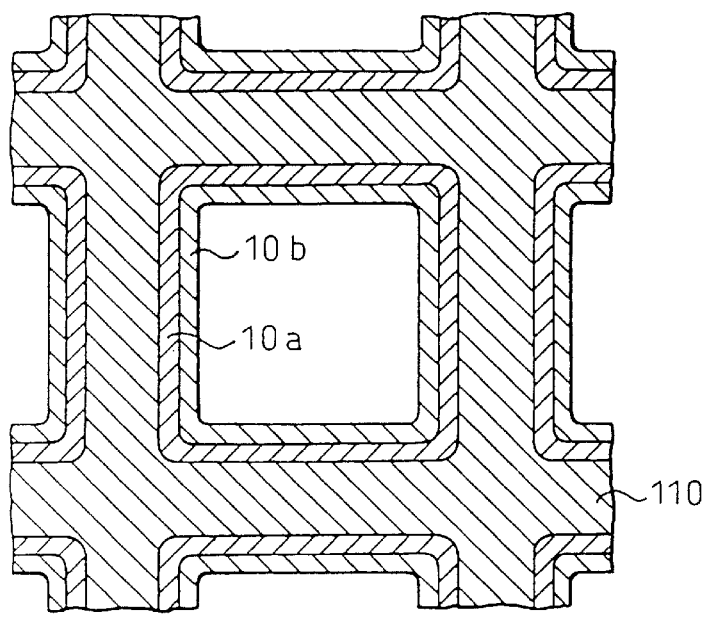
FIGS. 41A and 41B illustrate other embodiments of the structure of the exhaust gas purifying catalyst, respectively.
Figure 41B:
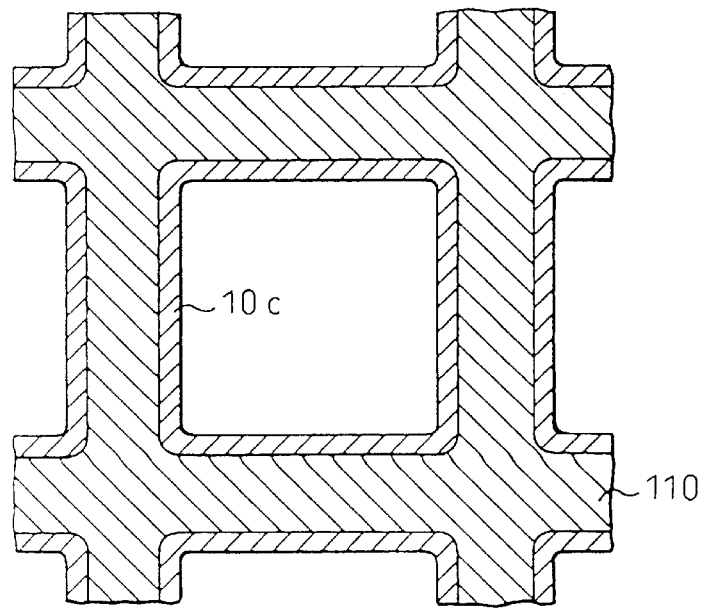

FIGS. 41A and 41B illustrate another embodiment for the arrangement of the exhaust gas purifying catalyst 10.

Referring to FIGS. 41A and 41B, the $NH_3$-AO catalyst 10a and the $NO_x$-OR catalyst 10b are carried on a common substrate, while they are carried on the individual substrates in the embodiment shown in FIG. 39. Namely, in the embodiment shown in FIG. 41A, the catalysts 10a and 10b are laminated to each other and carried on a common substrate 110. As shown in FIG. 41A, a layer comprised of the $NH_3$-AO catalyst 10a is first formed over the surface of the substrate 110 having a honeycomb structure, and then a layer comprised of the $NO_x$-OR catalyst 10b is formed over the $NH_3$-AO catalyst 10a. As mentioned above, the endurance temperature of the $NO_x$-OR catalyst 10b is higher than that of the $NH_3$-AO catalyst 10a. Therefore, covering the $NH_3$-AO catalyst 10a by the $NO_x$-OR catalyst 10b prevents the direct contact of the exhaust gas with the $NH_3$-AO catalyst 10a. As a result, good purification of the exhaust gas is ensured, while ensuring the endurance of the $NH_3$-AO catalyst 10a.

On the other hand, in the embodiment shown in FIG. 41B a layer 10c is carried on the substrate 110. The layer includes the catalysts 10a and 10b in a mixed form. In this case, for example, the $NH_3$-AO catalysts 10a are comprised of zeolite carrying the metal thereon by the ion changing process, and the $NO_x$-OR catalyst 10b is comprised of alumina carrying the precious metal and the alkali metal or alkali earth metal or the like. These catalysts 10a and 10b are mixed and then applied over the surface of the substrate 110.

This way of carrying the catalysts 10a and 10b makes the structure of the exhaust gas purifying device simpler.

Figure 42:
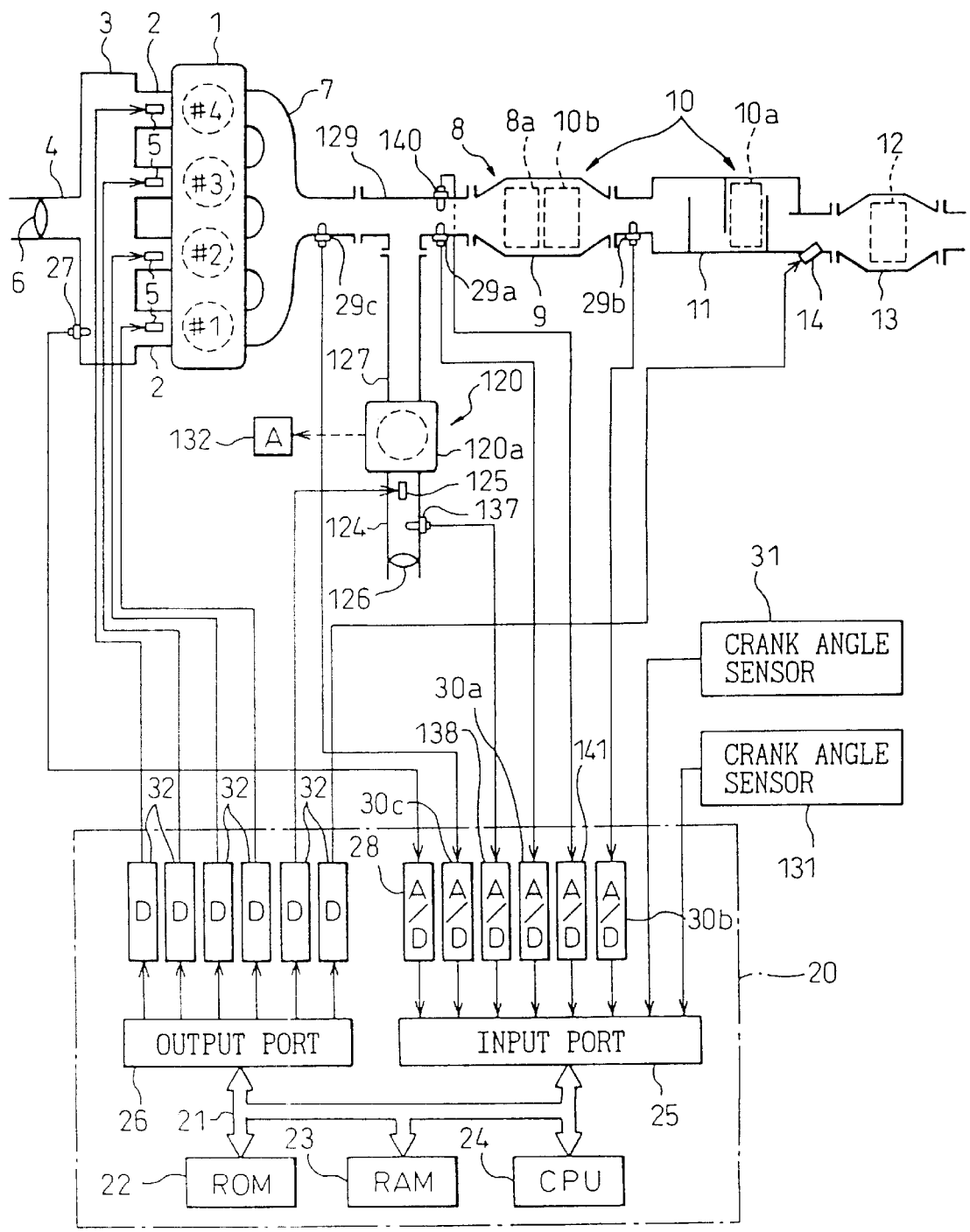
FIG. 42 is a general view of an engine according to a further another embodiment.

Next, another embodiment will be explained with reference to FIG. 42. In FIG. 42, constituent elements the same as those in FIG. 1 are given the same reference numerals. Also, in FIG. 42, the exhaust gas purifying catalyst 10 comprises both the $NH_3$-AO catalyst 10a and the $NO_x$-OR catalyst 10b, but one of them may be omitted.

Referring to FIG. 42, there is provided a making rich device 120 for making the exhaust gas air-fuel ratio of the exhaust gas, flowing into the catalysts 8a, 10a, and 10b, rich. In this embodiment, the device 120 comprises an auxiliary internal combustion engine 120a, of which a crank shaft is different from that of the engine 1. Arranged in an intake duct 124 of the auxiliary engine 120a is a fuel injector 125 for feeding fuel such as gasoline to the auxiliary engine 120a. In the intake duct 124 upstream of the injector 125, a throttle valve 126 is also arranged. On the other hand, an exhaust pipe 127 of the auxiliary engine 120a is connected to an interconnecting pipe 129 connecting both of the exhaust manifold 7 and exhaust pipe 127 to the catalytic converter 9 in which the TW catalyst 8a is housed. Thus, the exhaust gas flowing into, in turn, the catalysts 8a, 10b, 10a, and 12 is a mixture of the exhaust gas from the engine 1 and that from the auxiliary engine 120a. Note that, while the auxiliary engine 120a shown in FIG. 42 is constructed as an spark-ignition type engine having a single cylinder, the auxiliary engine 120a may be constructed as a multi-cylinder engine, or a diesel engine.

Mounted in the intake duct 124 is a pressure sensor 137 generating an output voltage proportional to a pressure in the intake duct 124. The output voltage of the sensor 137 is input via an AD converter 138 to the input port 25. The intake air amount AQ of the auxiliary engine 120a is calculated in the CPU 24 on the basis of the output signals from the AD converter 138. Further, mounted in the collecting portion of the exhaust manifold 7 is an upstream side air-fuel ratio sensor 29c generating an output voltage proportional to an exhaust gas air-fuel ratio of the exhaust gas flowing through the collecting portion of the exhaust manifold 7. The output voltage of the sensor 29c is input via an AD converter 30c to the input port 25. The air-fuel ratio sensor 29a is mounted in the interconnecting pipe 129 downstream on the meeting point where the exhaust gases from the exhaust manifold 7 and the exhaust pipe 127 meet with each other. Thus, the sensor 29a generates an output voltage proportional to the exhaust gas air-fuel ratio of the exhaust gas flowing into the catalysts 8a, 10b, and 10a. Further, connected to the input port 25 is a crank angle sensor 131 generating an output pulse whenever the crank shaft of the auxiliary engine 120a turns by, for example, 30 degrees. The CPU 24 calculates the engine speed AN of the auxiliary engine 120a in accordance with the pulse. Further, arranged in the interconnecting pipe 129 downstream of the meeting point mentioned above is a temperature sensor 140 generating an output voltage proportional to the temperature of the exhaust gas flowing into the catalysts 8a, 10b, and 10a, which represents the temperature of the catalysts 8a and 10b. The output port 26 is connected to the fuel injector 125 via a corresponding drive circuit 32.

The output torque of the engine 1 is used for driving the automobile, for example. Contrarily, the output torque of the auxiliary engine 120a is used for driving an auxiliary device 132, such as a cooling device for an insulated van, a mixer for a concrete mixer truck, an air-conditioner for a bus, and an electric generator for generating the electric power for the electrical motor of the so-called hybrid type vehicle which is driven by the engine and the electrical motor. The throttle valve 126 of the auxiliary engine 120a is controlled in accordance with the required output torque of the auxiliary engine 120a. Alternatively, the auxiliary device 132 may be an auxiliary machinery of the engine 1 such as a cooling water pump, an oil pump, and an alternator.

Figure 43A:
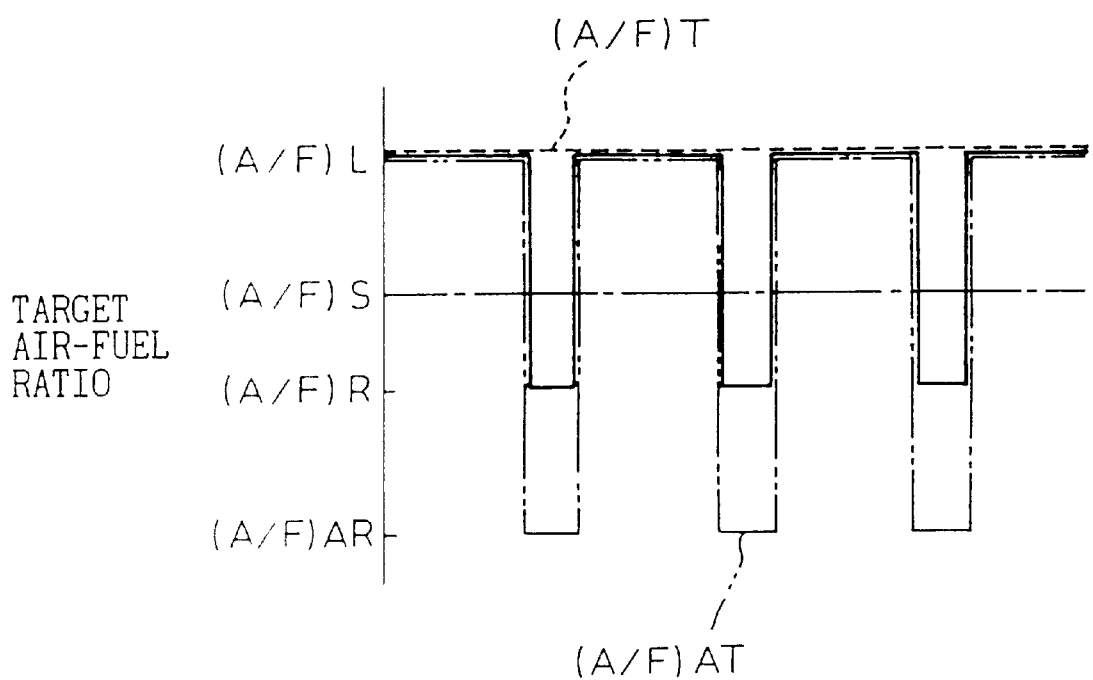
FIG. 43A is a time chart for explaining the exhaust gas purifying method in the engine shown in FIG. 42.

In this embodiment, basically, the engine 1 performs the lean operation continuously with the lean air-fuel ratio (A/F)L such as 25.0, as shown in FIG. 43A by a broken line. This results in further decreasing the fuel consumption rate. Note that, when the engine 1 is quickly accelerated, the engine 1 may perform the stoichiometric operation in which the engine air-fuel ratio is made equal to the stoichiometric air-fuel ratio, to thereby ensure the larger output torque.

On the other hand, in this embodiment, the exhaust gas air-fuel ratio of the exhaust gas flowing into the catalysts 8a, 10b, and 10a is made lean and rich alternately and repeatedly, in particular, is made equal to the lean and the rich air-fuel ratios (A/F)L and (A/F)R alternately and repeatedly, as shown in FIG. 43A by the solid line.

To make the exhaust gas air-fuel ratio of the exhaust gas flowing into the catalysts 8a, 10b, and 10a lean, the auxiliary engine 120a performs a lean operation. In particular, to make the exhaust gas air-fuel ratio of the exhaust gas flowing into the catalysts 8a, 10b, and 10a equal to the lean air-fuel ratio (A/F)L, the exhaust gas air-fuel ratio of the exhaust gas from the auxiliary engine 120a, that is, the engine air-fuel ratio of the auxiliary engine 120a is made equal to the lean air-fuel ratio (A/F)AL. In this embodiment, the exhaust gas air-fuel ratio of the exhaust gas from the engine 1 is made equal to (A/F)L, and thus the lean air-fuel ratio (A/F)AL is identical to (A/F)L. In other word, in this case, the target air-fuel ratio (A/F)AT of the auxiliary engine 120a is made (A/F)L, as shown in FIG. 43A by the two-dot chain line.

To make the exhaust gas air-fuel ratio of the exhaust gas flowing into the catalysts 8a, 10b, and 10a rich, the auxiliary engine 120a performs the rich operation. In particular, to make the exhaust gas air-fuel ratio of the exhaust gas flowing into the catalysts 8a, 10b, and 10a equal to a rich air-fuel ratio (A/F)R such as 13.8, the engine air-fuel ratio of the auxiliary engine 120a is made equal to the rich air-fuel ratio (A/F)AR, which is smaller or richer than the rich air-fuel ratio (A/F)R. In other word, in this case, the target air-fuel ratio (A/F)AT of the auxiliary engine 120a is made (A/F)AR, as shown in FIG. 43A by the two-dot chain line. In this way, the auxiliary engine 120a performs the lean and rich operation alternately and repeatedly, while the engine 1 performs the lean operation continuously.

Figure 43B:
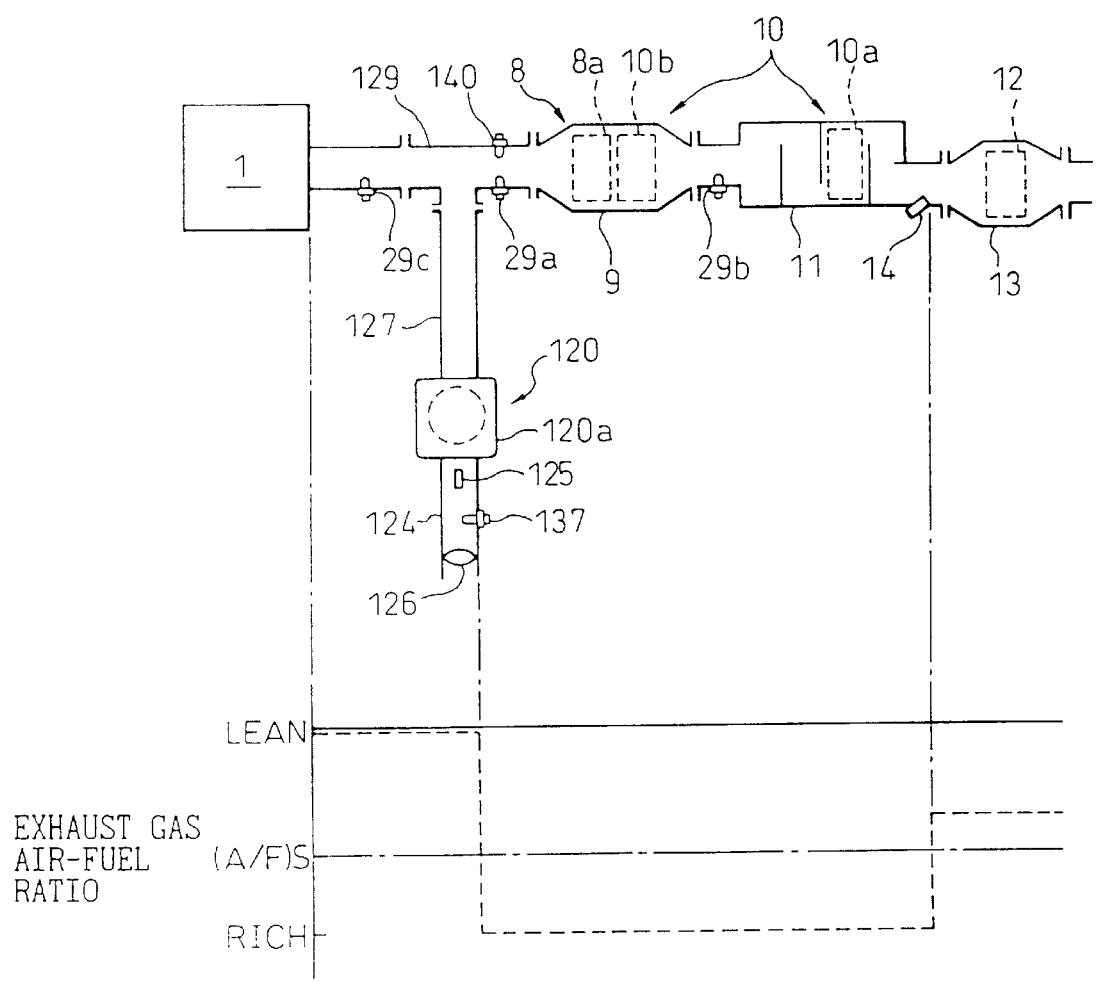
FIG. 43B schematically illustrates the variation in the exhaust gas air-fuel ratio along the exhaust passage.

Namely, the exhaust gas air-fuel ratio of the exhaust gas flowing into the catalysts 8a, 10b, and 10a is kept lean when the auxiliary engine 120a performs the lean operation, as shown in FIG. 43B by the solid line, and is changed to rich when the auxiliary engine 120a performs the rich operation, as shown in FIG. 43B by the broken line.

The engine air-fuel ratio of the engine 1 is made equal to the lean air-fuel ratio (A/F)L on the basis of the output signals from the air-fuel ratio sensor 29c. The engine air-fuel ratio of the auxiliary engine 120a is controlled to make the exhaust gas air-fuel ratio of the exhaust gas flowing into the catalysts 8a, 10b, and 10a equal to the lean and the rich air-fuel ratios (A/F)L and (A/F)R on the basis of the output signals from the air-fuel ratio sensor 29a.

In this embodiment, the lean operation period, which is a period during which the exhaust gas air-fuel ratio of the exhaust gas flowing into the catalyst 8a, 10b, and 10a is made lean, and the rich operation period, which is a period during which the exhaust gas air-fuel ratio of the exhaust gas flowing into the catalysts 8a, 10b, and 10a is made rich, are controlled in accordance with at least one of the $NH_3$ amount $S(NH_3)$ adsorbed in the $NH_3$-AO catalyst 10a, and the $NO_x$ amount $S(NO_x)$ occluded in the $NO_x$-OR catalyst 10b. Namely, the lean and the rich operation of the auxiliary engine 120a is controlled in accordance with at least one of $S(NH_3)$ and $S(NO_x)$. Namely, for example, the engine operation of the auxiliary engine 120a is changed from the lean operation to the rich operation when the adsorbed $NH_3$ amount exceeds the maximum amount therefor, and is changed from the rich operation to the lean operation when the adsorbed $NH_3$ amount falls below the minimum amount therefor.

The occluded $NO_x$ amount $S(NO_x)$ is estimated on the basis of the No, amount flowing into the $NO_x$-OR catalyst 10b, that is, the sum of the $NO_x$ amounts exhausted from the engines 1 and 120a. The adsorbed $NH_3$ amount $S(NH_3)$ is estimated on the basis of the synthesized $NH_3$ amount in the catalyst 8a, which is estimated on the basis of the $NO_x$ amounts exhausted from the engines 1 and 120a, and the released $NO_x$ amount from the $NO_x$-OR catalyst 10b. Note that the temperatures TTC and TNC representing the temperatures of the catalysts 8a and 10b are detected by the sensor 140, and the temperature TAC representing the temperature of the catalyst 10a is estimated on the basis of the output signals from the sensor 140.

Figure 44:
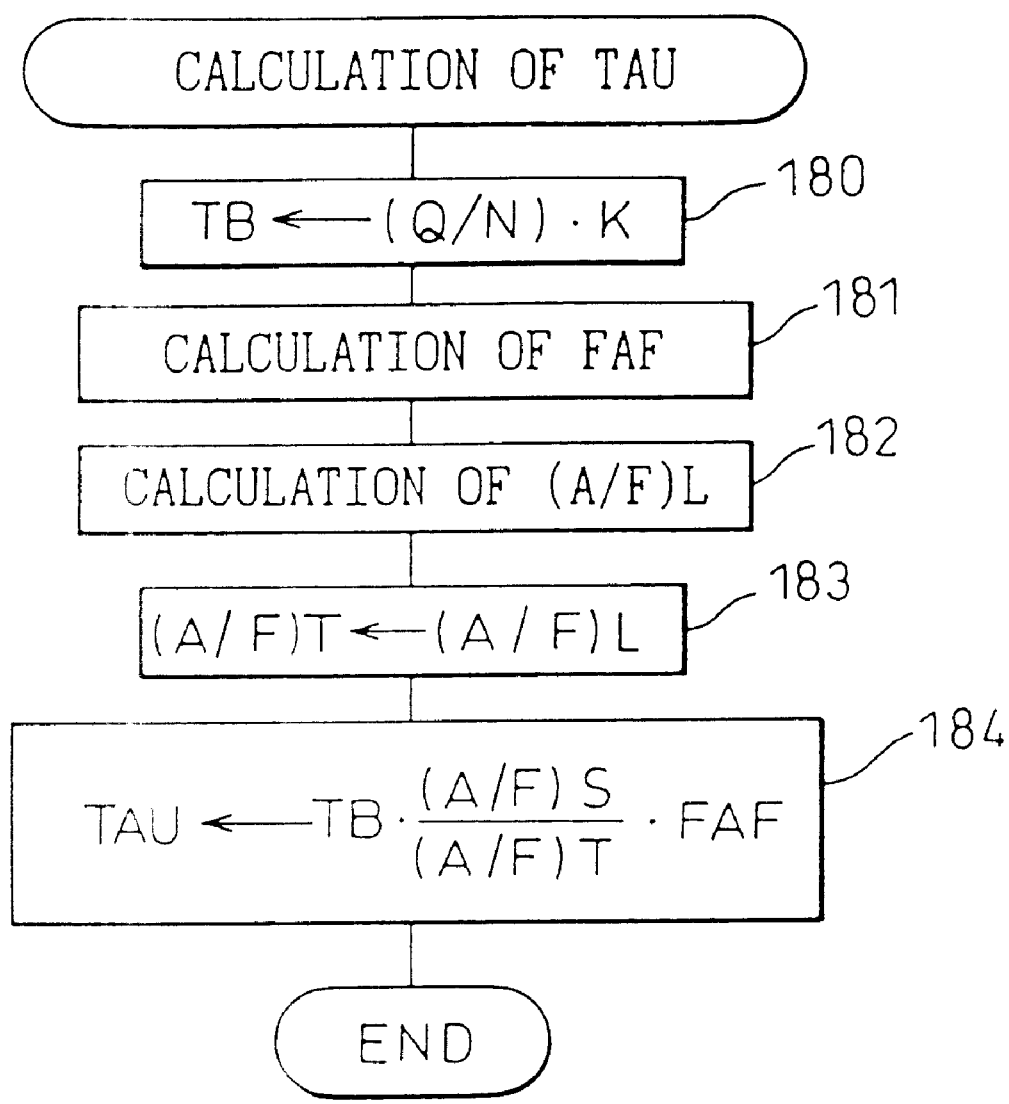
FIGS. 44 and 45 are flow charts for calculating the fuel injection times of the engine and the auxiliary engine.

FIG. 44 illustrates the routine for calculating the fuel injection time TAU for the engine 1.

Referring to FIG. 44, first, in step 180, the basic fuel injection time TB is calculated using the following equation:

$$TB=(Q/N) \cdot K$$

In the following step 181, the feedback correction coefficient FAF is calculated, on the basis of the output signals form the sensor 29c. In the following step 182, the lean air-fuel ratio (A/F)L is calculated. In the following step 183, the lean air-fuel ratio (A/F)L is memorized as the target air-fuel ratio (A/F)T. In the following step 184, the fuel injection time TAU is calculated using the following equation:

$$TAU=TB \cdot ((A/F)S/(A/F)T) \cdot FAF$$

Each fuel injector 5 injects the fuel for the fuel injection time TAU.

Figure 45:
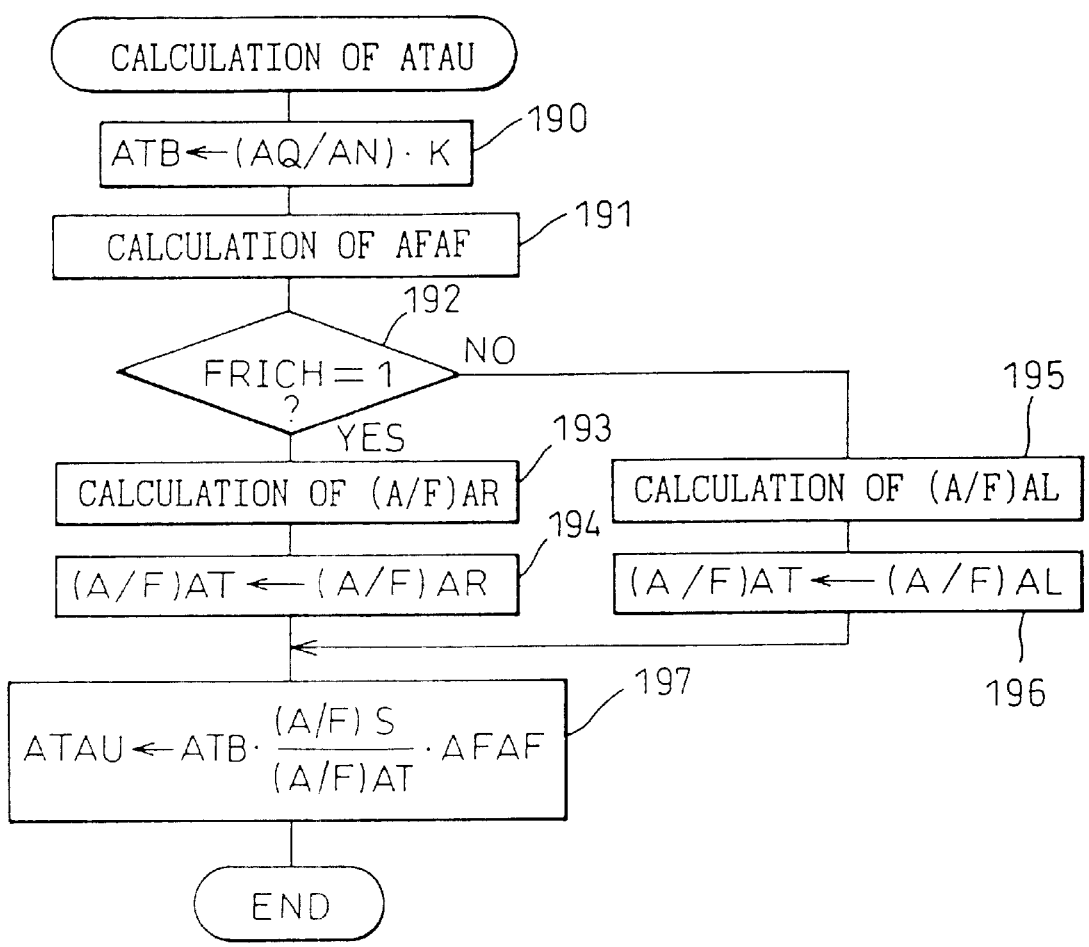

FIG. 45 illustrates the routine for calculating the fuel injection time ATAU for the auxiliary engine 120a.

Referring to FIG. 45, first, in step 190, the basic fuel injection time ATB is calculated using the following equation, on the basis of the engine load AQ/AN and the engine speed AN:

$$ATB=(AQ/AN) \cdot K$$

In the following step 191, the feedback correction coefficient AFAF is calculated on the basis of the output signals from the sensor 29a. The feedback correction coefficient AFAF is for controlling the engine air-fuel ratio of the auxiliary engine 120a to make the exhaust gas air-fuel ratio of the exhaust gas flowing into the catalysts 8a, 10b, and 10a equal to the lean or the rich air-fuel ratio (A/F)L, (A/F)R. In the following step 192, it is judged whether FRICH, which is controlled in the routine shown in FIG. 10, is made 1. If FRICH=1, that is, if the rich operation is to be performed, the routine goes to step 193, where the rich air-fuel ratio (A/F)AR is calculated. In the following step 194, the rich air-fuel ratio (A/F)AR is memorized as the target air-fuel ratio (A/F)AT. Next, the routine goes to step 197.

Contrarily, if FRICH is zero in step 192, that is, if the lean operation is to be performed, the routine goes to step 195, where the lean air-fuel ratio (A/F)AL is calculated. In the following step 196, the lean air-fuel ratio (A/F)AL is memorized as the target air-fuel ratio (A/F)AT. Next, the routine goes to step 197.

In step 197, the fuel injection time ATAU is calculated using the following equation:

$$ATAU=ATB \cdot ((A/F)S/(A/F)AT) \cdot AFAF$$

The fuel injector 125 injects the fuel for the fuel injection time ATAU.

In the embodiment shown in FIG. 42, the engine 1 performs the lean operation continuously and the auxiliary engine 120a performs the lean and the rich operation alternately and repeatedly. In this case, the crank shafts thereof are different to each other, and thus the drivability is prevented from being deteriorated, while ensuring the good purification of the exhaust gas. Further, the auxiliary engine 120a provides an additional output torque. Furthermore, if the engine 1 is originally provided with the auxiliary engine 120a, there is no need to newly provide the making-rich device 120, and thereby the structure of the exhaust gas purifying device is made simpler. The other constructions of the exhaust purifying device and the operation thereof are the same as those in the engine shown in FIG. 1, and thus the explanations therefor are omitted.

Figure 46:
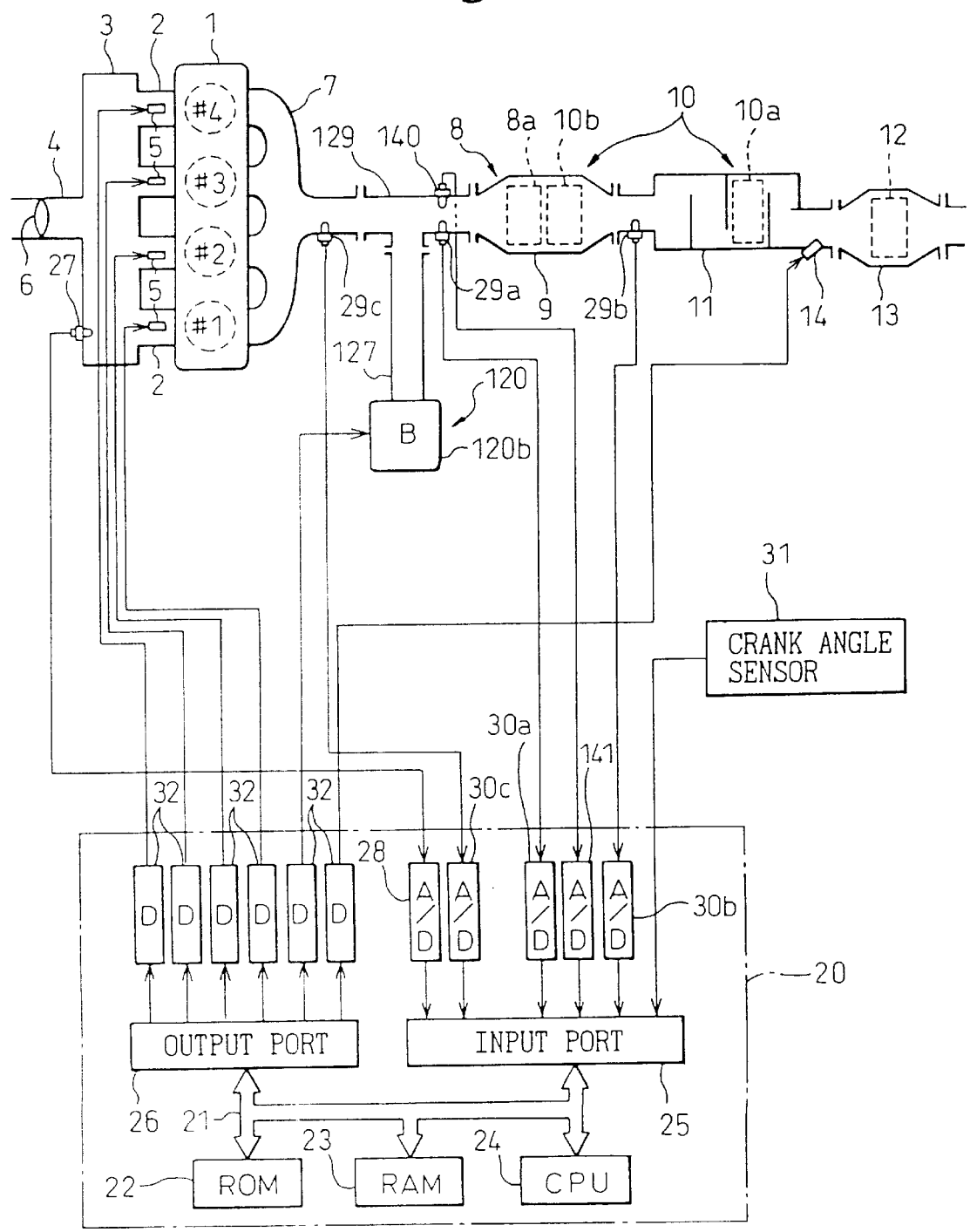
FIG. 46 is a general view of the engine, according to a further another embodiment.

FIG. 46 illustrates still further another embodiment. In FIG. 46, constituent elements the same as those in FIGS. 1 and 42 are given the same reference numerals.

In this embodiment, the making-rich device 120 comprises a burner 120b, of which an air-fuel ratio is controllable. The exhaust gas of the burner 120b flows into the TW catalyst 8a via the pipes 127 and 129, and is mixed with the exhaust gas from the engine 1.

Figure 47:
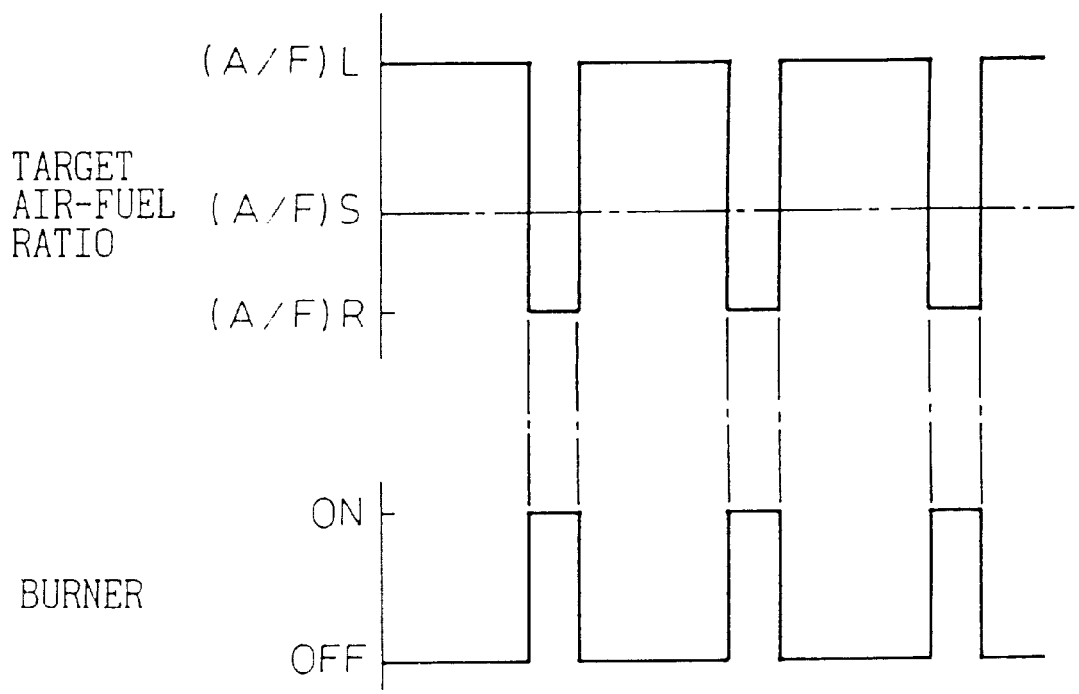
FIG. 47 is a time chart for explaining the exhaust gas purifying method in the engine shown in FIG. 46.

Next, the exhaust gas purifying method in this embodiment will be explained with respect to FIG. 47. The exhaust gas air-fuel ratio of the exhaust gas flowing into the catalysts 8a, 10b, and 10a is made the lean and the rich air-fuel ratios (A/F)L and (A/F)R, alternately and repeatedly, as in the preceding embodiments. However, in this embodiment, the burner 120b is stopped and the engine 1 performs the lean operation with the lean air-fuel ratio (A/F)L, to thereby make the exhaust gas air-fuel ratio of the exhaust gas flowing into the catalysts 8a, 10b, and 10a equal to (A/F)L. The burner 120b performs the rich operation with the rich air-fuel ratio (A/F)AR and the engine 1 performs the lean operation with the lean air-fuel ratio (A/F)L, to thereby make the exhaust gas air-fuel ratio of the exhaust gas flowing into the catalysts 8a, 10b, and 10a equal to (A/F)R. Accordingly, the burner 120b is operated and stopped alternately and repeatedly.

Fuel for the burner 120b may be hydrocarbon such as gasoline, isooctane, hexane, heptane, gas oil, and kerosene or a hydrocarbon which can be stored in a liquid state, such as butane or propane. However, if fuel same as that for the engine 1 is used for the burner 120b, there is no need for providing an additional fuel tank, and thus gasoline is used in this embodiment.

While the burner 120b is connected to the catalytic converter 9 via the pipes 127 and 129, in this embodiment, it may be provided integrally with the converter 9 or the catalyst 8a. Further, the burner 120b may be continuously operated and perform the lean operation with the lean air-fuel ratio such as (A/F)L when making the exhaust gas air-fuel ratio of the exhaust gas flowing into the catalysts 8a, 10b, and 10a lean. The other constructions of the exhaust purifying device and the operation thereof are the same as those in the engine shown in FIG. 42, and thus the explanations therefor are omitted.

Figure 48:
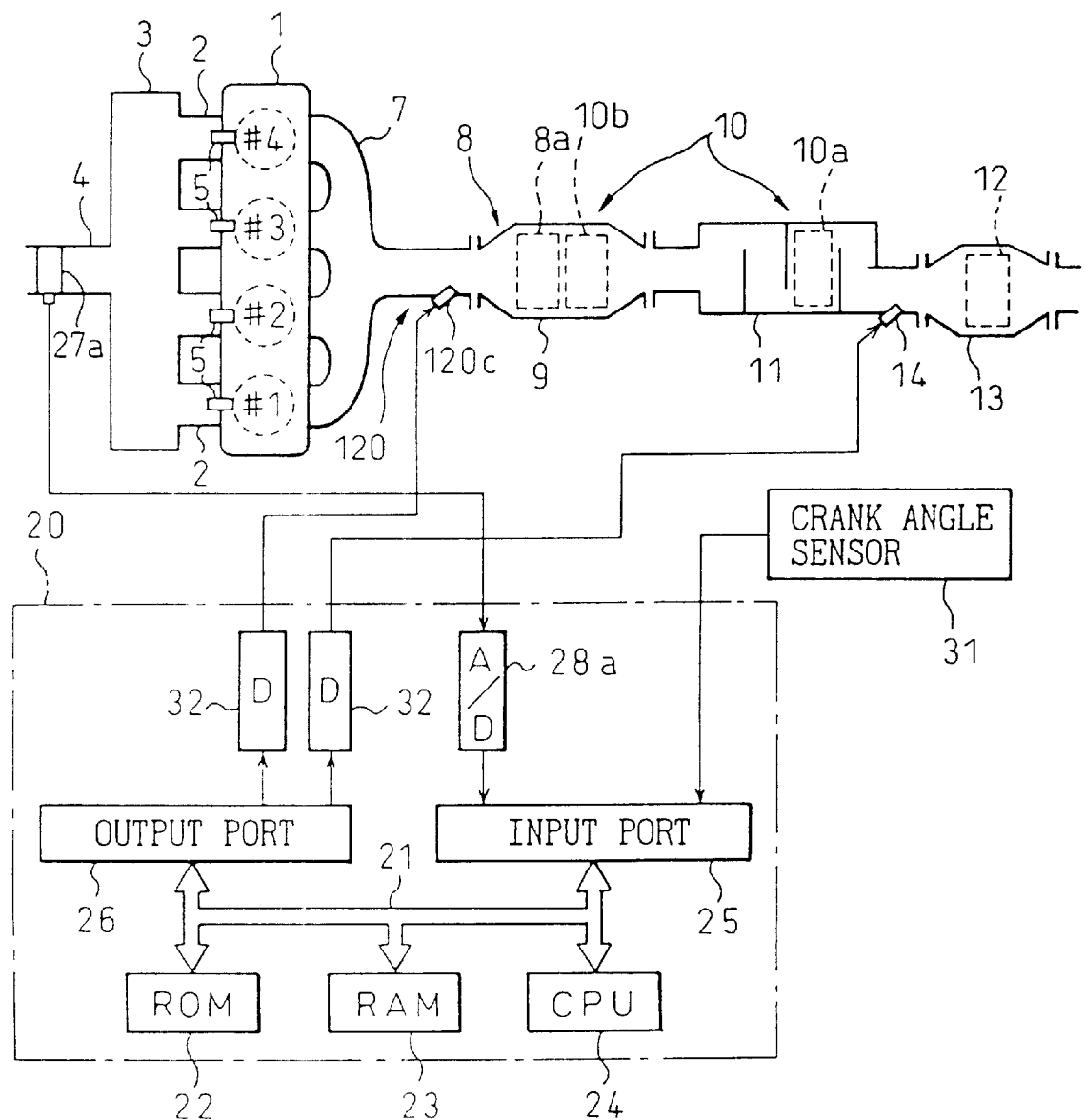
FIG. 48 is a general view of the engine, according to a further another embodiment.

FIG. 48 illustrates still further another embodiment. In FIG. 48, constituent elements the same as those in FIGS. 1 and 42 are given the same reference numerals.

In this embodiment, the engine 1 is constructed as a diesel engine, while the spark-ignition type engine may be adopted. Referring to FIG. 48, each fuel injector 5 injects fuel into the corresponding combustion chamber of the cylinder directly. Also, an air-flow meter 27a is arranged in the intake duct 4. The air-flow meter 27a generates an output voltage proportional to the intake air amount, and the output voltage thereof is input via an AD converter 28a to the input port 25.

As shown in FIG. 48, the making-rich device 120 comprises a reducing agent injector 120c arranged in the outlet of the exhaust manifold 7 for adding a reducing agent into the exhaust gas. The reducing agent may be hydrocarbon such as gasoline, isooctane, hexane, heptane, gas oil, and kerosene or a hydrocarbon which can be stored in a liquid state, such as butane or propane, but is preferable to be the same as that for the engine 1.

The engine 1 performs the lean operation continuously. If a diesel engine performs the rich operation, the engine exhausts a large amount of the black smoke. The black smoke includes a large amount of unburned HC, and the TW catalyst 8a cannot purify the HC sufficiently. On the other hand, providing an additional catalyst only for purifying such HC is undesired. Therefore, the diesel engine shown in FIG. 48 performs the lean operation continuously.

Figure 49:
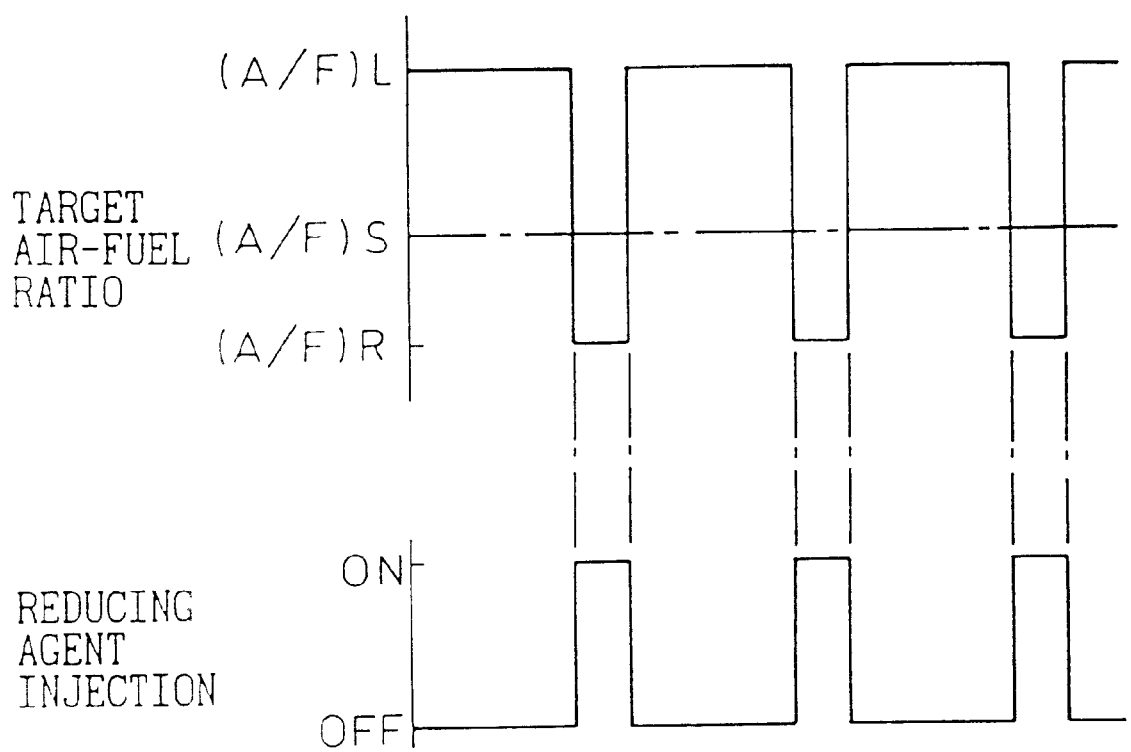
FIG. 49 is a time chart for explaining the exhaust gas purifying method in the engine shown in FIG. 48.

Next, the exhaust gas purifying method in this embodiment will be explained with respect to FIG. 49. The exhaust gas air-fuel ratio of the exhaust gas flowing into the catalysts 8a, 10b, and 10a is made the lean and the rich air-fuel ratios (A/F)L and (A/F)R, alternately and repeatedly. To this end, the reducing agent injection by the reducing agent injector 120b is stopped and the engine 1 performs the lean operation with the lean air-fuel ratio (A/F)L, to thereby make the exhaust gas air-fuel ratio of the exhaust gas flowing into the catalysts 8a, 10b, and 10a equal to (A/F)L. The reducing agent injector 120c injects the reducing agent and the engine 1 performs the lean operation with the lean air-fuel ratio (A/F)L, to thereby make the exhaust gas air-fuel ratio of the exhaust gas flowing into the catalysts 8a, 10b, and 10a equal to (A/F)R. That is, the reducing agent injector 120c injects the reducing agent by an amount required to make the exhaust gas air-fuel ratio of the exhaust gas flowing into the catalysts 8a, 10a, and 10b equal to (A/F)R. In this way, the reducing agent injection by the injector 120c is operated and stopped alternately and repeatedly.

Note that, in the above-mentioned embodiment, when the exhaust gas air-fuel ratio of the exhaust gas flowing into the catalysts 8a, 10b, and 10a is to be made equal to (A/F)L, the reducing agent injection is stopped while the engine 1 performs the lean operation with the lean air-fuel ratio (A/F)L. Alternatively, the reducing agent injector 120c may inject a very small amount of the reducing agent and the engine 1 may perform the lean operation with the lean air-fuel ratio leaner than (A/F)L, to thereby make the exhaust gas air-fuel ratio of the exhaust gas flowing into the catalysts 8a, 10c, and 10a equal to (A/F)L.

Also, a burner may be arranged in the exhaust passage upstream of the TW catalyst 8a to consume the oxygen existing in the exhaust gas, to thereby make the exhaust gas air-fuel ratio rich.

According to the present invention, it is possible to provide a method and a device for purifying an exhaust gas of an engine which can purify the exhaust gas sufficiently with a simple structure.

While the invention has been described by reference to specific embodiments chosen for purposes of illustration, it should be apparent that numerous modifications could be made thereto by those skilled in the art without departing from the basic concept and scope of the invention.

What is claimed is:

1. The method for purifying an exhaust gas of an engine, the method comprising the steps of:

alternately and repeatedly controlling an exhaust gas air-fuel ratio between a lean exhaust gas air-fuel ratio and a rich exhaust gas air-fuel ratio; and introducing the exhaust gas to an $NH_3$ synthesizing catalyst, the $NH_3$ synthesizing catalyst being arranged in series with a $NO_x$ occluding and reducing ($NO_x$-OR) catalyst in a common exhaust passage, the $NH_3$ synthesizing catalyst synthesizing $NH_3$ from $NO_x$ in the $NH_3$ synthesizing catalyst when the exhaust gas air-fuel ratio is rich, and synthesizing almost no $NH_3$ from $NO_x$ in the $NH_3$ synthesizing catalyst when the exhaust gas air-fuel ratio is lean and wherein, when the exhaust gas air-fuel ratio is lean, the $NO_x$-OR catalyst occludes $NO_x$ therein, and when the exhaust gas air-fuel ratio is rich, the NOR-OR catalyst releases the occluded $NO_x$ therefrom and reduces the $NO_x$.

2. The method according to claim 1, further comprising the step of controlling an engine air-fuel ratio between a lean engine air-fuel ratio to thereby form the lean exhaust gas air-fuel ratio and a rich engine air-fuel ratio to thereby form the rich exhaust gas air-fuel ratio.

3. The method according to claim 2, wherein the engine air-fuel ratio is made lean for a lean period, and the engine air-fuel ratio is made rich for a rich period, and wherein the lean and the rich periods are set in accordance with the engine operating condition, respectively.

4. The method according to claim 3, wherein the engine is provided with a plurality of cylinders or cylinder groups of which the exhaust stroke periods are different to each other, and wherein the lean period is set as the number of the cylinders or cylinder groups of which the engine air-fuel ratio is to be made lean, and the rich period is set as the number of the cylinders or cylinder groups of which the engine air-fuel ratio is to be made rich.

5. The method according to claim 4, wherein the number of the cylinders or cylinder groups of which the engine air-fuel ratio is to be made lean and the number of the cylinders or cylinder groups of which the engine air-fuel ratio is to be made rich is set to vary the cylinders or cylinder groups of which the engine air-fuel ratio is to be made rich in every cycle, the cycle being formed by one lean period and one rich period which are successive.

6. The method according to claim 4, wherein the lean and the rich period are controlled in accordance with a number ratio which is a ratio of the number of the cylinders or cylinder groups of which the engine air-fuel ratio is to be made lean to the number of the cylinders or cylinder groups of which the engine air-fuel ratio is to be made rich, the number ratio being set in accordance with the engine operating condition.

7. A method according to claim 2, the engine being an internal combustion engine of spark ignition type, and the method further comprising the step of controlling the ignition timing of the engine in accordance with the engine air-fuel ratio of the engine.

8. The method according to claim 1, wherein a making-rich device, different from the engine, is arranged in an exhaust passage of the engine upstream of the $NH_3$ synthesizing catalyst for making the exhaust gas air-fuel ratio rich, and wherein the method further comprises the steps of keeping an engine air-fuel ratio lean, and stopping a making-rich operation of the making-rich device to thereby form the lean exhaust gas air-fuel ratio, and performing the making-rich operation of the making-rich device to thereby form the rich exhaust gas air-fuel ratio.

9. The method according to claim 8, wherein the making-rich device is provided with: a combustor of which an air-fuel ratio is controllable; and an introducing passage for introducing the exhaust gas of the combustor into the exhaust passage upstream of the $NH_3$ synthesizing catalyst, and wherein the making-rich operation of the making-rich device is performed by making an air-fuel ratio of the combustor rich and adding the exhaust gas of the combustor to the exhaust gas of the engine.

10. The method according to claim 9, wherein the combustor is an auxiliary internal combustion engine having a crank shaft different from that of the engine.

11. The method according to claim 9, wherein the combustor is a burner.

12. The method according to claim 8, wherein the making-rich device is provided with a reducing agent injector for feeding a reducing agent into the exhaust passage upstream of the $NH_3$ synthesizing catalyst, the making-rich operation of the reducing agent injector being performed by adding the reducing agent to the exhaust gas of the engine.

13. The method according to claim 1, the step of estimating an amount of $NO_x$ occluded in the $NO_x$-OR catalyst, and wherein the exhaust gas air-fuel ratio is changed from lean to rich or from rich to lean in accordance with the estimated occluded $NO_x$ amount.

14. The method according to claim 13, wherein the occluded $NO_x$ amount is estimated on the basis of a $NO_x$ amount flowing into the $NO_x$-OR catalyst when the exhaust gas air-fuel ratio of the exhaust gas flowing into the $NO_x$-OR catalyst is lean, and on the basis of the released $NO_x$ amount when the exhaust gas air-fuel ratio of the exhaust gas flowing into the $NO_x$-OR catalyst is rich.

15. The method according to claim 1, wherein the exhaust gas air-fuel ratio is changed from lean to rich or from rich to lean gradually with a changing rate.

16. The method according to claim 15, wherein the changing rate when the exhaust gas air-fuel ratio is changed from lean to rich is larger than that when the exhaust gas air-fuel ratio is changed from rich to lean.

17. The method according to claim 15, wherein the changing rate is set in accordance with the engine operating condition.

18. The method according to claim 17, wherein the changing rate becomes smaller as the engine load becomes higher.

19. The method according to claim 1, wherein the exhaust gas air-fuel ratio is set in accordance with the engine operating condition.

20. The method according to claim 1, wherein a period during which the exhaust gas air-fuel ratio is lean is longer than that during which the exhaust gas air-fuel ratio is rich is formed.

21. The method according to claim 1, wherein the exhaust gas air-fuel ratio is made equal to a target air-fuel ratio on the basis of output signals of an air-fuel ratio sensor arranged in an exhaust passage of the engine adjacent to an inlet of the $NH_3$ synthesizing catalyst.

22. The method according to claim 1, wherein the exhaust gas purifying catalyst is comprised of at least the $NO_x$-OR catalyst, and wherein the $NH_3$ synthesizing catalyst and the $NO_x$-OR catalyst are carried on a common substrate.

23. The method according to claim 1 further comprising the step of introducing the exhaust gas to both of the $NO_x$-OR catalyst and an $NH_3$ adsorbing and oxidizing ($NH_3$-AO) catalyst, after introducing the exhaust gas to the $NH_3$ synthesizing catalyst, the $NH_3$-AO catalyst adsorbing $NH_3$ in the exhaust gas therein, and causing a reaction of $NH_3$ and $NO_x$ in the $NH_3$-AO catalyst to purify the $NH_3$ and the $NO_x$ and to decrease an amount of $NH_3$ adsorbed in the $NH_3$-AO catalyst when the exhaust gas includes $NO_x$ therein and the exhaust gas air-fuel ratio is lean.

24. The method according to claim 23, wherein the $NH_3$-AO catalyst is arranged in the exhaust passage downstream of the $NO_x$-OR catalyst.

25. The method according to claim 24, the engine further having a muffler arranged in the exhaust passage, wherein the $NH_3$-AO catalyst is housed in the muffler.

26. The method according to claim 23, further comprising the step of estimating an amount of $NH_3$ adsorbed in the $NH_3$-AO catalyst, wherein the exhaust gas air-fuel ratio is changed from lean to rich or from rich to lean in accordance with the estimated adsorbed $NH_3$ amount.

27. The method according to claim 26, wherein the adsorbed $NH_3$ amount is estimated on the basis of an $NH_3$ amount flowing into the $NH_3$-AO catalyst when the exhaust gas air-fuel ratio of the exhaust gas flowing into the $NH_3$ synthesizing catalyst is rich, and on the basis of the decreased $NH_3$ amount when the exhaust gas air-fuel ratio of the exhaust gas flowing into the $NH_3$ synthesizing catalyst is lean.

28. The method according to claim 23, wherein the $NH_3$-AO catalyst comprises a solid acid carrying one of a transition metal and a precious metal.

29. The method according to claim 1, further comprising the step of introducing the exhaust gas to both of the $NO_x$-OR catalyst and an $NH_3$ adsorbing and oxidizing ($NH_3$-AO) catalyst, after introducing the exhaust gas to the $NH_3$ synthesizing catalyst, the $NH_3$-AO catalyst adsorbing $NH_3$ in the exhaust gas therein and causing a reaction of $NH_3$ and $NO_x$ in the $NH_3$-AO catalyst to purify the $NH_3$ and the $NO_x$ and to decrease an amount of $NH_3$ adsorbed in the $NH_3$-AO catalyst when the exhaust gas includes $NO_x$ therein and the exhaust gas air-fuel ratio is lean, and wherein the $NH_3$-AO catalyst and the $NO_x$-OR catalyst are laminated to each other on a common substrate.

30. The method according to claim 1, wherein the $NH_3$ synthesizing catalyst is a three-way catalyst including at least one precious metal.

31. The method according to claim 1, wherein the $NO_x$-OR catalyst includes: at least one substance selected from alkali metals, alkali earth metals, rare earth metals such as lanthanum and yttrium, and transition metals and precious metals.

32. The method according to claim 1, further comprising the step of introducing the exhaust gas to an $NH_3$ purifying catalyst for purifying $NH_3$ in the exhaust gas, after introducing the exhaust gas to the $NO_x$-OR catalyst.

33. The method according to claim 32, wherein the $NH_3$ purifying catalyst includes at least one substance selected from precious metals, and transition metals.

34. The method according to claim 32, the $NH_3$ purifying catalyst purifying $NH_3$ under the oxidizing atmosphere, wherein the method further the step of comprises keeping the exhaust gas air-fuel ratio of the exhaust gas flowing into the $NH_3$ purifying catalyst lean.

35. The method according to claim 1, wherein the $NH_3$ synthesizing catalyst is a $NO_x$ occluding and $NH_3$ synthesizing ($NO_x$-$NH_3$) catalyst, the $NO_x$-$NH_3$ catalyst occluding $NO_x$ in the exhaust gas therein when the exhaust gas air-fuel ratio is lean, the $NO_x$-$NH_3$ catalyst releasing occluded $NO_x$ therefrom, reducing $NO_x$ in the $NO_x$-$NH_3$ catalyst, and synthesizing $NH_3$ from $NO_x$ in the $NO_x$-$NH_3$ catalyst when the exhaust gas air-fuel ratio is rich.

36. The method according to claim 35, further comprising the step of estimating an amount of $NO_x$ occluded in the $NO_x$-$NH_3$ catalyst, and wherein the exhaust gas air-fuel ratio of the exhaust gas flowing into the $NO_x$-$NH_3$ catalyst is made lean and rich alternately and repeatedly in accordance with the estimated occluded $NO_x$ amount.

37. The method according to claim 35, further comprising the step of estimating an amount of $NO_x$ occluded in the $NO_x$-OR catalyst, and wherein the exhaust gas air-fuel ratio of the exhaust gas flowing into the $NO_x$-$NH_3$ catalyst is made lean and rich alternately and repeatedly in accordance with the estimated occluded $NO_x$ amount.

38. The method according to claim 35, wherein the $NO_x$-$NH_3$ catalyst includes:
    at least one substance selected from alkali metals, alkali earth metals, rare earth metals, and transition metals; and
    precious metals.

39. The method according to claim 35, wherein the $NO_x$-OR catalyst includes:
    at least one substance selected from alkali metals, alkali earth metals, rare earth metals, and transition metals; and
    precious metals.

40. The device for purifying an exhaust gas of an engine having an exhaust passage, comprising:
    exhaust gas air-fuel ratio controlling means arranged in one of the engine and the exhaust passage for alternately and repeatedly controlling an exhaust gas air-fuel ratio between a lean exhaust gas air-fuel ratio and a rich exhaust gas air-fuel ratio;
    an $NH_3$ synthesizing catalyst arranged in the exhaust passage downstream of the exhaust gas air-fuel ratio controlling means, the $NH_3$ synthesizing catalyst synthesizing $NH_3$ from $NO_x$ in the $NH_3$ synthesizing catalyst when the exhaust gas air-fuel ratio is rich, and synthesizing almost no $NH_3$ from $NO_x$ in the $NH_3$ synthesizing catalyst when the exhaust gas air-fuel ratio is lean; and
    a $NO_x$ occluding and reducing ($NO_x$-OR) catalyst arranged in the exhaust passage downstream of the $NH_3$ synthesizing catalyst, the $NO_x$-OR catalyst occluding $NO_x$ in the exhaust gas therein when the exhaust gas air-fuel ratio is lean, and releasing the occluded $NO_x$ therefrom and reducing the $NO_x$ when the exhaust gas air-fuel ratio is rich.

41. The device according to claim 40, wherein the exhaust gas air-fuel ratio controlling means comprises an engine air-fuel ratio control means for controlling an engine air-fuel ratio between a lean engine air-fuel ratio to thereby form the lean exhaust gas air-fuel ratio and a rich engine air-fuel ratio to thereby form the rich exhaust gas air-fuel ratio.

42. The device according to claim 41, wherein the engine air-fuel ratio control means makes the engine air-fuel ratio lean for a lean period, and makes the engine air-fuel ratio rich for a rich period, and wherein the lean and the rich periods are set in accordance with the engine operating condition, respectively.

43. The device according to claim 42, wherein the engine is provided with a plurality of cylinders or cylinder groups of which the exhaust stroke periods are different to each other, and wherein the lean period is set as the number of the cylinders or cylinder groups of which the engine air-fuel ratio is to be made lean, and the rich period is set as the number of the cylinders or cylinder groups of which the engine air-fuel ratio is to be made rich.

44. The device according to claim 43, wherein the number of the cylinders or cylinder groups of which the engine air-fuel ratio is to be made lean and the number of the cylinders or cylinder groups of which the engine air-fuel ratio is to be made rich are set to vary the cylinders or cylinder groups of which the engine air-fuel ratio is to be made rich in every cycle, the cycle being formed by one lean period and one rich period which are successive.

45. The device according to claim 43, wherein the lean and the rich period are controlled in accordance with a number ratio which is a ratio of the number of the cylinders or cylinder groups of which the engine air-fuel ratio is to be made lean to the number of the cylinders or cylinder groups of which the engine air-fuel ratio is to be made rich, the number ratio being set in accordance with the engine operating condition.

46. The device according to claim 41, the engine being an internal combustion engine of spark ignition type, and the device further comprising ignition timing control means for controlling the ignition timing of the engine in accordance with the engine air-fuel ratio.

47. The device according to claim 40, wherein the exhaust gas air-fuel ratio controlling means comprises making-rich means, different from the engine, arranged in the exhaust passage upstream of the $NH_3$ synthesizing catalyst for making the exhaust gas air-fuel ratio rich, and keeping means for keeping the engine air-fuel ratio lean, and wherein the making-rich means stops a making-rich operation thereof to thereby form the lean exhaust gas air-fuel ratio, and performs the making-rich operation thereof to thereby form the rich exhaust gas air-fuel ratio.

48. The device according to claim 47, wherein the making-rich means comprises: a combustor of which an air-fuel ratio is controllable; and an introducing passage for introducing the exhaust gas of the combustor into the exhaust passage upstream of the $NH_3$ synthesizing catalyst, and wherein the making-rich means performs the making-rich operation thereof by making an air-fuel ratio of the combustor rich and adding the exhaust gas of the combustor to the exhaust gas of the engine.

49. The device according to claim 48, wherein the combustor is an auxiliary internal combustion engine having a crank shaft different from that of the engine.

50. The device according to claim 48 wherein the combustor is a burner.

51. The device according to claim 47, wherein the making-rich means comprises a reducing agent injector for feeding a reducing agent into the exhaust passage upstream of the $NH_3$ synthesizing catalyst, the reducing agent injector performing the making-rich operation thereof by adding the reducing agent to the exhaust gas of the engine.

52. The device according to claim 40, wherein the device further comprises occluded $NO_x$ amount estimating means for estimating an amount of $NO_x$ occluded in the $NO_x$-OR catalyst, and wherein the exhaust gas air fuel ratio controlling means changes the exhaust gas air-fuel ratio from lean to rich or from rich to lean in accordance with the estimated occluded $NO_x$ amount.

53. The device according to claim 52, wherein the occluded $NO_x$ amount estimating means estimates the occluded $NO_x$ amount on the basis of a $NO_x$ amount flowing into the $NO_x$-OR catalyst when the exhaust gas air-fuel ratio of the exhaust gas flowing into the $NO_x$-OR catalyst is lean, and on the basis of the released $NO_x$ amount when the exhaust gas air-fuel ratio of the exhaust gas flowing into the $NO_x$-OR catalyst is rich.

54. The device according to claim 40, wherein the exhaust gas air fuel ratio controlling means changes the exhaust gas air-fuel ratio from lean to rich or from rich to lean gradually with a changing rate.

55. The device according to claim 54, wherein the changing rate when the exhaust gas air-fuel ratio controlling means changes the exhaust gas air-fuel ratio from lean to rich is larger than that when the exhaust gas air-fuel ratio controlling means changes the exhaust gas air-fuel ratio from rich to lean.

56. The device according to claim 54, wherein the changing rate is set in accordance with the engine operating condition.

57. The device according to claim 56, wherein the changing rate becomes smaller as the engine load becomes higher.

58. The device according to claim 40, wherein the exhaust gas air-fuel ratio is set in accordance with the engine operating condition.

59. The device according to claim 40, wherein a period during which the exhaust gas air-fuel ratio controlling means forms the lean exhaust gas air-fuel ratio is longer than that during which the exhaust gas air-fuel ratio controlling means forms the rich exhaust gas air-fuel ratio.

60. The device according to claim 40, further comprising an air-fuel ratio sensor arranged in the exhaust passage between the exhaust gas air-fuel ratio controlling means and the $NH_3$ synthesizing catalyst, and wherein the exhaust gas air-fuel ratio controlling means makes the exhaust gas air-fuel ratio equal to a target air-fuel ratio on the basis of the output signals of the air-fuel ratio sensor.

61. The device according to claim 40, wherein the $NH_3$ synthesizing catalyst and the $NO_x$-OR catalyst are carried on a common substrate.

62. The device according to claim 40, further comprising an $NH_3$ adsorbing and oxidizing ($NH_3$-AO) catalyst arranged in the exhaust passage downstream of the $NH_3$ synthesizing catalyst, the $NH_3$-AO catalyst adsorbing $NH_3$ in the exhaust gas therein, and causing a reaction of $NH_3$ and $NO_x$ in the $NH_3$-AO catalyst to purify the $NH_3$ and the $NO_x$ and to decrease an amount of $NH_3$ adsorbed in the $NH_3$-AO catalyst when the exhaust gas includes $NO_x$ therein and the exhaust gas air-fuel ratio is lean.

63. The device according to claim 62, wherein the $NH_3$-AO catalyst is arranged in the exhaust passage downstream of the $NO_x$-OR catalyst.

64. The device according to claim 63, the engine further having a muffler arranged in the exhaust passage, wherein the $NH_3$-AO catalyst is housed in the muffler.

65. The device according to claim 62, further comprising adsorbed $NH_3$ amount estimating means for estimating an amount of $NH_3$ adsorbed in the $NH_3$-AO catalyst, and wherein the exhaust gas air-fuel ratio controlling means changes the exhaust gas air-fuel ratio from lean to rich or from rich to lean in accordance with the estimated adsorbed $NH_3$ amount.

66. The device according to claim 65, wherein the adsorbed $NH_3$ amount is estimated on the basis of an $NH_3$ amount flowing into the $NH_3$-AO catalyst when the exhaust gas air-fuel ratio of the exhaust gas flowing into the $NH_3$ synthesizing catalyst is rich, and on the basis of the decreased $NH_3$ amount when the exhaust gas air-fuel ratio of the exhaust gas flowing into the $NH_3$ synthesizing catalyst is lean.

67. The device according to claim 62, wherein the $NH_3$-AO catalyst comprises a solid acid carrying one of a transition metal and a precious metal.

68. The device according to claim 40, further comprising an $NH_3$ adsorbing and oxidizing ($NH_3$-AO) catalyst arranged in the exhaust passage downstream of the $NH_3$ synthesizing catalyst, the $NH_3$-AO catalyst adsorbing $NH_3$ in the exhaust gas therein, and causing a reaction of $NH_3$ and $NO_x$ in the $NH_3$-AO catalyst to purify the $NH_3$ and the $NO_x$ and to decrease an amount of $NH_3$ adsorbed in the $NH_3$-AO catalyst when the exhaust gas includes $NO_x$ therein and the exhaust gas air-fuel ratio is lean, and wherein the $NH_3$-AO catalyst and the $NO_x$-OR catalyst are laminated to each other on a common substrate.

69. The device according to claim 40, wherein the $NH_3$ synthesizing catalyst is a three-way catalyst including at least one precious metal.

70. The device according to claim 40, wherein the $NO_x$-OR catalyst includes: at least one substance selected from alkali metals, alkali earth metals, rare earth metals, and transition metals; and precious metals.

71. The device according to claim 40, further comprising an $NH_3$ purifying catalyst arranged downstream of the exhaust gas purifying catalyst for purifying $NH_3$ in the inflowing exhaust gas.

72. The device according to claim 71, wherein the $NH_3$ purifying catalyst includes at least one substance selected from precious metals and transition metals.

73. The device according to claim 71, the $NH_3$ purifying catalyst purifying $NH_3$ under the oxidizing atmosphere, wherein the device further comprises keeping-lean means arranged in the exhaust passage between the exhaust gas purifying catalyst and the $NH_3$ purifying catalyst for keeping the exhaust gas air-fuel ratio of the exhaust gas flowing into the $NH_3$ purifying catalyst lean.

74. The device according to claim 40, wherein the $NH_3$ synthesizing catalyst is a $NO_x$ occluding and $NH_3$ synthesizing ($NO_x$-$NH_3$) catalyst, the $NO_x$-$NH_3$ catalyst occluding $NO_x$ in the exhaust gas therein when the exhaust gas air-fuel ratio is lean, the $NO_x$-$NH_3$ catalyst releasing the occluded $NO_x$ therefrom, reducing the $NO_x$ in the $NO_x$-$NH_3$ catalyst and synthesizing $NH_3$ from $NO_x$ in the $NO_x$-$NH_3$ catalyst when the exhaust gas air-fuel ratio is rich.

75. The device according to claim 74, further comprising occluded $NO_x$ amount estimating means for estimating an amount of $NO_x$ occluded in the $NO_x$-$NH_3$ catalyst, and wherein the exhaust gas air-fuel ratio of the exhaust gas flowing into the $NO_x$-$NH_3$ catalyst is made lean and rich alternately and repeatedly in accordance with the estimated occluded $NO_x$ amount.

76. The device according to claim 74, further comprising occluded $NO_x$ amount estimating means for estimating an amount of $NO_x$ occluded in the $NO_x$-OR catalyst, and wherein the exhaust gas air-fuel ratio of the exhaust gas flowing into the $NO_x$-$NH_3$ catalyst is made lean and rich alternately and repeatedly in accordance with the estimated occluded $NO_x$ amount.

77. The device according to claim 74, wherein the $NO_x$-$NH_3$ catalyst includes:

at least one substance selected from alkali metals, alkali earth metals, rare earth metals, and transition metals; and precious metals.

78. The device according to claim 74, wherein the $NO_x$-OR catalyst includes:

at least one substance selected from alkali metals, alkali earth metals, rare earth metals, and transition metals; and precious metals.

79. The method for purifying an exhaust gas of an engine, the method comprising the steps of:

alternately and repeatedly controlling an exhaust gas air-fuel ratio between a lean exhaust gas air-fuel ratio and a rich exhaust gas air-fuel ratio; and introducing the exhaust gas to a $NH_3$ synthesizing catalyst, the $NH_3$ synthesizing catalyst synthesizing $NH_3$ from $NO_x$ in the $NH_3$ synthesizing catalyst when the exhaust gas air-fuel ratio is rich and synthesizing almost no $NH_3$ from $NO_x$ in the $NH_3$ synthesizing catalyst when the exhaust gas air-fuel ratio is lean and wherein a $NH_3$ adsorbing and oxidizing ($NH_3$-AO) catalyst is arranged downstream of the $NH_3$ synthesizing catalyst in a common exhaust passage therewith, and wherein, when the exhaust gas air-fuel ratio is lean, the $NH_3$-AO catalyst adsorbs $NH_3$ in the exhaust gas therein, causes a reaction of $NH_3$ and $NO_x$ in the $NH_3$-AO catalyst to purify the $NH_3$ and the $NO_x$ and decreases an amount of $NH_3$ adsorbed in the $NH_3$-AO catalyst when the exhaust gas includes $NO_x$ therein.

80. The method according to claim 79, further comprising the step of controlling an engine air-fuel ratio between a lean engine air-fuel ratio to thereby form the lean exhaust gas air-fuel ratio and a rich engine air-fuel ratio to thereby form the rich exhaust gas air-fuel ratio.

81. The method according to claim 80, wherein the engine air-fuel ratio is made lean for a lean period, and the engine air-fuel ratio is made rich for a rich period, and wherein the lean and the rich periods are set in accordance with the engine operating condition.

82. The method according to claim 81, wherein the engine is provided with a plurality of cylinders or cylinder groups of which the exhaust stroke periods are different to each other, and wherein the lean period is set as the number of the cylinders or cylinder groups of which the engine air-fuel ratio is made to be lean, and the rich period is set as the number of the cylinders or cylinder groups of which the engine air-fuel ratio is to be made rich.

83. The method according to claim 80, the engine being an internal combustion engine of spark ignition type, and the method further comprising the step of controlling the ignition timing of the engine in accordance with the engine air-fuel ratio.

84. The method according to claim 79, wherein a making-rich device, different from the engine, is arranged in the exhaust passage of an engine upstream of the $NH_3$ synthesizing catalyst for making the exhaust gas air-fuel ratio rich, and wherein the method further comprises the steps of keeping an engine air-fuel ratio lean, and stopping a making-rich operation of the making-rich device to thereby form the lean exhaust gas air-fuel ratio, and performing the making-rich operation of the making-rich device to thereby form the rich exhaust gas air-fuel ratio.

85. The method according to claim 84, wherein the making rich device is provided with: a combustor of which an air-fuel ratio is controllable; and an introducing passage for introducing the exhaust gas of the combustor into the exhaust passage upstream of the $NH_3$ synthesizing catalyst, and wherein the making-rich operation of the making-rich device is performed by making an air-fuel ratio of the combustor rich and adding the exhaust gas of the combustor to the exhaust gas of the engine.

86. The method according to claim 84, wherein the making-rich device is provided with a reducing agent injector for feeding a reducing agent into the exhaust passage upstream of the $NH_3$ synthesizing catalyst, the making-rich operation of the reducing agent injector being performed by adding the reducing agent to the exhaust gas of the engine.

87. The method according to claim 79, further comprising the step of estimating an amount of $NH_3$ adsorbed in the $NH_3$-AO catalyst, wherein the exhaust gas air-fuel ratio is changed from lean to rich or from rich to lean in accordance with the estimated adsorbed $NH_3$ amount.

88. The method according to claim 87, wherein the adsorbed $NH_3$ amount is estimated on the basis of an $NH_3$ amount flowing into the $NH_3$-AO catalyst when the exhaust gas air-fuel ratio of the exhaust gas flowing into the $NH_3$ synthesizing catalyst is rich, and on the basis of the decreased $NH_3$ amount when the exhaust gas air-fuel ratio of the exhaust gas flowing into the $NH_3$ synthesizing catalyst is lean.

89. The method according to claim 79, wherein the exhaust gas air-fuel ratio is changed from lean to rich or from rich to lean gradually with a changing rate.

90. The method according to claim 79, wherein the exhaust gas air-fuel ratio is set in accordance with the engine operating condition.

91. The method according to claim 79, wherein the exhaust gas air-fuel ratio is made equal to a target air-fuel ratio on the basis on output signals of an air-fuel ratio sensor arranged in an exhaust passage of the engine adjacent to an inlet of the $NH_3$ synthesizing catalyst.

92. The method according to claim 79, the engine further having a muffler arranged in an exhaust passage thereof, wherein the $NH_3$-AO catalyst is housed in the muffler.

93. The method according to claim 79, wherein the $NH_3$ synthesizing catalyst is a three-way catalyst including at least one precious metal.

94. The method according to claim 79, further comprising the step of introducing the exhaust gas to a $NH_3$ purifying catalyst for purifying $NH_3$ in the exhaust gas, after introducing the exhaust gas to the $NH_3$-AO catalyst.

95. The method according to claim 94, wherein the $NH_3$ purifying catalyst includes at least one substance selected from precious metals and transition metals.

96. The method according to claim 79, wherein the $NH_3$-AO catalyst comprises a solid acid carrying one of a transition metal and a precious metal.

97. The method according to claim 79, wherein the $NH_3$ synthesizing catalyst is a $NO_x$ occluding and $NH_3$ synthesizing ($NO_x$-$NH_3$) catalyst, the $NO_x$-$NH_3$ catalyst occluding $NO_x$ in the exhaust gas therein when the exhaust gas air-fuel ratio is lean, the $NO_x$-$NH_3$ catalyst releasing the occluded $NO_x$ therefrom, reducing the $NO_x$ in the $NO_x$-$NH_3$ catalyst and synthesizing $NH_3$ from $NO_x$ in the $NO_x$-$NH_3$ catalyst when the exhaust gas air-fuel ratio is rich.

98. The method according to claim 97, further comprising the step of estimating an amount of $NO_x$ occluded in the $NO_x$-$NH_3$ catalyst, and wherein the exhaust gas air-fuel ratio of the exhaust gas flowing into the $NO_x$-$NH_3$ catalyst is made lean and rich alternately and repeatedly in accordance with the estimated occluded $NO_x$ amount.

99. The method according to claim 97, further comprising the step of estimating an amount of $NH_3$ adsorbed in the $NH_3$-AO catalyst, and wherein the exhaust gas air-fuel ratio of the exhaust gas flowing into the $NO_x$-$NH_3$ catalyst is made lean and rich alternately and repeatedly in accordance with the estimated adsorbed $NH_3$ amount.

100. The method according to claim 97, wherein the $NO_x$-$NH_3$ catalyst includes:
  at least one substance selected from alkali metals, alkali earth metals, rare earth metals, and transition metals; and
  precious metals.

101. The method according to claim 97, wherein the $NH_3$-AO catalyst comprises solid acid carrying one of transition metals and precious metals.

102. The device for purifying an exhaust gas of an engine having an exhaust passage, comprising:
  exhaust gas air-fuel ratio controlling means arranged in one of the engine and the exhaust passage for alternately and repeatedly controlling an exhaust gas air-fuel ratio between a lean exhaust gas air-fuel ratio and a rich exhaust gas air-fuel ratio;
  an $NH_3$ synthesizing catalyst arranged in the exhaust passage downstream of the exhaust gas air-fuel ratio controlling means, the $NH_3$ synthesizing catalyst synthesizing $NH_3$ from $NO_x$ in the $NH_3$ synthesizing catalyst when the exhaust gas air-fuel ratio is rich, and synthesizing almost no $NH_3$ from $NO_x$ in the $NH_3$ synthesizing catalyst when the exhaust gas air-fuel ratio is lean; and
  an $NH_3$ adsorbing and oxidizing ($NH_3$-AO) catalyst arranged in the exhaust passage downstream of the $NH_3$ synthesizing catalyst, the $NH_3$-AO catalyst adsorbing $NH_3$ in the exhaust gas therein, and causing a reaction of $NH_3$ and $NO_x$ in the $NH_3$-AO catalyst to purify the $NH_3$ and the $NO_x$ and to decrease an amount of $NH_3$ adsorbed in the $NH_3$-AO catalyst when the exhaust gas includes $NO_x$ therein and the exhaust gas air-fuel ratio is lean.

103. The device according to claim 102, wherein the exhaust gas air-fuel ratio controlling means comprises an engine air-fuel ratio control mean for controlling an engine air-fuel ratio to make the engine air-fuel ratio lean to thereby form the lean exhaust gas air-fuel ratio and to make the engine air-fuel ratio rich to thereby form the rich exhaust gas air-fuel ratio.

104. The device according to claim 103, wherein the engine air-fuel ratio control means makes the engine air-fuel ratio lean for a lean period, and makes the engine air-fuel ratio rich for a rich period, and wherein the lean and the rich periods are set in accordance with the engine operating condition.

105. The device according to claim 104, wherein the engine is provided with a plurality of cylinders or cylinder groups of which the exhaust stroke periods are different to each other, and wherein the lean period is set as the number of the cylinders or cylinder groups of which the engine air-fuel ratio is to be made lean, and the rich period is set as the number of the cylinders or cylinder groups of which the engine air-fuel ratio is to be made rich.

106. The device according to claim 103, the engine being an internal combustion engine of spark ignition type, and the device further comprising ignition timing control means for controlling the ignition timing of the engine in accordance with the engine air-fuel ratio.

107. The device according to claim 102, wherein the exhaust gas air-fuel ratio controlling means comprises making-rich means, different from the engine, arranged in the exhaust passage upstream of the $NH_3$ synthesizing catalyst for making the exhaust gas air-fuel ratio rich, and keeping means for keeping the engine air-fuel ratio lean, and wherein the making-rich means stops a making-rich operation thereof to thereby form the lean exhaust gas air-fuel ratio, and performs the making-rich operation thereof to thereby form the rich exhaust gas air-fuel ratio.

108. The device according to claim 107, wherein the making-rich means comprises: a combustor of which an air-fuel ratio is controllable; and an introducing passage for introducing the exhaust gas of the combustor into the exhaust passage upstream of the $NH_3$ synthesizing catalyst, and wherein the making-rich means performs the making-rich operation thereof by making an air-fuel ratio of the combustor rich and adding the exhaust gas of the combustor to the exhaust gas of the engine.

109. The device according to claim 107, wherein the making-rich means comprise a reducing agent injector for feeding a reducing agent into the exhaust passage upstream of the $NH_3$ synthesizing catalyst, the reducing agent injector performing the making-rich operation thereof by adding the reducing agent to the exhaust gas of the engine.

110. The device according to claim 102, further comprising adsorbed $NH_3$ amount estimating means for estimating an amount of $NH_3$ adsorbed in the $NH_3$-AO catalyst, and wherein the exhaust gas air-fuel ratio controlling means changes the exhaust gas air-fuel ratio from lean to rich or from rich to lean in accordance with the estimated adsorbed $NH_3$ amount.

111. The device according to claim 110, wherein the adsorbed $NH_3$ amount estimating means estimates the adsorbed $NH_3$ amount on the basis of an $NH_3$ amount flowing into the $NH_3$-AO catalyst when the exhaust gas air-fuel ratio of the exhaust gas flowing into the $NH_3$ synthesizing catalyst is rich, and on the basis of the decreased $NH_3$ amount when the exhaust gas air-fuel ratio of the exhaust gas flowing into the $NH_3$ synthesizing catalyst is lean.

112. The device according to claim 102, wherein the exhaust gas air-fuel ratio controlling means changes the exhaust gas air-fuel ratio from lean to rich or from rich to lean gradually with a changing rate.

113. The device according to claim 102, wherein the exhaust gas air-fuel ratio is set in accordance with the engine operating condition.

114. The device according to claim 102, further comprising an air-fuel ratio sensor arranged in the exhaust passage between the exhaust gas air-fuel ratio controlling means and the $NH_3$ synthesizing catalyst, and wherein the exhaust gas air-fuel ratio controlling means makes the exhaust gas air-fuel ratio equal to a target air-fuel ratio on the basis of the output signals of the air-fuel ratio sensor.

115. The device according to claim 102, engine further having a muffler arranged in the exhaust passage, wherein the $NH_3$-AO catalyst is housed in the muffler.

116. The device according to claim 102, wherein the $NH_3$ synthesizing catalyst is a three-way catalyst including at least one precious metal.

117. The device according to claim 102, further comprising an $NH_3$ purifying catalyst arranged downstream of the exhaust gas purifying catalyst for purifying $NH_3$ in the exhaust gas.

118. The device according to claim 117, wherein the $NH_3$ purifying catalyst includes at least one substance selected from precious metals and transition metals.

119. The device according to claim 102, wherein the $NH_3$-AO catalyst comprises a solid acid carrying a one of a transition metal and a precious metal.

120. The device according to claim 102, wherein the $NH_3$ synthesizing catalyst is a $NO_x$ occluding and $NH_3$ synthesizing ($NO_x$-$NH_3$) catalyst, the $NO_x$-$NH_3$ catalyst occluding $NO_x$ in the exhaust gas when the exhaust gas air-fuel ratio is lean, the $NO_x$-$NH_3$ catalyst releasing the occluded $NO_x$ therefrom, reducing the $NO_x$ in the $NO_x$-$NH_3$ catalyst and synthesizing $NH_3$ from $NO_x$ in the $NO_x$-$NH_3$ catalyst when the exhaust gas air-fuel ratio is rich.

121. The device according to claim 120, further comprising occluded $NO_x$ amount estimating means for estimating an amount of $NO_x$ occluded in the $NO_x$-$NH_3$ catalyst, and wherein the exhaust gas air-fuel ratio of the exhaust gas flowing into the $NO_x$-$NH_3$ catalyst is made lean and rich alternately and repeatedly in accordance with the estimated occluded $NO_x$ amount.

122. The device according to claim 120, further comprising adsorbed $NH_3$ amount estimating means for estimating an amount of $NH_3$ adsorbed in the $NH_3$-AO catalyst, and wherein the exhaust gas air-fuel ratio of the exhaust gas flowing into the $NO_x$-$NH_3$ catalyst is made lean and rich alternately and repeatedly in accordance with the estimated adsorbed $NH_3$ amount.

123. The device according to claim 120, wherein the $NO_x$-$NH_3$ catalyst includes:

at least one substance selected from alkali metals, alkali earth metals, rare earth metals, and transition metals; and precious metals.

124. The device according to claim 120, wherein the $NH_3$-AO catalyst comprises solid acid carrying one of transition metals and precious metals.

* * * * *